United States Patent Office 3,389,318
Patented June 18, 1968

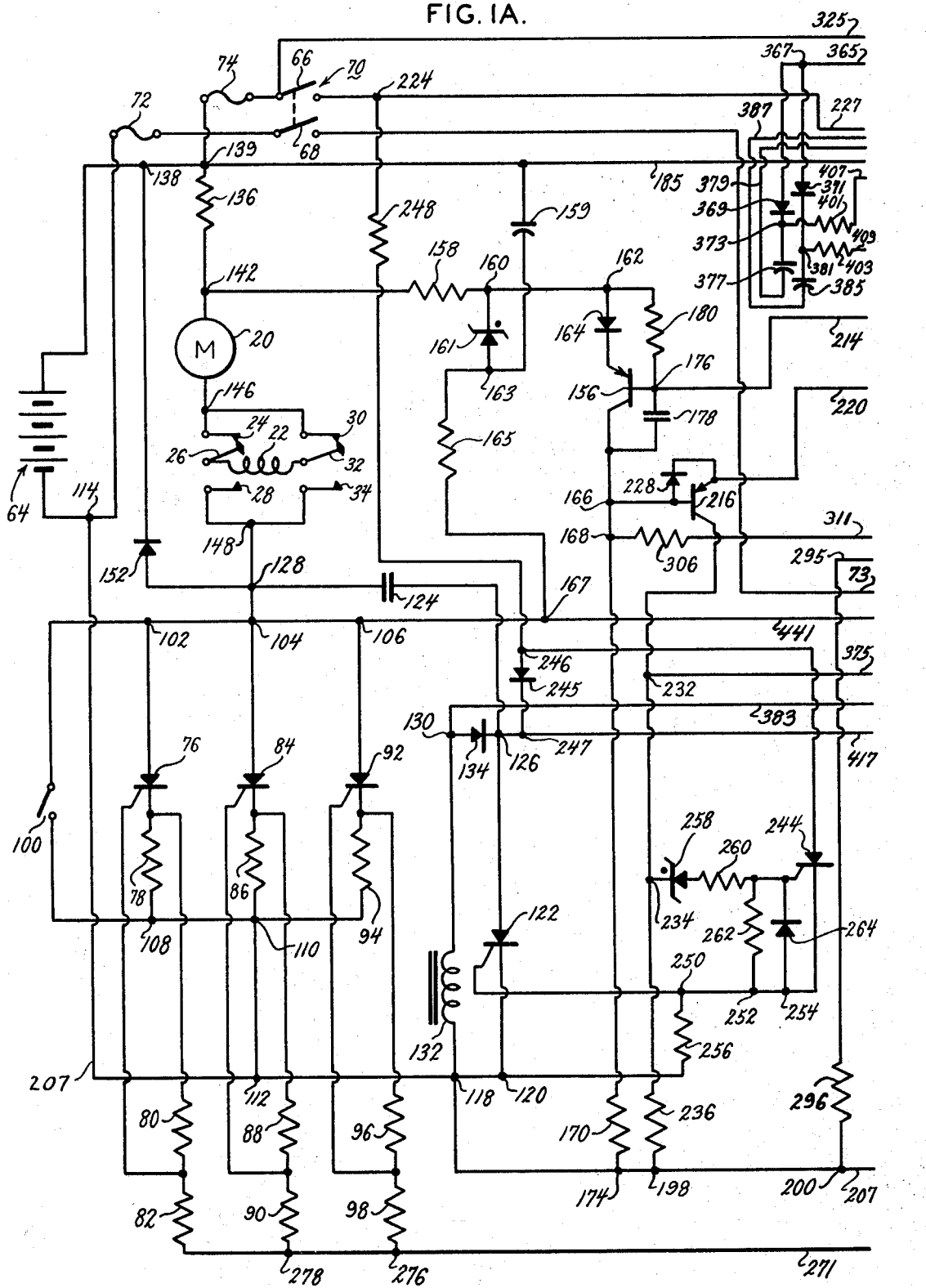
FIG. IA.

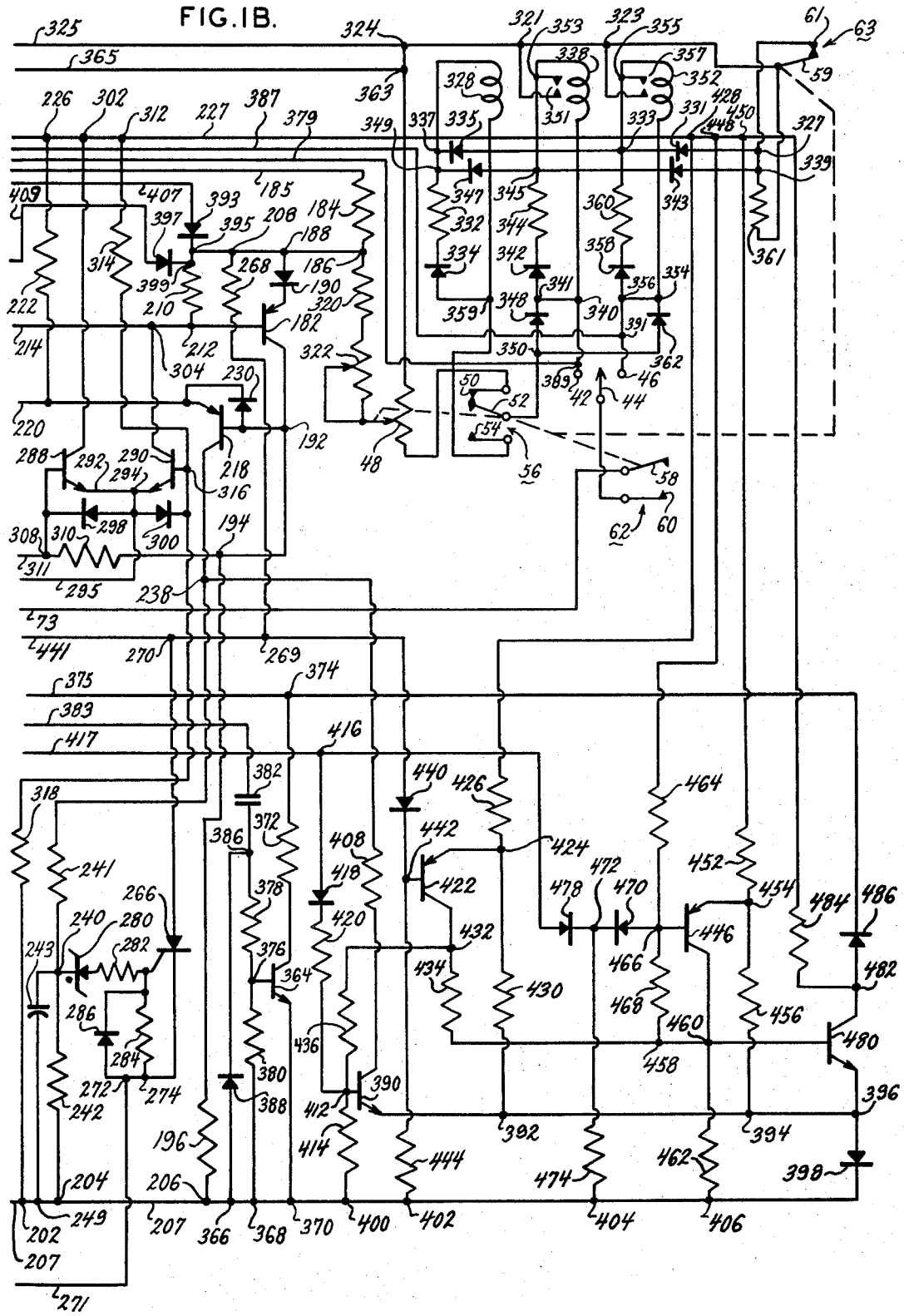
FIG. IB.

3,389,318
CONTROL SYSTEMS FOR ELECTRICALLY DRIVEN VEHICLES HAVING CONTROLLED RECTIFIERS OPERATIVE IN RESPONSE TO MOTOR CURRENT
Harold C. Hoyt, Jr., Overland, Mo., assignor to Sperry Rand Corporation, New York, N.Y., a corporation of Delaware
Filed Nov. 23, 1964, Ser. No. 413,055
38 Claims. (Cl. 318—345)

ABSTRACT OF THE DISCLOSURE

A small-value impedance, a series-wound D.C. motor, and a controlled rectifier are connected in series relation across a source of direct current, a sensing circuit senses the amount of current flowing through the small-value impedance and thus senses the amount of current flowing through that motor, a firing circuit renders that controlled rectifier conductive and thus permits that source of direct current to cause current to flow through that motor whenever the amount of current flowing through that small-value impedance falls below a predetermined value, and an extinguishing circuit renders that controlled rectifier non-conductive and thus keeps that source of direct current from causing current to flow through that motor whenever the amount of current flowing through that small-value impedance rises above a second predetermined value. As a result, that sensing circuit and those firing and extinguishing circuits maintain the current flow of the motor substantially between the first said and said second predetermined values despite changes in the load applied to that motor. Inhibiting circuits keep the controlled rectifier from being rendered conductive whenever it should not be rendered conductive; and enabling circuits permit that controlled rectifier to be rendered conductive whenever it should be rendered conductive.

---

This invention relates to improvements in control systems. More particularly, this invention relates to improvements in control systems for electrically-driven vehicles.

It is, therefore, an object of the present invention to provide an improved control system for an electrically-driven vehicle.

Control systems for electrically-driven vehicles customarily vary the speeds of those vehicles by varying the impedances of the elements which supply power to the motors of those vehicles. In some of those control systems, the elements which supply power to the electric motors of those vehicles are variable resistors; and the effective resistances of those variable resistors are increased to reduce the speeds of those vehicles. However, the use of variable resistors as the elements, of control systems, which supply power to the electric motors of electrically-driven vehicles necessarily reduces the overall efficiencies of those control systems, because those variable resistors can dissipate large quantities of power in the form of heat. It would be desirable to provide a control system for an electrically-driven vehicle, which could vary the impedance of the element that supplies power to the motor of that vehicle, but which would not dissipate very much power in the form of heat. The present invention provides such a control system; and it is, therefore, an object of the present invention to provide a control system for an electrically-driven vehicle which can vary the impedance of the element that supplies power to the motor of that vehicle but which will not dissipate much power in the form of heat.

The control system provided by the present invention uses controlled rectifiers to supply power to the motor of an electrically-driven vehicle, and it varies the impedance of those controlled rectifiers by using those controlled rectifiers in a variable frequency on-off switching mode. Those controlled rectifiers do not dissipate much power, and hence the control system provided by the present invention can have a high efficiency. Those controlled rectifiers are connected in parallel, to provide the large current values which the motor of the vehicle requires; and those controlled rectifiers are "fired" by a common source of firing signals, to avoid costly and needless multiplication of parts. Where controlled rectifiers are connected in parallel, one of those controlled rectifiers can tend to carry considerably more than its aliquot share of the total current flowing through those controlled rectifiers; and, where controlled rectifiers are connected in parallel and are fired by a common source of firing signals, one of those controlled rectifiers can tend to fire before the other controlled rectifiers can fire, and can thus tend to reduce the voltage across the anode-to-cathode circuits of those other controlled rectifiers to such a low level that those other controlled rectifiers can not be fired. Either of those results would be objectionable; and the control system provided by the present invention obviates those results by connecting a resistor in the output circuit of each of the controlled rectifiers and by making the ohmic values of those resistors equal. It is, therefore, an object of the present invention to connect a resistor in the output circuit of each of a number of paralleled controlled rectifiers.

The control system provided by the present invention recurrently switches the controlled rectifiers thereof on and off in response to the level of current flowing to the motor of the electrically-driven vehicle; and this is important because it makes it possible to keep that level from rising high enough to injure those controlled rectifiers. Further the switching of the controlled rectifiers in response to the current flowing to the motor is important because it makes it possible to keep that level from rising high enough to prevent "extinguishing" of those controlled rectifiers. It is, therefore, an object of the present invention to provide a control system for the motor of an electrically-driven vehicle, which uses controlled rectifiers and which recurrently switches those controlled rectifiers on and off in response to the level of the current flowing to the motor.

The control system of the present invention renders the controlled rectifiers conductive when the current flowing to the motor falls to a predetermined level, and renders those controlled rectifiers non-conductive when that current rises to a higher predetermined level. A discharge diode is connected across the terminals of the motor to permit current to continue to flow through that motor after the controlled rectifiers have been rendered non-conductive. As a result, current will flow through the motor on an uninterrupted basis; but that current will recurrently rise to its upper limit and then will fall to its lower limit. It is, therefore, an object of the present invention to provide a control system, for the motor of an electrically-driven vehicle, which has controlled rectifiers and which has a discharge diode connected across the terminals of that motor, and which renders those controlled rectifiers conductive when the motor current falls to a predetermined level and renders those controlled rectifiers non-conductive when that motor current rises to a higher predetermined level.

To sense the current flowing to the motor, the control system of the present invention connects a resistance in series with the motor, and provides a differential amplifier to sense changes in the voltages developed across that resistance by the flow of motor current through that resistance. The differential amplifier is desirable because it permits the ohmic value of the resistance to be very small, and thereby reduces to a minimum the amount of power that will be dissipated in that resistance in the form of heat. However, the usual differential amplifier requires two different values of D.C. voltage; and the battery on the usual electrically-driven vehicle is not well adapted to provide the two different D.C. voltages which the usual differential amplifier requires. This means that if the control system of the present invention were to include a usual differential amplifier, the electrically driven vehicle would have to be equipped with an extra battery or the control system would have to be equipped with an inverter. The cost of an extra battery and the space which such a battery would require make the use of such a battery objectionable. The cost and the lack of reliability of the usual inverter make the use of an inverter objectionable. The present invention obviates all need of an extra battery or of an inverter by providing a differential amplifier which has the bases thereof directly connected together, has the emitters thereof connected to the terminals of the current-sensing resistance, and has the sum of the collector currents regulated. The sum of the collector currents is regulated by regulating the collector voltages of the differential amplifier; and, by making the collector load resistors of that amplifier essentially constitute the loading of the collectors of that amplifier, it is possible to make the regulating of the sum of collector currents approximate the regulating of the sum of the emitter currents of that amplifier. The overall result is that the control system of the present invention can provide differenial amplification without any need of an extra battery or an inverter. It is, therefore, an object of the present invention to provide a differential amplifier which has the bases thereof directly connected together, which has the emitters thereof connected to the terminals of a small impedance signal source, and which has the sum of the collector currents thereof regulated.

The control system provided by the present invention supplies power to the motor of the electrically-driven vehicle whenever a suitable accelerator pedal or lever is actuated, and that control system permits that motor to "coast" whenever that pedal or lever is permitted to return to its normal position. This is desirable, because it minimizes the drain on the battery which is used to supply the power for the motor of that vehicle. It is, therefore, an object of the present invention to provide a control system for an electrically-driven vehicle which can respond to the actuation of a pedal or lever to supply power to the motor of that vehicle, and which can permit that motor to "coast" when that pedal or lever is permitted to return to its normal position.

The operators of electrically-driven vehicles usually operate those vehicles at power levels below the maximum power levels of those vehicles, but frequently want to operate those vehicles at their maximum power levels. The control system provided by the present invention enables the operator of an electrically-driven vehicle to operate that vehicle at power levels below the maximum power level of that vehicle, and also enables that operator to operate that vehicle at its maximum power level. The present invention accomplishes this result by connecting heavy duty relay contacts in parallel with the controlled rectifiers of the control system, and by enabling the operator to selectively close those heavy duty relay contacts by merely pressing the accelerator pedal to the floor. It is, therefore, an object of the present invention to provide a control system for an electrically-driven vehicle wherein heavy-duty relay contacts are connected in parallel with the variable impedances for the motor of that vehicle.

When controlled rectifiers are connected in D.C. circuits, transient voltages can tend to prematurely render those controlled rectifiers conductive. Any premature rendering of the controlled rectifiers conductive could be extremely hazardous where those controlled rectifiers were used to control the motor of an electrically-driven vehicle. It would be desirable to provide a control system for the motor of an electrically-driven vehicle wherein premature firing of the controlled rectifiers was prevented. The present invention provides such a control system; and it does so by providing a number of sub-circuits which normally tend to prevent firing of the controlled rectifiers, and which permit firing of those controlled rectifiers only when safe conditions prevail. It is, therefore, an object of the present invention to provide a control system for the motor of an electrically-driven vehicle which includes sub-circuits that normally tend to keep the controlled rectifiers of that control system non-conductive and that permit firing of those controlled rectifiers only when safe conditions prevail.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1A is part of a schematic diagram showing one preferred form of control system that is made in accordance with the principles and teachings of the present invention, and FIG. 1B is the other part of that schematic diagram.

*Components of control system*

Referring to the drawing in detail, the numeral 20 denotes the armature winding of a series-wound D.C. motor for an electrically-driven vehicle, such as a fork lift truck. The armature of that motor will be suitably connected to the wheels of that vehicle; and that armature will be rotatable in either direction to drive that vehicle in the forward or reverse direction. The numeral 22 denotes the field winding of that motor; and one thermal of that field winding is connected to a movable relay contact 26 which can selectively engage stationary relay contacts 24 and 28. The other thermal of that field winding is connected to a movable relay contact 32 which can selectively engage stationary relay contacts 30 and 34. The movable relay contacts 26 and 32 are normally in engagement with the stationary relay contacts 24 and 30, respetcively; and, as long as those movable relay contacts are in engagement with those stationary relay contacts, no current can flow through the armature winding 20 or the field winding 22.

The numeral 44 denotes the movable contact of a switch that is operated by a forward-reverse lever, not shown. A "forward" contact 42 and a "reverse" contact 46 are mounted adjacent the movable contact 44; and the contact 44 can be selectively moved into engagement with the contact 42 or the contact 46.

The numeral 48 denotes a potentiometer; and the movable contact of that potentiometer will be suitably connected to a pedal or a hand-operated lever which can be actuated by the driver of the vehicle. That movable contact will be urged toward the upper end of that potentiometer, but that movable contact can be moved to any desired position intermediate the upper and lower ends of that potentiometer. The numeral 52 denotes the movable contact of a single pole, double throw switch 56; and the stationary contacts of that switch are denoted by the numeral 50 and 54. The numeral 58 denotes the movable contact of a single pole, single throw switch 62; and the stationary contact of that switch is denoted by the numeral 60. The numeral 59 denotes the movable contact of a single pole, single throw switch 63; and the stationary contact of that switch is denoted by the numeral 61. The movable contacts 52, 58 and 59 of the switches 56, 62 and 63 are arranged to move in response to movement of the movable contact of the potentiometer 48. Specifically, the movable contact 58 will be out of engagement with the stationary contact 60 as long as the movable contact of the potentiometer 48 is adjacent the upper end of that potentiometer; but that movable contact will move into engagement with that stationary contact as soon as the movable contact of the potentiometer 48 is moved downwardly. The movable contact 59 will be in engagement with the stationary contact 61 until after the movable contact 58 has been moved into engagement with the stationary contact 60; and thereafter the movable contact 59 will be moved out of engagement with the stationary contact 61. The movable contact 52 will remain in engagement with the stationary contact 50 until the movable contact of the potentiometer 48 is moved to the lower end of that potentiometer; and, thereupon, the movable contact 52 will move out of engagement with the stationary contact 50 and into engagement with the stationary contact 54.

The numeral 64 denotes a secondary battery which will be suitably mounted on the vehicle. That battery will preferably have a number of cells; and, in one preferred embodiment of control system provided by the present invention, that battery has sufficient cells to enable it to develop a voltage of thirty-six volts. A double pole, single throw switch 70 has a movable contact 66 and a movable contact 68; and those contacts will be open except when the vehicle is in use. The movable contact 66 is connected to the positive terminal of the battery 64 by a fuse 74 and junctions 139 and 138. The movable contact 68 is connected to the negative terminal of the battery 64 by a fuse 72 and a junction 114.

The numeral 76 denotes a controlled rectifier; and that controlled rectifier is preferably a silicon controlled rectifier. A resistor 78 is connected to the cathode of the controlled rectifier 76; and resistors 80 and 82 are connected in series with each other and to the cathode of that controlled rectifier. The junction between the resistors 80 and 82 is connected to the gate of controlled rectifier 76. The numeral 84 denotes a second controlled rectifier; and that controlled rectifier also is preferably a silicon controlled rectifier. A resistor 86 is connected to the cathode of the controlled rectifier 84; and resistors 88 and 90 are connected in series with each other and to the cathode of controlled rectifier 84. The junction between the resistors 88 and 90 is connected to the gate of controlled rectifier 84. The numeral 92 denotes a third controlled rectifier; and that controlled rectifier also is preferably a silicon controlled rectifier. A resistor 94 is connected to the cathode of the silicon controlled rectifier 92; and resistors 96 and 98 are connected in series with each other and to the cathode of the controlled rectifier 92. The junction between the resistors 96 and 98 is connected to the gate of controlled rectifier 92.

Heavy duty relay contacts 100 are connected to the anodes of the controlled rectifiers 76, 84 and 92 by junctions 102, 104 and 106. Those heavy duty relay contacts also are connected to the lower ends of the resistors 78, 86 and 94 by junctions 108 and 110. As a result, series-connected controlled rectifier 76 and resistor 78, series-connected controlled rectifier 84 and resistor 86, series-connected controlled rectifier 92 and resistor 94 are connected in parallel with each other and with the heavy duty relay contacts 100. The resistors 78, 86 and 94 are balancing resistors; and they are intended to keep the values of the currents flowing through the controlled rectifiers 76, 84 and 92 substantially equal at all times. The heavy duty relay contacts 100, and the resistors 78, 86 and 94 are connected to the negative terminal of the battery 64 by junctions 108, 110, 112 and 114.

The numeral 122 denotes a fourth controlled rectifier; and that controlled rectifier also is preferably a silicon controlled rectifier. The cathode of that controlled rectifier is connected to the cathode of the controlled rectifier 76 by junctions 120, 118, 112, 110 and 108 and resistor 78, is connected to the cathode of controlled rectifier 84 by junctions 120, 118, 112 and 110 and resistor 86, and is connected to the cathode of controlled rectifier 92 by junctions 120, 118, 112 and 110 and resistor 94. The anode of the controlled rectifier 122 is connected to the anodes of the controlled rectifiers 76, 84 and 92 by a junction 126, a capacitor 124, and junctions 128, 104, 102 and 106. An inductor 132 has the lower terminal thereof directly connected to the junction 118, and has the upper terminal thereof connected to the junction 126 by a junction 130 and a diode 134. The cathode of the diode 134 is connected to the anode of the controlled rectifier 122 by junction 126.

The numeral 245 denotes a diode which has the cathode thereof connected to the anode of controlled rectifier 122 by junctions 247 and 126. The anode of the diode 245 is connected to the contacts 66, and thus to the positive terminal of the battery 36, by a junction 246, a resistor 248, and a junction 224.

The numeral 136 denotes a resistor which is connected to the positive terminal of the battery 64 by junctions 139 and 138; and that resistor also is connected to the upper terminal of the armature winding 20 by a junction 142. In the said preferred embodiment of control system provided by the present invention, that resistor has a value of one thousandth of an ohm. The lower terminal of the armature winding 20 is connected to the stationary contacts 24 and 30 by a junction 146. The stationary contacts 28 and 34 are connected to the anodes of the controlled rectifiers 76, 84 and 92 and to the heavy duty relay contacts 100 by junctions 148, 128, 104, 102 and 106.

A discharge diode 152 is connected between the junctions 128 and 138. The cathode of that diode is connected to the upper terminal of the armature winding 20 by junctions 138 and 139, resistor 136, and junction 142.

The numeral 156 denotes a PNP transistor; and a resistor 158, junctions 160 and 162, and a diode 164 connect the junction 142 to the emitter of that transistor. Junctions 166 and 168, a resistor 170, and a junction 174 connect the collector of that transistor to the junction 118, and thus to the negative terminal of the battery 64. A resistor 180 has the upper terminal thereof connected to the anode of diode 164 by junction 162, and has the lower terminal thereof connected to the base of the transistor 156 by a junction 176. A capacitor 178 has one terminal thereof connected to the collector of the transistor 156 and has the other terminal thereof connected to the base of that transistor by the junction 176.

A capacitor 159 has the upper terminal thereof connected to junction 139, and has the lower terminal thereof connected to the anode of a Zener diode 161 by a junction 163. The cathode of that Zener diode is connected intermediate the resistor 158 and the junction 162. A resistor 165 and a junction 167 connect the junction 163 to the junction 106.

The numeral 182 denotes a PNP transistor; and a conductor 185, a resistor 184, junctions 186 and 188, and a diode 190 connect the junction 139 to the emitter of that transistor. Junctions 192 and 194, a resistor 196, junction 206, and conductor 207 connect the collector of that transistor to the junction 118, and thus to the negative terminal of the battery 64. A resistor 210 has the upper terminal thereof connected to the junction 188 by junctions 399, 395 and 208, and has the lower terminal thereof connected to the base of the transistor 182 by a junction 212 in a conductor 214. That conductor directly connects the bases of the transistors 156 and 182.

The numeral 216 denotes a PNP transistor, and the numeral 218 also denotes a PNP transistor; and a conductor 220 directly connects the emitters of those transistors. A resistor 222 is connected between the conductor 220 and the positive terminal of the battery 64 by a junction 226, a conductor 227, the junction 224, switch contacts 66, fuse 74, and junctions 139 and 138. A diode 228 is connected between the base and the emitter of the transistor 216; and the anode of that diode is connected to the base of that transistor. A diode 230 is connected between the base and the emitter of the transistor 218; and the anode of that diode is connected to the base of that transistor. Junctions 232 and 234, a resistor 236, and a junction 198 connect the collector of the transistor 216 to the conductor 207, and thus to the negative terminal of the battery 64. Junction 238, a resistor 241, junction 240, a resistor 242, and a junction 204 connect the collector of the transistor 218 to the conductor 207, and thus to the negative terminal of the battery 64. A capacitor 243 is connected in parallel with the resistor 242.

The numeral 244 denotes a fifth controlled rectifier; and that controlled rectifier also is preferably a silicon controlled rectifier. The anode of that controlled rectifier is connected to the positive terminal of the battery 64 by the junction 246, the resistor 248, the junction 224, switch contacts 66, fuse 74, and junctions 139 and 138. The cathode of that controlled rectifier is connected to the gate of the controlled rectifier 122 by junctions 254, 252 and 250. A diode 264 is connected between the cathode and the gate of the controlled rectifier 244, and the anode of that diode is connected to the cathode of that controlled rectifier. A resistor 262 has the lower terminal thereof connected to the junction 252, and has the upper terminal thereof connected to the gate of the controlled rectifier 244. That upper terminal also is connected to the junction 234 by a resistor 260 and a Zener diode 258. A resistor 256 is connected between the junctions 250 and 120.

The numeral 266 denotes a sixth controlled rectifier; and that controlled rectifier also is preferably a silicon controlled rectifier. A junction 270, a junction 269, and a resistor 268 connect the anode of that controlled rectifier to the junction 208. Junctions 274 and 272, a conductor 271, junctions 276 and 278, and resistors 82, 90 and 98 connect the cathode of controlled rectifier 266 to the gates of the controlled rectifiers 76, 84 and 92. A diode 286 is connected between the cathode and the gate of the controlled rectifier 266, and the anode of that diode is connected to the cathode of that controlled rectifier. A resistor 284 has its lower terminal connected to the junction 274, and has the upper terminal thereof connected to the junction 240 by a resistor 282 and a Zener diode 280. The cathode of the Zener diode 280 is connected to the junction 240.

The numeral 288 denotes an NPN transistor, and the numeral 290 denotes a further NPN transistor; and a conductor 292 extends between and connects the emitters of those transistors. A junction 294, a conductor 295, a resistor 296, and a junction 200 connect the conductor 292 to the conductor 207, and thus to the negative terminal of the battery 64. A diode 298 is connected between the junction 294 and the base of the transistor 288, and the cathode of that diode is connected to that base. A diode 300 has the anode thereof connected to the junction 294 and has the cathode thereof connected to the base of the transistor 290 by a junction 316. Resistor 306 in FIG. 1A and resistor 310 in FIG. 1B are connected between the junctions 168 and 194 by a conductor 311; and a junction 308 intermediate those resistors is connected to the base of the transistor 288. Resistors 314 and 318 in FIG. 1B are connected in series between a junction 202 in conductor 207 and a junction 312 in conductor 227. The junction 316 between the resistors 314 and 318 is directly connected to the base of the transistor 290. The collector of the transistor 288 is connected to the conductor 227 by a junction 302, and the collector of the transistor 290 is connected to the conductor 214 by a junction 304.

A resistor 320 has the upper terminal thereof connected to the junction 186, which is connected to the positive terminal of the battery 64 by resistor 184, conductor 185, and juntcions 139 and 138. The lower terminal of that resistor is connected to the movable contact of the potentiometer 48 by the upper section and the movable contact of an adjustable resistor 322.

The numeral 324 denotes a junction which is connected to the right-hand terminal of the fuse 74 by a conductor 325; and that junction is connected to the upper terminal of the potentiometer 48 by a junction 363, and is connected to the movable contact 59 of the switch 63 by junctions 321 and 323. The stationary contact of that switch is connected to the upper terminal of a relay coil 328 by a junction 327, a diode 331, a junction 333, a diode 335, and a junction 337, and also is connected to that upper terminal by junctions 327 and 339, a diode 343, a junction 345, a diode 347, a junction 349, and junction 337. The relay coil 328 controls the relay contacts 100 in FIG. 1A, and will close those contacts whenever it is energized. The stationary contact 61 of switch 63 is connected to the upper terminal of a relay coil 338 by junctions 327 and 339, diode 343, junction 345 and a junction 353; and that relay coil controls the movable contact 26 in FIG. 1A and holding contacts 351 in FIG. 1B. Whenever the relay coil 338 is energized, it will move the movable contact 26 down into engagement with the stationary contact 28 and will also close the holding contacts 351. The stationary contact 61 of switch 63 is connected to the upper terminal of a relay coil 352 by junction 327, diode 331, junction 333, and a junction 355; and that relay coil controls the movable contact 32 in FIG. 1A and holding contacts 357 in FIG. 1B. Whenever the relay coil 352 is energized, it will move the movable contact 32 down into engagement with the stationary contact 34 and will also close the holding contacts 357. The lower contacts of the holding contacts 351 and 357 are connected to junction 324, and thus to the positive terminal of the battery 64, by the junctions 321 and 323. The upper holding contact 351 is connected to the upper terminal of relay coil 338 by junction 353, and the upper holding contact 357 is connected to the upper terminal of relay coil 352 by junction 355.

The lower terminal of relay coil 328 is connected to the stationary contact 54 of switch 56 by a junction 359. A diode 334 has the anode thereof connected to the junction 359, and has the cathode thereof connected to the junction 349 by a resistor 332. The lower terminal of relay coil 338 is connected to the stationary contact 42 by junctions 340 and 389. A diode 342 has the anode thereof connected to the junction 340 by a junction 341, and has the cathode thereof connected to the junction 345 by a resistor 344. The movable contact 52 is connected to the junction 341 by a junction 350 and a diode 348. The lower terminal of the relay coil 352 is connected to the stationary contact 46 by junctions 354, 356 and 391. A diode 358 has the anode thereof connected to the junction 356, and has the cathode thereof connected to the junction 333 by a resistor 360. The junction 359 and a diode 362 connect the movable contact 52 of switch 56 with the junction 354. A resistor 361 connects the movable contact 59 of switch 63 with the junction 339.

The numeral 377 denotes a capacitor; and junction 363, a conductor 365, a junction 367, a diode 369, and a junction 373 connect the junction 324, and thus the positive terminal of the battery 64, to the upper terminal of that capacitor. The lower terminal of that capacitor is connected to the stationary contact 42 by a conductor 379 and the junction 389. A resistor 401, a conductor 407, and a diode 393 connect the junction 373 to the junction 395. The numeral 385 denotes a capacitor; and junction 363, conductor 365, junction 367, a diode 371, and a junction 381 connect the junction 324, and thus the positive terminal of the battery 64, to the upper terminal of that capacitor. The lower terminal of that capacitor is connected to the stationary contact 46 by a conductor 387 and the junction 391. A resistor 403, a conductor 409, and a diode 397 connect the junction 381 to the junction 399.

The numeral 364 denotes an NPN transistor, and the emitter of that transistor is connected to the conductor 207, and thus to the negative terminal of the battery 64, by a junction 370. The collector of that transistor is connected to the junction 232 in FIG. 1A by a resistor 372, a junction 374, and a conductor 375. A capacitor 382 has the upper terminal thereof connected to the junction 130 in FIG. 1A by a conductor 383, and has the lower terminal thereof connected to a junction 386. Series-connected resistors 378 and 380 extend between the junction 386 and a junction 368 in conductor 207; and a junction 376 intermediate those resistors is directly connected to the base of the transistor 364. A diode 388 has the cathode thereof connected to the junction 386, and has the anode thereof connected to a junction 366 in the conductor 207.

The numeral 390 denotes another NPN transistor; and the emitter of that transistor is connected to the conductor 207, and thus to the negative terminal of the battery 64, by junctions 392, 394 and 396, and a diode 398. The collector of that transistor is connected to the junction 238 by a resistor 408. A diode 418 has the anode thereof connected to the junction 247 in FIG. 1A by a junction 416 and a conductor 417; and the cathode of that diode is connected to the conductor 207, and thus to the negative terminal of the battery 64, by a resistor 420, a junction 412, a resistor 414, and a junction 400. The junction 412 is directly connected to the base of the transistor 390.

The numeral 422 denotes a PNP transistor; and the emitter of that transistor is connected to the conductor 227, and is thus connectible to the positive terminal of the battery 64, by a junction 424, a resistor 426 and a junction 428. A resistor 430 is connected between the junction 424 and the junction 392. A resistor 436 and a junction 432 connect the base of the transistor 390 with collector of the transistor 422. A diode 440 has the anode thereof connected to the junction 167 in FIG. 1A by junctions 269 and 270, and conductor 441, and has the cathode thereof connected to the conductor 207, and thus to the negative terminal of the battery 64, by a junction 442, a resistor 444, and a junction 402. The junction 442 is directly connected to the base of the transistor 422. The collector of the transistor 422 is connected to the conductor 207, and thus to the negative terminal of the battery 64, by junction 432, a resistor 434, junctions 458 and 460, a resistor 462, and a junction 406.

The numeral 446 denotes a PNP transistor; and the emitter of that transistor is connected to the conductor 227, and is thus connectible to the positive terminal of the battery 64, by a junction 454, a resistor 452, and a junction 450. The collector of the transistor 446 is connected to the junction 406, and thus to the negative terminal of the battery 64, by the junction 460 and the resistor 462. Resistors 464 and 468 are connected between a junction 448 in conductor 227 and the junction 458; and a junction 466 intermediate those resistors is directly connected to the base of the transistor 446. A diode 470 has the anode thereof connected to the junction 466, and has the cathode thereof connected to the conductor 207, and thus to the negative terminal of the battery 64, by a junction 472, a resistor 474, and a junction 404. A diode 478 has the anode thereof connected to the junction 416, and has the cathode thereof connected to the junction 472. A resistor 456 is connected between the junction 454 and the junction 394.

The numeral 480 denotes an NPN transistor; and the emitter of that transistor is connected to the conductor 207, and thus to the negative terminal of the battery 64, by the junction 396 and the diode 398. The collector of that transistor is connected to the conductor 227, and is thus connectible to the positive terminal of the battery 64, by a junction 482 and a resistor 484. A diode 486 has the anode thereof connected to the junction 482, and has the cathode thereof connected to the junction 374.

If desired, "dead man" switches could be associated with the driver's seat of the electrically-driven vehicle; and those switches would open whenever the driver was not sitting on that seat. Those switches would preferably be connected in series with the contacts 66 and 68 of the switch 70 in FIG. 1A.

*Functions of components of control system*

The controlled rectifiers 76, 84 and 92 constitute variable impedances in series with the armature winding 20 and with the field winding 22 of the D.C. motor for the electrically-driven vehicle; and, whenever those controlled rectifiers are conductive, current will flow through those windings and cause that motor to drive that vehicle. The controlled rectifier 266 is provided to selectively render the controlled rectifiers 76, 84 and 92 conductive; and the controlled rectifier 122, capacitor 124, diode 134, and the inductor 132 are provided to selectively render those controlled rectifiers non-conductive. The speed of the rotor of the motor will be determined by the relative durations of the periods of time when the controlled rectifiers 76, 84 and 92 are conductive and non-conductive. Controlled rectifier 244 is provided to selectively render the controlled rectifier 122 conductive.

The resistors 78, 86 and 94 have low ohmic values; and, in the said one preferred embodiment of control system provided by the present invention, the ohmic value of each of those resistors is only three-thousandths of an ohm. Such low ohmic values are very desirable, because they reduce to a minimum the amount of power which will be dissipated by the resistors 78, 86 and 94 in the form of heat. However, although the ohmic values of the resistors 78, 86 and 94 are low, those values are large enough to enable those resistors to perform two important functions. For example, those ohmic values are large enough to enable moderate and high values of current flowing through one or more of the controlled rectifiers to develop a sufficiently large voltage drop across those resistors to make certain that all of those controlled rectifiers can "fire" when they are supposed to do so. This is an important feature, because without it one of the controlled rectifiers 76, 84 and 92 might tend to "fire" more quickly than the other two of those controlled rectifiers and might preclude the "firing" of the other two of those controlled rectifiers. The ohmic values of the resistors 78, 86 and 94 also are large enough to enable those resistors to perform the function of keeping any one of the controlled rectifiers 76, 84 and 92 from conducting appreciably more than its aliquot share of the total current flowing through the motor. In the said one preferred embodiment of control system provided by the present invention, each of the controlled rectifiers 76, 84 and 92 is relied upon to conduct about one-third of the total motor current of four hundred and fifty amperes; and any one of those controlled rectifiers could be injured if it carried substantially more than one-third of that total motor current for an appreciable length of time. The resistors 78, 86 and 94 keep any one of the controlled rectifiers 76, 84 and 92 from carrying substantially more than one-third of the total motor current, and thus protect those controlled rectifiers from injury.

The resistor 136 will respond to the current flowing through it to develop a voltage across it which is proportional to the total current flowing through the motor; and that voltage, plus the voltage across resistor 158 minus the voltage across resistor 184, will appear between the emitters of transistors 156 and 182. The bases of those transistors are directly connected together by conductor 214, and the sum of the collector currents of those transistors is regulated; and hence those transistors constitute a differential amplifier. The transistors 288 and 290 have a common emitter resistor, namely, resistor 296, and hence those transistors constitute a second differential amplifier; and that second differential amplifier regulates the sum of the collector currents of transistors 156 and 182—and by regulating the voltage at the junction 308 between the collectors of transistors 156 and 182. The transistors 216 and 218 have a common emitter resistor, namely, resistor 222, and hence those transistors constitute a third differential amplifier; and that third differential amplifier responds to variations in the conductivities of transistors 156 and 182 of the said one differential amplifier to control the "firing" of controlled rectifiers 244 and 266. All of this means that the value of the motor current flowing through resistor 136 will control the "firing" of controlled rectifiers 244 and 266 and, ultimately, the "extinguishing" and "firing" of controlled rectifiers 76, 84, 92 and 122.

The use of the value of the motor current to regulate the "extinguishing" and "firing" of the controlled rectifiers 76, 84 and 92 is important. In the first place, the use of that value makes certain that the total motor current can not rise to a value which is high enough to injure those controlled rectifiers; and, in the second place, the use of that value makes certain that the total motor current can not rise to a value which is high enough to prevent the "extinguishing" of those controlled rectifiers.

The differential amplifier, which is constituted by the transistors 156 and 182, is a unique form of differential amplifier in that it does not have a common emitter resistor. Further, that differential amplifier is important because it obviates all need of an extra battery or an inverter. The resistor 136 serves as the signal source for that differential amplifier; and, because that differential amplifier permits that signal source to be a low impedance signal source, the ohmic value of the resistor 136 can be small enough to minimize the amount of power that is dissipated in that resistor in the form of heat. In the said one preferred embodiment of control system of the present invention, the resistor 136 has an ohmic value of one-thousandths of an ohm.

The resistor 180 tends to make the operation of the transistors 156 independent of the temperature of that transistor. Similarly, the resistor 210 tends to make the operation of the transistor 182 independent of the temperature of that transistor.

The diode 264 protects the controlled rectifier 244 against injury in the event an inverse voltage is applied to the gate-to-cathode circuit of that controlled rectifier. Similarly, the diode 286 protects the controlled rectifier 266 against injury in the event an inverse voltage is applied to the gate-to-cathode circuit of that controlled rectifier.

The diode 228 protects the transistor 216 against injury in the event an undue base-to-emitter voltage differential is applied to that transistor. Similarly, the diode 230 protects the transistor 218 against injury in the event an undue base-to-emitter voltage differential is applied to that transistor.

The diode 298 protects the transistor 288 against injury in the event an undue emitter-to-base voltage differential is applied to that transistor. Similarly, the diode 300 protects the transistor 290 against injury in the event an undue emitter-to-base voltage differential is applied to that transistor.

The resistor 158, the Zener diode 161, and the resistor 165 are effectively connected in parallel with the series-connected armature winding 20 and field winding 22 of the motor of the electrically-driven vehicle. Until the voltage across that Zener diode reaches a predetermined value, preferably about twenty volts, that Zener diode will essentially be non-conductive; and that Zener diode and the resistor 165 will not be able to cause current to flow through the resistor 158. However, after the voltage across that Zener diode reaches the said predetermined value, that Zener diode will readily conduct current; and, thereupon, that Zener diode and the resistor 165 will cause current to flow through the resistor 158. The resulting voltage drop across the latter resistor will simulate a substantial increase in the value of the current flowing through the resistor 136; and the differential amplifier—constituted by the transistors 156 and 182—will respond to that voltage drop in the same manner in which it would respond to a substantial increase in the value of the current flowing through the resistor 136. As a result, that Zener diode and the resistor 165 effectively limit the total power that must be withstood by the controlled rectifiers 76, 84 and 92.

The capacitor 159 is connected in parallel with the series-connected resistor 136, resistor 158, and Zener diode 161; and that capacitor also is connected in series with the resistor 165. Because the ohmic values of resistors 136 and 158 are quite small, relative to the impedance value of that Zener diode, the capacitor 159 can be regarded as being essentially connected in parallel with that Zener diode. That capacitor will integrate, and thus tend to "average," the voltage which is developed across the series-connected resistor 136, armature winding 20, and field winding 22; and that capacitor will apply that integrated or "averaged" voltage to the Zener diode 161. Because that Zener diode has an integrated or "averaged" voltage, rather than a widely fluctuating voltage, applied to it, that Zener diode will not become conductive prematurely.

The capacitor 243 and the resistor 241 in FIG. 1B constitute a de-coupling network; and that network keeps ripple and voltage transients from affecting the voltage across the resistor 242. As a result, that network helps prevent premature firing of the controlled rectifier 266.

The capacitor 178 in FIG. 1A is connected between the collector and base of the transistor 156. That capacitor is useful in helping to stabilize the operation of the differential amplifier constituted by the transistors 156 and 182.

The transistor 364 is provided to keep the controlled rectifier 244 from being rendered conductive while the series-resonant circuit, constituted by the capacitor 124 and the inductor 132, is oscillating. This is desirable; because if that controlled rectifier were to be rendered conductive at such time, the controlled rectifier 122 and the capacitor 124 would be able to cause inverse current to flow in the controlled rectifiers 76, 84 and 92 but might not be able to sustain that inverse current flow long enough to fully extinguish those controlled rectifiers.

The transistor 390 is provided to keep the controlled rectifier 266 in FIG. 1B from being rendered conductive whenever the voltage at the anode of controlled rectifier 122 in FIG. 1A is greater than the voltage which normally appears across the latter controlled rectifier when that controlled rectifier is conductive. This is desirable; because the capacitor 124 will not be fully charged if the controlled rectifier 122 is not conductive, and that controlled rectifier will not be conductive when the voltage at its anode is greater than the voltage which normally appears across that controlled rectifier when that controlled rectifier is conductive. The transistor 390 is provided to keep the controlled rectifier 266 in FIG. 1B from being rendered conductive whenever the voltage at the anode of the controlled rectifier 266 in FIG. 1B is low. This is desirable; because that voltage will be low until the capacitor 124 has been charged sufficiently to make certain that the controlled rectifiers 76, 84 and 92 can subsequently be fully extinguished.

The transistor 480 is provided to automatically supply a firing signal to the controlled rectifier 244 in FIG. 1A, as soon as the field winding 22 is connected to the controlled rectifiers 76, 84 and 92, in the event that controlled rectifier is not already conductive. This is desirable; because the firing of the controlled rectifier 244 will fire the controlled rectifier 122, and the firing of controlled rectifier 122 will keep the controlled rectifier 266 from firing until after the capacitor 124 has become charged. As a result, the controlled rectifier 266 will not be able to fire the controlled rectifiers 76, 84 and 92 until the capacitor 124 has been charged sufficiently to enable it to subsequently fully extinguish those controlled rectifiers.

The transistor 422 is provided to render the transistors 390 and 480 conductive whenever the voltage at the anode of the controlled rectifier 266 in FIG. 1B is low. This is desirable; because it will enable the transistor 390 to free the controlled rectifier 266 from firing signals after that controlled rectifier has been rendered conductive, and it will keep the transistor 480 from forcing the controlled rectifier 244 to become conductive while the voltage at the anode of the controlled rectifier 266 is low.

The transistor 446 is provided to render the transistor 480 conductive whenever the voltage at the anode of the controlled rectifier 244 is low. This is desirable; because it will keep the transistor 480 from causing firing signals to be supplied to the controlled rectifier 244 after that controlled rectifier has become conductive.

The transistors 364, 390, 422, 446 and 480 thus keep the controlled rectifiers 244 and 266 from becoming conductive until it is safe for those controlled rectifiers to do so. Further, those transistors stop supplying firing signals to those controlled rectifiers, after those controlled rectifiers have become conductive, and thereby make it possible for those controlled rectifiers to subsequently be fully extinguished.

The switch 63 and the resistor 361 in FIG. 1B will keep the motor from receiving a large surge of current in the event the operator of the electrically-driven vehicle appreciably depresses the accelerator pedal and then uses the forward-reverse lever, not shown, to shift the movable contact 44 into engagement with the "forward" contact 42 or the "reverse" contact 46. This is desirable; because such a large surge of current could cause the electrically-driven vehicle to start suddenly and abruptly.

The capacitors 377 and 385 in FIG. 1A minimize arcing at the relay contacts 26 and 32 when the movable contact 44 is shifted out of engagement with either of the contacts 42 and 46 into its neutral position. This is desirable; because the contacts 26 and 32 can be carrying large values of current at the time the movable contact 44 is so shifted, and those large values of current could cause hurtful arcing at those contacts.

The adjustable resistor 322 in FIG. 1B can be adjusted to substantially set the desired maximum value of current which can flow through the resistor 184 when the accelerator pedal has moved the movable contact of the potentiometer 48 down to the lower end of that potentiometer. That maximum value of current will effectively set the desired maximum reference voltage which can be developed across the resistor 184; and the accelerator pedal can then be moved to move the movable contact of the potentiometer 48 and thereby select any desired reference voltage up to and including that desired maximum.

*Condition of control system when contacts 66 and 68 of switch 70 are open*

As long as the electrically-driven vehicle, with which the control system of the present invention is used, is inactive, the contacts 66 and 68 of the switch 70 will be open. At such time, most of the current paths in that control system will be open; but a few of those current paths will be closed. For example, the junctions 138 and 139, conductor 185, resistor 184 in FIG. 1B, junctions 186 and 188, and diode 190 always connect the positive terminal of the battery 64 to the emitter of transistor 182; and junctions 192 and 194, resistor 196, junction 206, and conductor 207 always connect the collector of that transistor to the negative terminal of that battery. Similarly, junctions 138 and 139, resistor 136, junction 142, resistor 158, junctions 160 and 162, and diode 164 always connect the positive terminal of the battery 64 to the emitter of transistor 156; and junctions 166 and 168, resistor 170, junction 174, and conductor 207 always connect the collector of that transistor to the negative terminal of that battery. The resulting application of voltage to the transistors 156 and 182 will cause leakage currents to flow through those transistors.

The collector of transistor 290 is connected to the base of transistor 156 by junction 304, conductor 214, and junction 176 in FIG. 1B, and is connected to the base of transistor 182 by junctions 304 and 212 and conductor 214; and hence the voltages, which are developed at those bases by the previously-described leakage currents through the transistors 156 and 182, will be applied to the collector of the transistor 290. Also the junctions 138 and 139, conductor 185, resistor 184 in FIG. 1B, junctions 186, 188, 208, 395 and 399, resistor 210, junction 212, conductor 214, and junction 304 apply voltage to the collector of transistor 290; and, similarly, the junctions 138 and 139, resistor 136, junction 142, resistor 158, junctions 160 and 162, resistor 180, junction 176, conductor 214, and junction 304 in FIG. 1B apply a voltage to the collector of the transistor 290. Because the emitter of the transistor 290 is always connected to the negative terminal of the battery 64 by conductor 292, junction 294, conductor 295, resistor 296 in FIG. 1A, junction 200, and conductor 207, the application of these various voltages to the collector of that transistor will cause current to flow through that transistor. The resulting current flow through the resistors 180 and 210 will tend to make the bases of the transistors 156 and 182 negative, relative to the emitters of those transistors, and thus render those transistors conductive.

All of this means that the transistors 156, 182 and 290 will be conducting current even though the contacts 66 and 68 of switch 70 are open. However, the amount of current which flows through those transistors, prior to the closing of the contacts 66 and 68, will be small. That small amount of current flow is not objectionable; and the improved efficiency of operation of the control system, which is attained by having the transistors 156, 182 and 290 always connected to the battery 64, greatly out-weighs any disadvantage due to the small current drain through those transistors. Specifically, by having the transistors 156, 182 and 290 always connected to the battery 64, it is possible to obviate movable contacts and long leads in the current paths of the resistors 158 and 184. Those current paths are very critical; and the variations in resistance which movable contacts could introduce into those current paths could materially impair the overall efficiency of the control system. Also, the use of long leads for those current paths could permit inductive and capacitive effects to materially impair the overall efficiency of the control system. By having the transistors 156, 182 and 290 always connected to the battery 64, the present invention can locate those transistors close to the battery 64 and close to the resistors 136, 158 and 184 and can thereby obviate all need of movable contacts and long leads in current paths of the resistors 158 and 184—thereby avoiding impaired efficiency of operation of the control system of the present invention.

Junctions 138, 139, conductor 185, resistor 184 in FIG. 1B, junctions 186, 188 and 208, resistor 268, junction 269, and diode 440 always connect the positive terminal of the battery 64 to the junction 442; and resistor 444, junction 402, and conductor 207 always connect that junction to the negative terminal of that battery. The resulting voltage drop across the resistor 444 will not, however, be significant at this time because the open contacts 66 isolate the emitter of the transistor 422 from the positive terminal of the battery 64.

Junctions 138 and 139, fuse 74, conductor 325, junctions 324 and 363 in FIG. 1B, conductor 365, junction 367 in FIG. 1A, diode 369, junction 373, resistor 401, conductor 407, and diode 393 in FIG. 1B always connect the positive terminal of the battery 64 to the junction 395; and that junction is always connected to the negative terminal of that battery by junction 399, resistor 210, junction 212, conductor 214, junction 304, transistor 290, conductor 292, junction 294, conductor 295, resistor 296 in FIG. 1A, junction 200, and conductor 207, or by junction 208, resistor 268, junction 269, diode 440, junction 442, resistor 444, junction 402, and conductor 207, or by junctions 208 and 188, diode 190, transistor 182, junctions 192 and 194, resistor 196, junction 206, and conductor 207. Similarly, junctions 138 and 139, fuse 74, conductor 325, junctions 324 and 363 in FIG. 1B, conductor 365, junction 367 in FIG. 1A, diode 371, junction 381, resistor 403, conductor 409, and diode 397 in FIG. 1B always connect the positive terminal of the battery 64 to the junction 399; and that junction is always connected to the negative terminal of that battery by resistor 210, junction 212, conductor 214, junction 304, transistor 290, conductor 292, junction 294, conductor 295, resistor 296 in FIG. 1A, junction 206, and conductor 207, or by junctions 395 and 208, resistor 268, junction 269, diode 440, junction 442, resistor 444, junction 402, and conductor 207, or by junctions 395, 208 and 188, diode 190, transistor 182, junctions 192 and 194, resistor 196, junction 206, and conductor 207. The ohmic values of the resistors 401 and 403 are so very much greater than the ohmic value of the resistor 184 that very little current flows through the resistors 401 and 403 prior to the time the contacts 66 and 68 of switch 70 are closed and the forward-reverse lever, not shown, is used to shift the movable contact 44 into engagement with the "forward" contact 42 or the "reverse" contact 46.

*Condition of control system when contacts 66 and 68 of switch 70 are closed but contact 44 is in neutral*

If the operator of the electrically-driven vehicle closes the contacts 66 and 68 of switch 70 but leaves the forward-reverse lever, not shown, in its neutral position, the junctions 138 and 139, fuse 74, contacts 66, junction 224, conductor 227, junction 226 in FIG. 1B, resistor 222, and conductor 220 will connect the positive terminal of the battery 64 to the emitters of transistors 216 and 218. Also, the junctions 138 and 139, fuse 74, contacts 66, junction 224, conductor 227, and junctions 226 and 302 in FIG. 1B will connect the positive terminal of battery 64 to the collector of transistor 288. Because the collector of transistor 216 is always connected to the negative terminal of battery 64 by junctions 232 and 234, resistor 236, junction 198, and conductor 207, because the collector of transistor 218 is always connected to that negative terminal by junction 238, resistor 241, junction 240, resistor 242, junction 204, and conductor 207, and because the emitter of transistor 288 is always connected to that negative terminal by conductor 292, junction 294, conductor 295, resistor 296 in FIG. 1A, junction 200, and conductor 207, the closing of contacts 66 of switch 70 will apply voltage to each of the transistors 216, 218 and 288. Since transistors 156, 182 and 290 always have voltage applied to them, the closing of contacts 66 of switch 70 will make certain that voltage is applied to the transistors of all of the differential amplifiers of the control system.

As the contacts 66 of switch 70 are closed, current will flow from the positive terminal of battery 64 via junctions 138 and 139, fuse 74, contacts 66, junction 224, conductor 227, junctions 226, 302 and 312 in FIG. 1B, resistor 314, junction 316, resistor 318, junction 202, and conductor 207 to the negative terminal of that battery. Resistors 314 and 318 constitute a voltage divider, and the ohmic value of resistor 318 is several times greater than the ohmic value of resistor 314; and hence resistors 314 and 318 will maintain a voltage of about thirty volts at the base of transistor 290. The collector of transistor 288 will have the positive thirty-six volts of battery 64 applied to it by junctions 138 and 139, fuse 74, contacts 66, junction 224, conductor 227, and junctions 226 and 302 in FIG. 1B; and, therefore, the collector of transistor 288 and the base of transistor 290 will have fixed voltages applied to them. The resistors 306 and 310 constitute a voltage averaging circuit which is connected between the collectors of transistors 156 and 182; and the ohmic values of those resistors are equal. The junction 308, which is intermediate those resistors, is connected to the base of the transistor 288; and that junction, and hence the base of the transistor 288, will have a voltage which is half-way between the collector voltages of the transistors 156 and 182. The emitters of the transistors 288 and 290 are directly connected together by the conductor 292, and they have the same emitter resistor, namely, the resistor 296 in FIG. 1A.

If the currents flowing through the emitter-collector circuits of the transistors 156 and 182 are equal, and if the resulting voltage drop across each of the resistors 170 and 196 is about thirty volts, the voltage at the junction 308—and thus at the base of transistor 288—will be equal to the voltage at the base of transistor 290. At such time, the differential amplifier constituted by the transistors 288 and 290 will be in balance; and the voltage at the collector of the transistor 290—and thus at the bases of transistors 156 and 182—will be about thirty-five volts.

The voltage at the junction 308, which is intermediate the resistors 306 and 310, will equal one-half of the sum of the collector voltages of the transistors 156 and 182; and, since the loading of those transistors is, essentially, the collector resistors 170 and 196, the voltage at the junction 308 will, essentially, be proportional to the sum of the emitter currents of the transistors 156 and 182. The differential amplifier constituted by the transistors 288 and 290 will regulate the voltage at the junction 308, and will thus regulate a voltage which is essentially proportional to the sum of the emitter currents fo the differential amplifier constituted by the transistors 156 and 182. In this way, the differential amplifier constituted by the transistors 288 and 290 enables the transistors 156 and 182 to operate as a differential amplifier.

The differential amplifier constituted by the transistors 288 and 290 regulates the voltage at the junction 308 by varying the voltage at the bases of the transistors 156 and 182. Thus, if the sum of the collector voltages of the transistors 156 and 182 tends to increase, the voltage at the junction 308, and hence at the base of the transistor 288, also will tend to increase proportionately. As the base of transistor 288 tends to become more positive, that transistor will tend to become more conductive; and the voltage drop across the resistor 296 in FIG. 1A will tend to increase and to make the emitter of transistor 290 less negative relative to the base of that transistor. As a result, the transistor 290 will tend to become less conductive; and the voltage at the collector of that transistor, and hence at the bases of transistors 156 and 182, will tend to become less negative. The transistors 156 and 182 will then tend to become less conductive and thereby tend to reduce the sum of the emitter currents thereof—with a consequent reduction in the sum of the collector voltages of those transistors which will restore the voltage at junction 308 to the desired value of about thirty volts. Conversely, if the sum of the collector voltages of transistors 156 and 182 tends to decrease, the voltage at the junction 308, and hence at the base of transistor 288, also will tend to decrease proportionately. As the base of transistor 288 tends to become less positive, that transistor will tend to become less conductive; and the voltage drop across the resistor 296 in FIG. 1A will tend to decrease, and thereby tend to make the emitter of transistor 290 less positive relative to the base of that transistor. As a result, transistor 290 will tend to become more conductive; and the voltage at the collector of that transistor, and hence at the bases of transistors 156 and 182, will tend to become more negative. The transistors 156 and 182 will then tend to become more conductive and thereby tend to increase the sum of the emitter currents thereof—with a consequent increase in the sum of the collector voltages of those transistors which will restore the voltage at the junction 308 to the desired value of about thirty volts. The overall result is that the differential amplifier constituted by transistors 288 and 290 will coact with transistors 156 and 182 to essentially maintain the sum of the collector voltages—and the sum of the emitter currents of transistors 156 and 182—substantially constant.

Whenever the three differential amplifiers of the control system provided by the present invention are in balance, the voltages at the collectors of the transistors 156 and 182, and hence at the bases of the transistors 216 and 218, will be about thirty volts. The common emitter resistor 222 for the latter transistors will have six volts developed across it, and the sum of the emitter currents of those transistors will be six milliamperes. The collector current of the transistor 216 will be three milliamperes, and the collector current of the transistor 218 also will be three milliamperes; and this means that the voltage drop across the resistor 236 will be about fifteen volts, and that the voltage drops across the resistors 242 and 241 will be about fifteen volts and one and one-half volts respectively. The voltage across the resistor 236 will be applied to the series-connected Zener diode 258, resistor 260, resistor 262 and resistor 256; and the voltage across the resistor 242 will be applied to the series-connected Zener diode 280, resistor 282, resistor 284, and the paralleled resistor strings 82, 80 and 78, 90, 88 and 86, 98, 96 and 94. However, because each of the Zener diodes 258 and 280 will remain essentially non-conductive until a voltage of about twenty volts is developed across it, essentially no current will flow through the resistors 262 and 284; and hence the gate-to-cathode circuits of the controlled rectifiers 244 and 266 will not, as long as the three differential amplifiers of the control system of the present invention are in balance, have sufficient current flowing through them to cause those controlled rectifiers to fire and become conductive.

The differential amplifier constituted by the transistors 288 and 290 is particularly useful; because it avoids a phase inversion between the junction 308, which is intermediate the resistors 306 and 310, and the bases of the transistors 156 and 182. Specifically, if the sum of the collector voltages of the differential amplifier constituted by the transistors 156 and 182 tended to increase, the voltage at the junction 308—and hence at the base of transistor 288—also would tend to increase. The transistor 288 would tend to become more conductive, and the voltage drop across the common emitter resistor 296 in FIG. 1A would tend to increase—with a consequent tendency of the voltage at the emitter of transistor 290 to become less negative relative to the voltage at the base of that transistor. Thereupon, the transistor 290 would tend to become less conductive and would thereby tend to increase the voltage at the bases of the transistors 156 and 182. Conversely, if the sum of the collector voltages of the transistors 156 and 182 tended to decrease, the differential amplifier constituted by the transistors 288 and 290 would cause the voltage at the bases of the transistors 156 and 182 to tend to decrease.

The differential amplifier constituted by the transistors 216 and 218 is particularly desirable; because it will keep "firing" signals from being applied simultaneously to both of the controlled rectifiers 244 and 266. Specifically, whenever the three differential amplifiers of the control system provided by the present invention are in balance, the differential amplifier constituted by the transistors 216 and 218 will cause the voltages across the resistors 236 and 242 to be too small to permit either of the Zener diodes 258 and 280 to become conductive; and hence that differential amplifier will keep any firing signals from being supplied to the controlled rectifiers 244 and 266. If the three differential amplifiers of the control system provided by the present invention become unbalanced and cause the transistor 216 to conduct more current, the resulting tendency toward an increased current flow through the common emitter resistor 222 will tend to make the emitter of the transistor 218 less positive relative to the base of that transistor; and hence the transistor 218 will become less conductive. This is desirable; because it means that as the value of the collector current of transistor 216 increases to the point where the Zener diode 258 becomes conductive and permits sufficient current to flow through resistor 264 to fire the controlled rectifier 244, the value of the collector current of transistor 218 will decrease substantially and will make the voltage across the resistor 242 even smaller than it was—and thus very much smaller than the breakdown voltage of the Zener diode 280. Conversely, if the transistor 218 becomes more conductive, the tendency of the current flowing through the common emitter resistor 222 to increase will render the transistor 216 less conductive. This means that as the value of the collector current of transistor 218 increases to the point where the Zener diode 280 becomes conductive and permits sufficient current to flow through the resistor 284 to fire the controlled rectifier 266, the value of the collector current of transistor 216 will decrease substantially and will make the voltage across the resistor 236 even smaller than it was—and thus very much smaller than the breakdown voltage of the Zener diode 258.

The closing of the contacts 66 of switch 70 will connect the positive terminal of the battery 64 to the collector of the transistor 390 via junctions 138 and 139, fuse 74, contacts 66, junction 224, conductor 227, junction 226 in FIG. 1B, resistor 222, conductor 220, transistor 218, junction 238, and resistor 408. The emitter of that transistor is always connected to the negative terminal of that battery by junctions 392, 394 and 396, diode 398, and conductor 207; and the previously-described flow of current through the series-connected resistors 248, 420 and 414 will establish a positive voltage at the base of that transistor. Consequently, the transistor 390 will conduct heavily; and hence will act as a small resistance connected in parallel with the resistor 242. Because the transistor 390 acts as a small resistance in parallel with the resistor 242, the voltage across the latter resistor will necessarily be small; and that voltage will be so small that the Zener diode 280 will prevent the flow of current through the series-connected resistor 282, resistor 284 and the paralleled resistor strings 82, 80 and 78, 90, 88 and 86, and 98, 96 and 94. Because no current can flow through the resistor 284, no current will flow through the gate-to-cathode circuit of the controllled rectifier 266; and hence that controlled rectifier will remain non-conductive. All of this means that as the contacts 66 are closed, the transistor 390 will become conductive and will keep the controlled rectifier 266 from becoming conductive. This is desirable; because that controlled rectifier should not be rendered conductive until the capacitor 124 in FIG. 1A has been properly charged.

Also as the contacts 66 of switch 70 are closed, the positive terminal of the battery 64 will be connected to the right-hand terminal of the capacitor 124 by junctions 138 and 139, fuse 74, contacts 66, junction 224, resistor 248, junction 246, diode 245, and junctions 247 and 126. The left-hand terminal of that capacitor will be connected to the negative terminal of that battery by junctions 128, 104, 102 and 106, the parallel-connected controlled rectifier 76 and resistor 78, controlled rectifier 84 and resistor 86, and controlled rectifier 92 and resistor 94, and junctions 108, 110 and 112, and conductor 207. While all of the controlled rectifiers 76, 84 and 92 will essentially be non-conductive, minute amounts of current will leak through those controlled rectifiers. That leakage current will permit the capacitor 124 to start charging, with the right-hand terminal thereof positive. Current also can leak through the following paths: junctions 138 and 139, conductor 185, resistor 184 in FIG. 1B, junctions 186, 188 and 208, resistor 268, junctions 269 and 270, conductor 441, junctions 167, 106, 104 and 102 in FIG. 1A, the parallel-connected controlled rectifier 76 and resistor 78, controlled rectifier 84 and resistor 86, and controlled rectifier 92 and resistor 94, junctions 108, 110 and 112, and conductor 207; and junctions 138 and 139, resistor 136, junction 142, resistor 158, junction 160, Zener diode 161, junction 163, resistor 165, junctions 167, 106, 104 and 102 the parallel-connected controlled rectifier 76 and resistor 78, controlled rectifier 84 and resistor 86, and controlled rectifier 92 and resistor 94, and junctions 108, 110 and 112, and conductor 207. The flow of leakage current through the parallel-connected controlled rectifier 76 and resistor 78, controlled rectifier 84 and resistor 86, and controlled rectifier 92 and resistor 94 will establish a voltage of about twenty-one volts at the anodes of those controlled rectifiers, and thus at the left-hand terminal of the capacitor 124. As a result, the capacitor 124 will tend to charge until it has about fifteen volts across it.

As the contacts 66 of switch 70 are closed, the positive terminal of the battery 64 is connected to the collector of the transistor 364 in FIG. 1B by junctions 138 and 139, fuse 74, contacts 66, junction 224, conductor 227, junctions 226, 302, 312, 428, 448 and 450, resistor 484, junction 482, diode 486, junction 374, and resistor 372; and the emitter of that transistor is always connected to the negative terminal of that battery by junction 370 and conductor 207. However the voltage at the base of that transistor will essentially be the voltage at the negative terminal of the battery 64, and hence that transistor will essentially be non-conductive. As a result, when the contacts 66 are closed, the transistor 364 will act as a high resistance in parallel with the resistor 236 in FIG. 1A; and that is desirable, because it will permit an appreciable voltage to be developed across that resistor.

Further, as the contacts 66 are closed, current will flow from the positive terminal of the battery 64 via junctions 138 and 139, fuse 74, contacts 66, junction 224, conductor 227, junctions 226, 302, 312 and 428 in FIG. 1B, resistor 426, junction 424, resistor 430, junctions 392, 394 and 396, diode 398, and conductor 207 to the negative terminal of that battery; and the resulting flow of current through the resistors 426 and 430 will provide a voltage of about thirty-one and one-half volts at the emitter of transistor 422. Because the leakage currents through the controlled rectifiers 76, 84 and 92 are holding the voltages at junctions 102, 104 and 106—and hence the voltage at junction 269 in FIG. 1B—at about twenty-one volts, the voltage at junction 442, and thus at the base of transistor 442, will be much less positive than the voltage at the emitter of that transistor. Consequently, the transistor 422 will be conductive.

Because the transistor 422 is conductive, current will flow from the postive terminal of the battery 64 via junctions 138 and 139, fuse 74, contacts 66, junction 224, conductor 227, junctions 226, 302, 312 and 428 in FIG. 1B, resistor 426, junction 424, and transistor 422 to junction 432; and then in part through resistor 436, junction 412, resistor 414, and junction 400 to the conductor 207 and in part through resistor 434, junctions 458 and 460, resistor 462, junction 406 to the conductor 207, and thence to the negative terminal of that battery. The flow of current through transistor 422 and resistor 414 will help keep the transistor 390 conductive. The flow of current through transistor 422 and resistor 462 will make the voltage at junction 460, and thus at the base of transistor 480, more positive than the voltage at the emitter of that transistor. As a result, the transistor 480 will be conductive and will make the anode of diode 486 negative relative to the cathode of that diode—thereby back-biasing that diode and rendering it non-conductive.

Additionally, as the contacts 66 of switch 70 are closed, current will flow from the positive terminal of the battery 64 via junctions 138 and 139, fuse 74, contacts 66, junction 224, conductor 227, junctions 226, 302, 312, 428 and 448 in FIG. 1B, resistor 464, junction 466, resistor 468, junctions 458 and 460, resistor 462, junction 406, and conductor 207 to the negative terminal of that battery. The ohmic value of the resistor 462 is so small, relative to the combined ohmic values of the resistors 464 and 468, that only a very small voltage drop will appear across the former resistor because of the current flowing through the resistors 464, 468 and 462. However, the current flowing through resistor 426, transistor 422, resistor 434, and resistor 462 will make the voltage drop across the latter resistor large enough to keep the transistor 480 conductive.

Further, as the contacts 66 are closed, current will flow from the positive terminal of the battery 64 via junctions 138 and 139, fuse 74, contacts 66, junction 224, resistor 248, junction 246, diode 245, junction 247, conductor 417, junction 416 in FIG. 1B, diode 478, junction 472, resistor 474, junction 404, and conductor 207 to the negative terminal of that battery. The ohmic value of the resistor 474 is many times greater than the ohmic value of the resistor 248; whereas the combined ohmic values of resistors 468 and 462 are less than the ohmic value of the resistor 464. As a result, the current flowing through the resistors 248 and 474, and the current flowing through the resistors 464, 468 and 462 will make the cathode of diode 470 more positive than the anode of that diode; and hence that diode will be back-biased and will be held non-conductive. Current will also flow from the positive terminal of the battery 64 via junctions 138 and 139, fuse 74, contacts 66, junction 224, conductor 227, junctions 226, 302, 312, 428, 448 and 450 in FIG. 1B, resistor 452, junction 454, resistor 456, junctions 394 and 396, diode 398, and conductor 207 to the negative terminal of that battery; and that flow of current will establish a small voltage at the emitter of transistor 446. Because the diode 470 is held non-conductive, the current flowing through the resistors 464, 468 and 462 will determine the voltage at the base of transistor 446; and that voltage will be considerably more positive than the voltage at the emitter of that transistor. Consequently the transistor 446 will essentially be non-conductive.

Moreover, as the contacts 66 of switch 70 are closed, the junctions 138 and 139, the fuse 74, the contacts 66, junction 224, resistor 248, and junction 246 will connect the positive terminal of the battery 64 to the anode of the controlled rectifier 244. The cathode of that controlled rectifier is always connected to the negative terminal of that battery by junctions 254, 252 and 250, resistor 256, junctions 120 and 118, and conductor 207; and hence the closing of the contacts 66 will apply a voltage to that controlled rectifier.

In the said one preferred embodiment of control system provided by the present invention, the resistors 170 and 196—connected, respectively, to the collectors of the transistors 156 and 182—have the same ohmic values, the transistors 156 and 182 are substantially identical, and the resistors 180 and 210 have the same ohmic values; but the ohmic value of the resistor 158 is one hundred and eighty ohms whereas the ohmic value of the resistor 184 is only thirty-three ohms. Also, the ohmic value of resistor 268 is ten thousand ohms, whereas the ohmic resistance of resistor 444 is one hundred thousand ohms. The total of the emitter-base current and of the emitter-collector current of the transistor 156 will, prior to the time the movable contact 44 is moved into engagement with the "forward" contact 42 or the "reverse" contact 46, be approximately one milliampere; and those currents will add to the leakage current which flows through the series-connected resistors 136 and 158 to drop the voltage of the junction 162 more than one hundred and eighty millivolts below the voltage at the positive terminal of the battery 64. The total of the emitter-base current and of the emitter-collector current of the transistor 182 will, prior to the time the movable contact 44 is moved into engagement with the "forward" contact 42 or the "reverse" contact 46, be approximately one milliampere; and those currents will add to the current flowing through series-connected resistors 184, 268, and 444 and to the leakage current flowing through resistors 184 and 268 and the parallel-connected controlled rectifier 76 and resistor 78, controlled rectifier 84 and resistor 86, and controlled rectifier 92 and resistor 94, to drop the voltage at the junction 188 more than thirty-three millivolts but less than one hundred and eighty millivolts below the voltage at the positive terminal of the battery 64. Because the voltages at the bases of the transistors 156 and 182 are always equal, the less positive voltage at the junction 162 will make the transistor 156 less conductive than the transistor 182; and the resulting decrease in voltage drop across the resistor 170 will tend to decrease the sum of the collector voltages of the transistors 156 and 182. The voltage at the junction 308 will decrease proportionately, and hence the base of transistor 288 will become less positive—with a consequent decrease in the conductivity of transistor 288 and with a consequent tendency of the current flowing through the common emitter resistor 296 in FIG. 1A to decrease. The resulting tendency of the emitter of transistor 290 to become more negative will tend to make that transistor more conductive; and, as that transistor tends to become more conductive, the voltage at the collector thereof—and hence at the bases of the transistors 156 and 182—will tend to become less positive. Thereupon, the transistors 156 and 182 will become sufficiently more conductive to raise the sum of the collector voltages of transistors 156 and 182—and thus the voltage at the junction 308—to their normal values. The increased conductivity of the transistor 182 will make the voltage drop across the resistor 170 considerably smaller than the voltage drop across the resistor 196; and hence the voltage at the junction 166, and thus at the base of the transistor 216, will be considerably more negative than the voltage at the junction 192, and thus at the base of the transistor 218. This means that the transistor 216 will be considerably more conductive than the transistor 218, and hence considerably more current will flow through the resistor 236 than will flow through the resistor 242. The resistors 236 and 242 have the same ohmic values; and the considerably greater current flowing through the former resistor will make the voltage at the upper terminal of that resistor, and thus at the junction 234, considerably more positive than the voltage at the upper trminal of the resistor 242, and thus at the junction 240. Because the resistors 260 and 282 have the same ohmic values, because the resistors 262 and 284 have the same ohmic values, and because the ohmic values of resistors 256, 78, 80, 82, 86, 88, 90, 94, 96 and 98 are insignificant relative to the ohmic value of any of the resistors 260, 262, 282 and 284, a considerably larger voltage will develop across the resistor 262 than will develop across the resistor 284.

Moreover, as the contacts 66 of switch 70 are closed, current will flow from the positive terminal of the battery 64 via junctions 138 and 139, fuse 74, contacts 66, junction 224, conductor 227, junctions 226, 302, 312, 428, 448 and 450, resistor 484, junction 482, transistor 480, junction 396, diode 398, and conductor 207 to the negative terminal of that battery. Because the diode 486 is back-biased, essentially no current will flow through that diode, junction 374, conductor 375, junction 232 in FIG. 1A, junction 234, resistor 236, junction 198, and conductor 207 to the negative terminal of the battery 64.

Further, as the contacts 66 of switch 70 are closed, junctions 138 and 139, fuse 74, contacts 66, junction 224, resistor 248, junction 246, diode 245, and junctions 247 and 126 connect the positive terminal of the battery 64 to the anode of the controlled rectifier 122; and the cathode of that controlled rectifier is always connected to the negative terminal of that battery by junctions 120 and 118, and the conductor 207. As a result, a voltage will be applied to the controlled rectifier 122; and, as the controlled rectifier 244 becomes conductive, current will flow from the positive terminal of the battery 64 via junctions 138 and 139, fuse 74, contacts 66, junction 224, resistor 248, junction 246, controlled rectifier 244, junctions 254, 252 and 250, the gate-to-cathode circuit of controlled rectifier 122, junctions 120 and 118, and conductor 207 to the negative terminal of that battery. Thereupon, the controlled rectifier 122 will become conductive; and current will then flow from the positive terminal of the battery 64 via junctions 138 and 139, fuse 74, contacts 66, junction 224, resistor 248, junction 246, diode 245, junctions 247 and 126, controlled rectifier 122, junctions 120 and 118, and conductor 207 to the negative terminal of that battery. Current will continue to flow through resistor 248, diode 245, and controlled rectifier 122 to keep that controlled rectifier conductive.

As the controlled rectifier 122 becomes conductive the voltage at the anode thereof, and hence the voltage at the right-hand side of the capacitor 124, will drop; and that voltage will closely approach the voltage at the negative terminal of the battery 64. Because the capacitor 124 can not discharge instantaneously, the voltage at the left-hand terminal of that capacitor also will drop; and, momentarily, the voltage at the base of transistor 422 will drop. The drop in voltage at the base of transistor 442 is not significant at that time, because that transistor is already conductive; and, because that transistor is conductive, the transistors 390 and 480 will continue to remain conductive.

Also as the voltage at the anode of the controlled rectifier 122 closely approaches the voltage at the negative terminal of the battery 64, the voltage at the junction 472 will drop below the level of the voltage at the junction 466, and will thus eliminate the reverse bias on the diode 470. Thereupon, current will begin to flow from the positive terminal of the battery 64 via junctions 138 and 139, fuse 74, contacts 66, junction 224, conductor 227, junctions 226, 302, 312, 428 and 448 in FIG. 1B, resistor 464, junction 466, diode 470, junction 472, resistor 474, junction 404, and conductor 207 to the negative terminal of that battery. The ohmic value of the resistor 474 is very small, compared to the ohmic value of the resistor 464; and hence the voltage at the junction 466, and thus at the base of the transistor 446, will be considerably less positive than the voltage at the junction 454, and thus at the emitter of that transistor. Thereupon, that transistor will become conductive; and current will flow from the positive terminal of the battery 64 via junctions 138 and 139, fuse 74, contacts 66, junction 224, conductor 227, junctions 226, 302, 312, 428, 448 and 450, resistor 452, junction 454, transistor 446, junction 460, resistor 462, junction 406, and conductor 207 to the negative terminal of that battery. The resulting voltage drop across the resistor 462 will make the base of the transistor 480 more positive than the emitter of that transistor, and hence will additionally make sure that the transistor 480 is conductive. This means that both the transistor 422 and the transistor 446 are helping hold the transistor 480 conductive; and hence are eliminating the flow of current through resistor 484, diode 486, and resistor 236 which enabled the resistor 262 to fire the controlled rectifier 244.

At this time, the series-connected capacitor 124 and controlled rectifier 122 will act as a low impedance in parallel with the paralleled controlled rectifier 76 and resistor 78, controlled rectifier 84 and resistor 86, and controlled rectifier 92 and resistor 94; and hence the voltage at the anodes of the controlled rectifiers 76, 84 and 92, and thus at the base of transistor 422, will be less than the voltage at the emitter of that transistor. This means that the transistor 422 will continue to be conductive and will continue to keep the transistors 390 and 480 conductive. Leakage current will flow from the positive terminal of the battery 64 via junctions 138 and 139, conductor 185, resistor 184 in FIG. 1B, junctions 186, 188 and 208, resistor 268, junctions 269 and 270, conductor 441, junctions 167, 106, 104 and 128 in FIG. 1A, capacitor 124, junction 126, controlled rectifier 122, junctions 120 and 118, and conductor 207 to the negative terminal of that battery; and leakage current also will flow from the positive terminal of the battery 64 via junctions 138 and 139, resistor 136, junction 142, resistor 158, junction 160, Zener diode 161, junction 163, resistor 165, junctions 167, 106, 104 and 128, and capacitor 124, junction 126, controlled rectifier 122, junctions 120 and 118, and conductor 207 to the negative terminal of that battery. Those leakage currents will cause the capacitor 124 to discharge and then start charging so the left-hand terminal thereof is positive.

The controlled rectifier 122 will continue to be conductive, the capacitor 124 will become charged to about fifteen volts and will have the left-hand terminal thereof positive, the controlled rectifier 244 will remain conductive, the transistor 364 will remain essentially non-conductive, the transistors 390, 422, 446 and 480 will remain conductive, and transistor 390 will keep the controlled rectifier 266 from becoming conductive as long as the contacts 66 and 68 of the switch 70 remain closed and the movable contact 44 remains in its "neutral" position.

The closing of the contacts 68 of switch 70 will connect the negative terminal of the battery 64 to the movable contact 62 of the switch 58 via junction 114, fuse 72, contacts 68 and conductor 73. However, because that movable contact is out of engagement with the stationary contact 60, no current will flow. Even if the operator was pressing on the accelerator pedal, and thus held the movable contact 58 in engagement with the stationary contact 60, no current could flow because the movable contact 44 is in its "neutral" position.

All of this means that after the contacts 66 and 68 of switch 70 are closed, but before the movable contact 44 is moved into engagement with the "forward" contact 42 or the "reverse" contact 46, the transistor 390 will become conductive and will remain conductive to hold the voltage across the resistor 242 to such a low value that the resistor 284 can not render the controlled rectifier 266 conductive, the controlled rectifier 244 will become conductive to render the controlled rectifier 122 conductive, the capacitor 124 will start to charge with the right-hand terminal thereof positive but will discharge as the controlled rectifier 122 becomes conductive and will then charge with the left-hand terminal thereof positive, the transistor 422 will become conductive to keep the transistor 390 conductive and to render the transistor 480 conductive, and the transistor 446 will become conductive to help keep the transistor 480 conductive. The overall result is that the controlled rectifier 266 will be kept from becoming conductive, and will thus be kept from supplying a firing signal to the controlled rectifiers 76, 84 and 92; whereas the controlled rectifier 122 will be rendered conductive and will facilitate the charging of the capacitor 124 with the left-hand terminal thereof positive.

*Contact 44 is moved into engagement with "forward" contact 42*

If, after closing the contacts 66 and 68 of the switch 70, the operator uses the forward-reverse lever, not shown, to move the contact 44 into engagement with the "forward" contact 42 but does not press on the accelerator pedal, no change will occur in the condition of the control system. However, if the operator thereafter depresses that accelerator pedal, the movable contact 58 of the switch 62 will move into engagement with the stationary contact 60 of that switch; and, thereupon, current will flow from the positive terminal of the battery 64 via junctions 138 and 139, fuse 74, conductor 325, junctions 324, 321 and 323 in FIG. 1B, the movable contact 59 and the stationary contact 61 of switch 63, junctions 327 and 339, diode 343, junctions 345 and 353, relay coil 338, junctions 340 and 389, contacts 42 and 44, contacts 60 and 58 of switch 62, conductor 73, contacts 68 in FIG. 1A, fuse 72, and junction 114 to the negative terminal of that battery. The resulting flow of current through the relay coil 338 will energize that coil; and, as that coil becomes energized, it will move the movable contact 26 out of engagement with the fixed contact 24 and into engagement with the fixed contact 28, and it will also close the holding contacts 351. The closing of the holding contacts 351 will cause current to flow from the positive terminal of the battery 64 via junctions 138 and 139, fuse 74, conductor 325, junctions 324 and 321 in FIG. 1B, holding contacts 351, junction 353, coil 338, junctions 340 and 389, contacts 42 and 44, contacts 60 and 58 of switch 62, conductor 73 contacts 68 in FIG. 1A, fuse 72, and junction 114 to the negative terminal of that battery; and hence the closing of the holding contacts 351 will keep the coil 338 energized.

As the contact 26 moves into engagement with the contact 28, the junctions 138 and 139, resistor 136, junction 142, armature winding 20, junction 146, contacts 30 and 32, field winding 22, contacts 26 and 28, and junctions 148, 128, 104, 102 and 106 will connect the positive terminal of the battery 64 to the anodes of the controlled rectifiers 76, 84 and 92 and also to the left-hand terminal of the capacitor 124. Because that capacitor has only been charged to about fifteen volts, that capacitor and the controlled rectifier 122 will act as a low impedance in parallel with the parallel-connected controlled rectifier 76 and resistor 78, controlled rectifier 84 and resistor 86, and controlled rectifier 92 and resistor 94; and hence the voltage at the anodes of those controlled rectifiers, and thus at the base of transistor 422, will initially be about fifteen volts. This means that the transistor 422, and hence the transistor 390, will remain conductive for at least a moment after the contact 44 is moved into engagement with the "forward" contact 42.

Because the ohmic values of resistor 136, armature winding 20, and field winding 22 are very low, capacitor 124 will charge rapidly; and, as that capacitor becomes charged, the voltage at the left-hand terminal thereof, and also at the base of the transistor 422, will approach the voltage at the positive terminal of the battery 64. When the voltage at the left-hand terminal of that capacitor, and thus at the base of transistor 422, rises above thirty-two volts, the voltage at the base of that transistor will exceed the voltage at the emitter of that transistor, and hence that transistor will become non-conductive.

The transistor 390 will then promptly become non-conductive; because current will no longer flow through resistor 426, transistor 422, and resistors 436 and 414, and because the voltage at the junction 416 will be too small to make the voltage at junction 412 sufficiently positive to keep that transistor conductive. This means that the transistor 390 will no longer inhibit the firing of controlled rectifier 266—as by acting as a small resistance in parallel with the resistor 242.

If the operator of the electrically-driven vehicle had depressed the accelerator pedal just far enough to close the switch 62 in FIG. 1B, the voltage drop across the resistor 184 would still be less than the voltage drop across the resistor 158 in FIG. 1A, and the differential amplifiers would be establishing a large voltage drop across resistor 236 and only a small voltage drop across resistor 242. Consequently, although the transistor 390 would no longer be inhibiting the firing of the controlled rectifier 266, the differential amplifiers would not be supplying a firing signal to that controlled rectifier; and hence that controlled rectifier would still be non-conductive.

However, if the operator of the electrically-driven vehicle had depressed the accelerator pedal far enough to cause an appreciable amount of current to flow from the positive terminal of battery 64 via junctions 138 and 139, conductor 185, resistor 184 in FIG. 1B, junction 186, resistor 320, the upper section and movable contact of adjustable resistor 322, the movable contact and lower section of potentiometer 48, contacts 50 and 52 of switch 56, junction 350, diode 348, junctions 341, 340 and 389, contacts 42 and 44, switch 62, conductor 73, contacts 68 in FIGURE 1A, fuse 72, and junction 114 to the negative terminal of the battery, the overall voltage drop across resistor 184 would exceed the voltage drop across the resistor 158. Because the voltages at the bases of the transistors 156 and 182 are always equal, the less positive voltage at the junction 188 would make the transistor 182 less conductive than the transistor 156; and the resulting decrease in voltage drop across the resistor 196 would tend to decrease the sum of the collector voltages of the transistors 156 and 182. The voltage at the junction 308 would decrease proportionately, and hence the base of transistor 288 would become less positive—with a consequent decrease in the conductivity of transistor 288 and with a consequent tendency of the current flowing through the common emitter resistor 296 in FIG. 1A to decrease. The resulting tendency of the emitter of transistor 290 to become more negative would tend to make that transistor more conductive; and, as that transistor tends to become more conductive, the voltage at the collector thereof—and hence at the bases of the transistors 156 and 182—would tend to become less positive. Thereupon, the transistors 156 and 182 would become sufficiently more conductive to raise the sum of the collector voltages of transistors 156 and 182—and thus the voltage at the junction 308—to their normal values. The increased conductivity of the transistor 156 would make the voltage drop across the resistor 170 considerably larger than the voltage drop across the resistor 196; and hence the voltage at the junction 192, and thus at the base of the transistor 218, would be considerably more negative than the voltage at the junction 166, and thus at the base of the transistor 216. This means that the transistor 218 would be considerably more conductive than the transistor 216; hence considerably more current would flow through the resistor 242 than would flow through the resistor 236.

The considerably greater current flowing through the former resistor would make the voltage at the upper terminal of that resistor, and thus at the junction 240, considerably more positive than the voltage at the upper terminal of the resistor 236, and thus at the junction 234. As a result, a considerably larger voltage would develop across the resistor 242; and, thereupon, the Zener diode 280 would become conductive and current would flow from the positive terminal of the battery 64 via junctions 138 and 139, fuse 74, contacts 66, junction 224, conductor 227, junction 226 in FIG. 1B, resistor 222, conductor 220, transistor 218, junction 238, resistor 241, junction 240, Zener diode 280, resistors 282 and 284, junctions 274 and 272, conductor 271, junctions 276 and 278 in FIG. 1A, the paralleled resistor strings 82, 80 and 78, 90, 88 and 86, and 98, 96 and 94, junctions 108, 110 and 112, and conductor 207 to the negative terminal of that battery. The resulting voltage drop across the resistor 284 would cause current to flow through the gate-to-cathode circuit of the controlled rectifier 266, and would thus render that controlled rectifier conductive. Thereupon, current would flow from the positive terminal of the battery 64 via junctions 138 and 139, resistor 136, junction 142, armature winding 20, junction 146, contacts 30 and 32, field winding 22, contacts 26 and 28, junctions 148, 128, 104, 106 and 167, conductor 441, junction 270 in FIG. 1B, controlled rectifier 266, junctions 274 and 272, conductor 271, junctions 276 and 278 in FIG. 1A, the paralleled resistor 82, gate-to-cathode circuit of controlled rectifier 76 and resistor 78, resistor 90, gate-to-cathode circuit of controlled rectifier 84 and resistor 86, and resistor 98, gate-to-cathode circuit of controlled rectifier 92 and resistor 94, junctions 108, 110 and 112, and conductor 207 to the negative terminal of that battery; and current also would flow from the positive terminal of the battery 64 via junctions 138 and 139, conductor 185, resistor 184 in FIG. 1B, junction 186, 188 and 208, resistor 268, junctions 269 and 270, controlled rectifier 266, junctions 274 and 272, conductor 271, junctions 276 and 278 in FIG. 1A, the parallelel resistor 82, gate-to-cathode circuit of controlled rectifier 76 and resistor 78, resistor 90, gate-to-cathode circuit of controlled rectifier 84 and resistor 86, and resistor 98, the gate-to-cathode circuit of controlled rectifier 92 and resistor 94, junctions 108, 110, and 112, and conductor 207 to the negative terminal of that battery. The resulting flow of current through the gate-to-cathode circuits of the controlled rectifiers 76, 84, and 92 would render these controlled rectifiers conductive.

In such event, current will flow from the positive terminal of the battery 64 via junctions 138 and 139, resistor 136, junction 142, armature winding 20, junction 146, contacts 30 and 32, field winding 22, contacts 26 and 28, junctions 148, 128, 104, 102 and 106, paralleled controlled rectifier 76 and resistor 78, controlled rectifier 84 and resistor 86, and controlled rectifier 92 and resistor 94, junctions 108, 110 and 112, and conductor 207 to the negative terminal of that battery. The resulting flow of current will cause the rotor of the motor to start rotating, and the rotation of that rotor will cause the electrically-driven vehicle to start moving in the forward direction. Current will also flow from the positive terminal of the battery 64 via junctions 138 and 139, conductor 185, resistor 184 in FIG. 1B, junctions 186, 188 and 208, resistor 268, junctions 269 and 270, conductor 441, junctions 167, 106, 104 and 102 in FIG. 1A, paralleled controlled rectifier 76 and resistor 78, controlled rectifier 84 and resistor 86, and controlled rectifier 92 and resistor 94, junctions 108, 110 and 112, and conductor 207 to the negative terminal of that battery. That flow of current will sharply increase the voltage drop across the resistor 184, and will thus make the voltage at the emitter of transistor 182 even less positive relative to the voltage at the emitter of transistor 156. The sharply increased voltage drop across the resistor 184 will not increase the conductivity of the controlled rectifiers 76, 84 and 92, because those controlled rectifiers become fully conductive when they are fired. However, that sharply increased voltage drop will sharply increase the level of the current which must flow through the resistor 136 to again make the emitter of transistor 156 less positive than the emitter of transistor 182.

As the controlled rectifier 266 became conductive, current started to flow from the left-hand terminal of the capacitor 124 via jnuctions 128, 104, 106 and 167, conductor 441, junction 270 in FIG. 1A, controlled rectifier 266, junctions 274 and 272, conductor 271, junctions 276 and 278 in FIG. 1A, the paralleled resistor strings 82, 80 and 78, 90, 88 and 86, and 98, 96 and 94, junctions 108, 110, 112 and 118, inductor 132, junction 130, diode 134, and junction 126 to the right-hand terminal of that capacitor. In addition, as the controlled rectifier 266 became conductive, current tended to flow from the left-hand terminal of capacitor 124 via junctions 128, 104, 106 and 167, conductor 441, junction 270 in FIG. 1B, controlled rectifier 266, junctions 274 and 272, conductor 271, junctions 276 and 278 in FIG. 1A, the paralleled resistor strings 82, 80 and 78, 90, 88 and 86, and 98, 96 and 94, junctions 108, 110, 112, 118 and 120, controlled rectifier 122, and junction 126 to the right-hand terminal of that capacitor; and current also tended to flow from the left-hand terminal of capacitor 124 via junctions 128, 104, 106 and 167, conductor 441, junction 270 in FIG. 1B, controlled rectifier 266, junctions 274 and 272, conductor 271, junctions 276 and 278 in FIG. 1A, the paralleled resistor strings 82, 80 and 78, 90, 88 and 86, and 98, 96 and 94, junctions 108, 110, 112, 118 and 120, resistor 256, junctions 250, 252 and 254, controlled rectifier 244, junction 246, diode 245, and junctions 247 and 126 to the right-hand terminal of that capacitor. The consequent inverse current flow through the controlled rectifiers 122 and 244 will start rendering those controlled rectifiers non-conductive. The diode 264 will limit the voltage which can be developed across the cathode-to-gate circuit of the controlled rectifier 244, and will thus protect that controlled rectifier against injury.

Further, as the controlled rectifier 266 became conductive, the difference of potential between the conductors 441 and 207, and hence the voltage across the resistor 444 in FIG. 1B, decreased to just a few volts; and, as a result, the base of the transistor 422 again became more negative than the emitter of that transistor, and again caused that transistor to become conductive. The resulting flow of current through resistor 426, transistor 422, resistor 436, and resistor 414 will again make the base of the transistor 390 more positive than the emitter of that transistor, and will again render that transistor conductive. At such time the transistor 390 will act as a small resistance in parallel with the resistor 242; and hence the voltage across that resistor will become too small for the voltage across the resistor 284 to continue to supply a firing signal to the controlled rectifier 266.

In the event any one of the controlled rectifiers 76, 84 and 92 tended to become conductive before the other two of those controlled rectifiers became conductive, the voltage drop across the resistor between the cathode of that controlled rectifier and the conductor 207 would be large enough to enable the controlled rectifier 266 to develop a sufficiently large voltage between the conductor 271 and the conductor 207 to force enough current through the gate-to-cathode circuits of those other controlled rectifiers to render those other controlled rectifiers conductive. Also, as the controlled rectifiers 76, 84 and 92 conduct current, one of those controlled rectifiers could tend to conduct appreciably more than its aliquot share of the total current flowing through resistor 136, armature winding 20, and field winding 22. However, the resistor which is connected between the cathode of that controlled rectifier and the conductor 207 will limit the amount of current which can flow through that controlled rectifier, and will thus keep that controlled rectifier from carrying so much current that it can be injured.

As the controlled rectifiers 76, 84 and 92 became conductive, the voltage at the left-hand terminal of the capacitor 124 dropped close to the voltage at the negative terminal of the battery 64; and, because a capacitor can not discharge instantaneously, the voltage at the right-hand terminal of the capacitor 124 became negative relative to the voltage at the negative terminal of the battery 64. The resulting application of negative voltage to the anode of controlled rectifier 122 is desirable because it helped extinguish that controlled rectifier. Current also flowed from the left-hand terminal of capacitor 124 via junctions 128, 104, 102 and 106, the paralleled controlled rectifier 76 and resistor 78, controlled rectifier 84 and resistor 86, and controlled rectifier 92 and resistor 94, junctions 108, 110, 112, 118, 174, 198, 200, conductor 207, junctions 202, 249, 204 and 206 in FIG. 1B to the junction 366, and then in part via junction 368, resistor 380, junction 376, and resistor 378, and in part via diode 388 to junction 386, and then via capacitor 382, conductor 383, junction 130 in FIG. 1A, diode 134, and junction 126 to the right-hand terminal of capacitor 124; and the resulting flow of current through capacitor 382 will immediately charge that capacitor and make the bottom terminal thereof positive. The diode 388 will limit the voltage applied to the emitter-base circuit of the transistor 364, and will thus protect that transistor against injury.

Also as the controlled rectifiers 76, 84 and 92 became conductive, they provided a low resistance path between the terminals of the capacitor 124—that path extending from the left-hand terminal of that capacitor via junctions 128, 104, 102 and 106, the paralleled controlled rectifier 76 and resistor 78, controlled rectifier 84 and resistor 86, and controlled rectifier 92 and resistor 94, junctions 108, 110, 112 and 118, inductor 132, junction 130, diode 134, and junction 126 to the right-hand terminal of that capacitor. Further, as the controlled rectifiers 76, 84 and 92 became conductive, current tended to flow from the left-hand terminal of capacitor 124 via junctions 128, 104, 102 and 106, the paralleled controlled rectifier 76 and resistor 78, controlled rectifier 84 and resistor 86, and controlled rectifier 92 and resistor 94, junctions 108, 110, 112, 118 and 120, controlled rectifier 122, and junction 126 to the right-hand terminal of that capacitor; and current also tended to flow from the left-hand terminal of capacitor 124 via junctions 128, 104, 102 and 106, the paralleled controlled rectifier 76 and resistor 78, controlled rectifier 84 and resistor 86, and controlled rectifier 92 and resistor 94, junctions 108, 110, 112, 118 and 120, resistor 256, junctions 250, 252 and 254, controlled rectifier 244, junction 246, diode 245, and junctions 247 and 126 to the right-hand terminal of that capacitor. The diode 264 will limit the voltage that can be developed across the cathode-to-gate circuit of the controlled rectifier 244, and will thus protect that controlled rectifier against injury.

The capacitor 124 and the inductor 132 constitute a series resonant circuit; and that series resonant circuit will start to oscillate at the series resonant frequency of that circuit—and the resulting flow of current in that series resonant circuit will discharge that capacitor and then charge that capacitor with the right-hand terminal of that capacitor positive—thereby reversing the polarity of that capacitor. The diode 134 will permit the series resonant circuit to experience just one half-cycle of oscillation; and hence the right-hand terminal of the capacitor 124 will become positive and then tend to remain positive. The series resonant circuit should have a high Q, to minimize the dissipation of the energy that was stored in the capacitor 124; and the inductor 132 should have a high value of inductance, to limit the peak value of the oscillating current and also to enable that inductor to maintain an appreciable voltage across itself for a long enough time to make sure that the inverse currents flowing through the controlled rectifiers 122 and 244 can fully extinguish those controlled rectifiers. In the said one preferred embodiment of control system provided by the present invention, the half-cycle of oscillation will maintain an appreciable voltage across the inductor 132 for approximately four milliseconds. If the series resonant circuit did not experience losses, the half-cycle of oscillation would charge the right-hand terminal of the capacitor 124 to a voltage substantially equal to the voltage across the battery 64; but, because that series resonant circuit does experience some losses, the voltage at the right-hand terminal of the capacitor will only rise to about twenty-four volts. The subsequent flow of current from the positive terminal of the battery 64 via junctions 138 and 139, fuse 74, contacts 66, junction 224, resistor 248, junction 246, diode 245, junctions 247 and 126, capacitor 124, junctions 128, 104, 102 and 106, the paralleled controlled rectifier 76 and resistor 78, controlled rectifier 84 and resistor 86, and controlled rectifier 92 and resistor 94, junctions 108, 110, and 112, and conductor 207 to the negative terminal of that battery will tend to further charge that capacitor.

As the half-cycle of oscillation causes the polarity of the capacitor 124 to reverse, the capacitor 382 will be able to discharge; and that capacitor will cause current to flow from the lower terminal thereof via junction 386, resistor 378, junction 376, resistor 380, junctions 368, 366, 206, 204, 249 and 202, conductor 207, junctions 200, 198, 174 and 118 in FIG. 1A, inductor 132, junction 130, and conductor 383 to the upper terminal of that capacitor. The resulting flow of current through resistor 380 will make the base of the transistor 364 positive relative to the emitter of that transistor; and, thereupon, that transistor will become conductive and will act as a low resistance in parallel with the resistor 236 in FIG. 1A. As a result, the voltage across the resistor 236 will not be able to rise to a sufficently high level to cause the Zener diode 258 to become conductive and permit current to flow through the resistor 262 to cause firing of the controlled rectifier 244.

The capacitor 382 will repsond to the voltage across the inductor 132 to discharge fully and then to charge with the upper terminal thereof positive; and current will flow through the resistor 380 on a substantially uninterrupted basis to keep the transistor 364 conductive until the end of the half-cycle of oscillation. Shortly thereafter, the capacitor 382 will discharge substantially completely; and, at that time, the transistor 364 will again become non-conductive. In this way, the capacitor 382 will keep the voltage across the resistor 236 at a low value until the half-cycle of oscillation of the series resonant circuit has been substantially completed, but will thereafter permit that voltage to rise. This is important, because it prevents the controlled rectifier 244, and hence the controlled rectifier 122, from becoming conductive until the capacitor 124 has become charged with the right-hand terminal thereof positive, but thereafter makes it possible for those controlled rectifiers to become conductive.

The principal impedance in the path between capacitor 124 and the capacitor 382 in FIG. 1B is provided by the parallel controlled rectifier 76 and resistor 78, controlled rectifier 84 and resistor 86, and controlled rectifier 92 and resistor 94, diode 388, diode 134, and the ohmic resistance and the distributed inductance and capacity of the conductors; and hence the capacitor 382 will charge up, with the bottom terminal thereof positive, almost immediately. This is desirable, because it will enable the capacitor 382 to charge up and then start discharging—thereby rendering the transistor 364 conductive—before the level of the motor current flowing through the resistor 136 could drop sufficiently to cause the differential amplifiers to make the voltage drop across the resistor 236 large enough to cause a firing signal to be supplied to the controlled rectifier 244. The overall result is that the controlled rectifier 244, and the controlled rectifier 122 as well, will be kept from being rendered conductive from the time the controlled rectifiers 76, 84 and 92 are rendered conductive until the capacitor 124 has been adequately charged with the right-hand terminal thereof positive.

During the half-cycle of oscillation, current will tend to flow from conductor 207 to conductors 417 and 441; and will thus tend to flow inversely through the emitter-base circuit of transistor 390 and through the base-emitter circuit of transistor 480. However, the diodes 398 and 418 and the diodes 398 and 478 will, respectively, prevent such current flow. As a result, those diodes will protect those transistors against injury during the said half-cycle of oscillation.

As the controlled rectifiers 244 and 122 became non-conductive, and as the capacitor 124 became charged with the right-hand terminal thereof positive, the voltage at the junction 416 in FIG. 1B rose; and the resulting voltage drop across resistor 414 made the base of transistor 390 more positive than the emitter of that transistor—and thus helped keep that transistor conductive. Also as the voltage at the junction 416 rose, the resulting voltage drop across the resistor 474 made the cathode of diode 470 more positive than the anode of that diode, thereby back-biasing that diode and rendering that diode non-conductive. Thereupon, the current flowing through the resistor 464 will no longer be able to flow through the low ohmic value resistor 474 and, instead, will have to flow through the higher ohmic value resistor 468 and then through resistor 462; and, consequently, the voltage at the base of transistor 446 will rise above the level of the voltage at the emitter of that transistor. At such time, the transistor 446 will become non-conductive. While that transistor will no longer develop a sufficiently large voltage drop across the resistor 462 to keep the transistor 480 conductive, the transistor 422 will continue to be conductive and will develop the required voltage drop across the resistor 462. Consequently, the resistor 480 will continue to remain conductive.

As the controlled rectifiers 76, 84 and 92 became conductive, the current through the series-connected resistor 136, armature winding 20, and field winding 22 began to build up exponentially. When the current flowing through the series-connected resistor 136, armature winding 20 and field winding 22 increases to the point where the sum of the voltage drops across the resistors 136 and 158 in FIG. 1A exceeds the voltage drop across the resistor 184 in FIG. 1B, the voltage at the emitter of the transistor 156 will become less positive, relative to the voltage at the bases of transistors 156 and 182, than the voltage at the emitter of the transistor 182. At such time, the transistor 156 will become less conductive than the transistor 182; and the resulting decrease in voltage drop across the resistor 170 will tend to reduce the sum of the collector voltages of the transistors 156 and 182. The voltage at the junction 308 will decrease proportionately, and hence the voltage at the base of the transistor 288 will decrease. Thereupon, that transistor will become less conductive; and the voltage drop across the common emitter resistor 296 in FIG. 1A will tend to decrease, and thereby tend to make the emitter of the transistor 290 more negative relative to the base of that transistor. Consequently, that transistor will tend to become more conductive and thereby reduce the voltage at the bases of the transistors 156 and 182. The resulting increased conductivity of the transistor 182 will increase the voltage drop across the resistor 196 in FIG. 1B, and thus will make the base of the transistor 218 more positive. The resulting decrease in conductivity of that transistor will tend to decrease the voltage drop across the common emitter resistor 222; and hence the emitter of the transistor 216 will tend to become more positive and will render that transistor more conductive. The resulting increase in the voltage drop across the resistor 236 will cause the Zener diode 258 to become conductive; and, at such time, current will flow from the positive terminal of the battery 64 via junctions 138 and 139, fuse 74, contacts 66, junction 224, conductor 227, junction 226 in FIG. 1B, resistor 222, conductor 220, transistor 216 in FIG. 1A, junctions 232 and 234, Zener diode 258, resistors 260 and 262, junctions 252 and 250, resistor 256, junctions 120 and 118, and conductor 207 to the negative terminal of that battery. The resulting voltage drop across the resistor 262 will cause current to flow through the gate-to-cathode circuit of the controlled rectifier 244, and thereby again render that controlled rectifier conductive.

The consequent flow of current through resistor 248, controlled rectifier 244, and the gate-to-cathode circuit of controlled rectifier 122 will render the controlled rectifier 122 conductive. As the controlled rectifier 122 becomes conductive, the voltage between the conductor 417 and the conductor 207 will decrease to just a few volts; and hence the voltage drop across the resistor 474 will decrease to just a few volts. At such time, the voltage at the cathode of diode 470 in FIG. 1B will become smaller than the voltage at the anode of that diode; and hence current will again begin to flow through resistor 464, diode 470, and resistor 474, and the resulting low voltage at the base of transistor 446 will again render that transistor conductive. At this time, the transistor 364 will be non-conductive but the transistors 390, 422, 446 and 480 will be conductive.

Also, as the controlled rectifier 122 becomes conductive, current will tend to flow from the right-hand terminal of capacitor 124 via junction 126, controlled rectifier 122, junctions 120, 118, 112, 110 and 108, the paralleled resistor 78 and controlled rectifier 76, resistor 86 and controlled rectifier 84, and resistor 94 and controlled rectifier 92, junctions 102, 104, 106 and 128 to the left-hand terminal of that capacitor. The resulting inverse current will tend to render the controlled rectifiers 76, 84 and 92 non-conductive. Current also will tend to flow from the right-hand terminal of capacitor 124 via junction 126, controlled rectifier 122, junctions 120, 118, 112, 110 and 108, the paralleled resistor strings 78, 80 and 82, 86, 88 and 90, and 94, 96 and 98, junctions 278 and 276, conductor 271, junctions 272 and 274 in FIG. 1B, controlled rectifier 266, junction 270, conductor 441, junctions 167, 106, 104 and 128 in FIG. 1A to the left-hand terminal of that capacitor. The resulting inverse current will tend to render the controlled rectifier 266 non-conductive. The inverse current through the controlled rectifiers 76, 84, 92 and 266 will be continued long enough to fully extinguish those controlled rectifiers. After the capacitor 124 has rendered the controlled rectifiers 76, 84 and 92 essentially non-conductive, that capacitor will continue to discharge through the controlled rectifier 122. Also, that capacitor will respond to the current which flows from the positive terminal of the battery 64 via resistor 136, armature winding 20, field winding 22, capacitor 124, and controlled rectifier 122 to become fully charged with the left-hand terminal thereof positive.

As the capacitor 124 becomes fully charged, the voltage at the left-hand terminal thereof, and thus at the base of transistor 422, will exceed the value of the voltage at the emitter of that transistor. At such time, the transistor 422 will again become non-conductive, and will thus halt the flow of current through resistor 426, transistor 422, and resistors 436 and 414. Also at such time, the voltage across the series-connected diode 418 and resistors 420 and 414 will be just a few volts; and hence the transistor 390 will again become non-conductive. As the transistor 390 again becomes non-conductive, it will act as a large resistance in parallel with the resistor 242; and will thus permit an appreciable voltage to be developed across that resistor. At such time, the transistors 364, 390 and 422 will be essentially non-conductive, whereas the transistors 446 and 480 will be conductive.

Although the controlled rectifiers 76, 84 and 92 become essentially non-conductive, the inductance of the armature winding 20 and of the field winding 22 will cause current to continue to flow through the motor. Specifically, current will flow from the left-hand terminal of the field winding 22 via contacts 26 and 28, junctions 148 and 128, diode 152, junctions 138 and 139, resistor 136, junction 142, armature winding 20, junction 146, and contacts 30 and 32 to the right-hand terminal of the field winding 22; and that current will decay exponentially. Importantly, the current which continues to flow through the motor after the controlled rectifiers 76, 84 and 92 are rendered non-conductive will also flow through the resistor 136; and hence that resistor and the differential amplifiers will be able to sense, and to respond to, that current. This means that the current flowing through the motor will be sensed continuously.

During the period of time when the controlled rectifiers 76, 84 and 92 were conducting current, enough current flowed through resistor 184, resistor 268, and those controlled rectifiers to develop a substantial voltage drop across the former resistor. However, as the controlled rectifiers 76, 84 and 92 became non-conductive, the voltage drop due to the flow of current through resistors 184 and 268 greatly decreased. This means that the sum of the voltage drops across the resistors 136 and 158 will, at the instant the controlled rectifiers 76, 84 and 92 become non-conductive, greatly exceed the voltage drop across the resistor 184 in FIG. 1B. As a result, the motor will be able to "coast" until the value of the current flowing through the series-connected resistor 136, the motor windings, and the diode 152 exponentially decays to the point where the sum of the voltage drops across the resistors 136 and 158 falls below the voltage drop across the resistor 184. At such time, the differential amplifier constituted by the transistors 156 and 182 will respond to the more positive emitter of the transistor 156 to make the transistor 218 more conductive, and thereby again render the controlled rectifier 266 conductive. At such time, that controlled rectifier will again fire the controlled rectifiers 76, 84 and 92.

As the controlled rectifiers 76, 84 and 92 again become conductive, the voltage between the conductors 441 and 207 will again drop to just a few volts, and hence the transistor 422 will again become conductive; and, as that transistor becomes conductive, it will again render the transistor 390 conductive and will again help keep the transistor 480 conductive. In addition, as the controlled rectifiers 76, 84 and 92 again become conductive, the series resonant circuit constituted by the capacitor 124 and the inductor 132 will again experience a half-cycle of oscillation which will discharge the capacitor 124 and then charge that capacitor with the right-hand terminal thereof positive. During that half-cycle of oscillation, the controlled rectifiers 122 and 244 will again be fully extinguished by inverse current flow, and the transistor 364 will become conductive and then will again become non-conductive. As the right-hand terminal of the capacitor 124 again becomes positive and attains a voltage close to that of the battery 64, the voltage drop across the resistor 474 will again rise until it back-biases diode 470 and again renders that diode non-conductive. At such time, the transistor 446 will again become non-conductive.

As the controlled rectifiers 76, 84 and 92 again became conductive, a substantial amount of current again flowed through resistors 184 and 268 and those controlled rectifiers; and the resulting sharp increase in voltage drop across the resistor 184 again increased the value of the current which must flow through the resistor 136 to make the sum of the voltage drops across that resistor and the resistor 158 exceed the voltage drop across the resistor 184. The current flowing through the resistor 136, the motor windings, and the paralleled controlled rectifiers 76, 84 and 92 will again begin to build up exponentially; and, when that current reaches the point where the sum of the voltage drops across the resistors 136 and 158 exceeds the voltage drop across the resistor 184, the differential amplifiers will again render the controlled rectifier 244 conductive. That controlled rectifier will then again render the controlled rectifier 122 conductive; and, thereupon, the capacitor 124 will again cause inverse current to flow through the controlled rectifiers 76, 84, 92 and 266 and render those controlled rectifiers non-conductive. At such time, the rotor of the motor will continue to rotate, and current will again flow from the field winding 22 via diode 152, resistor 136, and armature winding 20; and that current will decay exponentially until the sum of the voltage drops across the resistors 136 and 158 again falls below the level of the voltage drop across the resistor 184.

Each time the level of the current flowing through the resistor 136 falls far enough to make the sum of the voltage drops across that resistor and resistor 158 less than the voltage drop across resistor 184, the differential amplifiers of the control system will fire the controlled rectifier 266, and thus cause firing of the controlled rectifiers 76, 84 and 92. Each time the level of the current flowing through the resistor 136 rises far enough to make the sum of the voltage drops across that resistor and resistor 158 greater than the voltage drop across resistor 184, the differential amplifiers of the control system will fire the controlled rectifier 244 and thus cause firing of the controlled rectifier 122. Because the resistor 268 and the controlled rectifiers 76, 84 and 92 sharply increase the voltage drop across the resistor 184, whenever those controlled rectifiers are conductive, the current level at which the differential amplifiers fire the controlled rectifier 244 is well above the current level at which those differential amplifiers fire the controlled rectifier 266. Consequently, the current flowing through the motor will recurrently rise and fall between two limits which are established by the setting of movable contact of the potentiometer 48 and by the ohmic value of the resistor 268. The recurrent firing and extinguishing of the controlled rectifiers 76, 84 and 92 is desirable because it reduces the length of time during which those controlled rectifiers are conductive, and thus reduces the heating of those controlled rectifiers.

Each time the controlled rectifiers 76, 84 and 92 become conductive, the capacitor 124 will render the controlled rectifiers 244 and 122 non-conductive and will become charged with the right-hand terminal thereof positive. Also, each time the controlled rectifiers 76, 84 and 92 become conductive, the transistor 422 will become conductive to render the transistor 390 conductive and to help keep the transistor 480 conductive. In being rendered conductive, the transistor 390 keeps a further firing signal from being supplied to the controlled rectifier 266, and thus to the controlled rectifiers 76, 84 and 92, until those rectifiers are again rendered non-conductive. Moreover, each time the controlled rectifiers 76, 84 and 92 become conductive, the transistor 364 will become conductive during the half-cycle of oscillation of the resonant circuit, and will thereby prevent the application of a firing signal to controlled rectifier 244—and thus the controlled rectifier 122—during that half-cycle; and will thereafter again become non-conductive. Additionally, each time the controlled rectifiers 76, 84 and 92 become conductive, the diode 470 will become back-biased and the transistor 446 will become non-conductive. Each time the controlled rectifiers 122 and 244 become conductive, the capacitor 124 will render the controlled rectifiers 76, 84, 92 and 266 non-conductive and will become charged with the left-hand terminal thereof positive. Also, each time the controlled rectifiers 122 and 244 become conductive, the transistor 422 will become non-conductive, and the transistor 390 will become non-conductive. In being rendered non-conductive, the transistor 390 makes it possible for a further firing signal to be supplied to the controlled rectifier 266. As a result, the capacitor 124 will always assume the polarity which it will need to extinguish the then-conductive controlled rectifiers; and the controlled rectifiers 244 and 266 will be kept from firing at times when it would not be safe for those controlled rectifiers to be fired.

As long as the operator of the electrically-driven vehicle leaves the contacts 66 and 68 of the switch 70 closed, leaves the movable contact 44 in engagement with the "forward" contact 42, and holds the accelerator pedal in position to close the switch 62, the rotor of the motor will drive that vehicle in the forward direction at the desired speed. At the time the operator of the electrically-driven vehicle moved the movable contact 44 into engagement with the "forward" contact 42, current flowed from the positive terminal of the battery 64 via junctions 138 and 139, fuse 74, conductor 325, junctions 324 and 363 in FIG. 1B, conductor 365, junction 367 in FIG. 1A, diode 369, junction 373, capacitor 377, conductor 379, junction 389 in FIG. 1B, contacts 42 and 44, contacts 60 and 58 of switch 62, conductor 73, contacts 68 in FIG. 1A, fuse 72, and junction 114 to the negative terminal of that battery. That current will flow until the capacitor 377 is charged to a voltage close to the voltage across the battery 64; and, at such time, the upper terminal of that capacitor will be positive. The charging of the capacitor 377 is not, however, significant as long as the movable contact 44 is left in engagement with the "forward" contact 42.

If the operator of the electrically-driven vehicle wishes to increase the speed of that vehicle, he needs only depress the accelerator pedal still further. If the operator does not depress that pedal far enough to cause the movable contact 59 of switch 63 to move away from the stationary contact 61 of that switch, the only change in the control system will be an increase in the reference voltage developed across the resistor 184. Specifically, as the accelerator pedal moves the movable contact of the potentiometer 48 downwardly, the voltage at that movable contact will decrease; and hence the voltage drop across the series-connected resistors 184, 320 and 322 will increase. The increased voltage drop across the resistor 184 will increase the level to which the current, flowing through resistor 136, armature winding 20 and field winding 22, must rise before the voltage at the emitter of transistor 156 becomes less positive than the voltage at the emitter of transistor 182. Because the current-time curve of the motor is non-linear and has a lesser slope in the higher current regions thereof, it will take a longer period of time for the current flowing through resistor 136 and the motor windings 20 and 22 to build up to the higher level established by the increased-speed setting of the accelerator pedal; and hence the controlled rectifiers 76, 84, and 92 will have a longer initial "on" period. Furthermore, because that current-time curve is non-linear and has a lesser slope in the higher current regions thereof, it will take longer periods of time for the current flowing through resistor 136 and the motor windings 20 and 22 to build up to that higher level each time those controlled rectifiers are "fired." As a result, the frequency at which the controlled rectifiers 76, 84 and 92 are fired will decrease.

If the operator of the electrically-driven vehicle wishes to increase the speed of that vehicle still further, he can depress the accelerator pedal until the movable contact 59 of switch 63 moves away from the stationary contact 61 of that switch. The movement of the movable contact 59 of switch 63 will not be significant at this time; but the mechanical connection between the accelerator pedal and the movable contact 59 is such that when the accelerator pedal has been depressed far enough to move that movable contact, that accelerator pedal will have caused the potentiometer 48 to call for a level of current through the resistor 136 which will make the average voltage across that resistor and the motor windings exceed twenty volts. As indicated previously, the capacitor 159 and the resistor 165 are connected in series with each other and are connected in parallel with series-connected resistor 136 and the motor windings 20 and 22. The voltage across the series-connected resistor 136 and motor windings 20 and 22 will recurrently rise and fall, as the controlled rectifiers 76, 84 and 92 are fired and then extinguished, but the capacitor 159 will tend to "average" that voltage. That capacitor will apply that averaged voltage across series-connected resistor 136, resistor 158, and Zener diode 161; and, when the average voltage across the Zener diode 161 exceeds twenty volts, that Zener diode will become conductive.

As the Zener diode 161 becomes conductive, current will flow from the positive terminal of the battery 64 via junctions 138 and 139, resistor 136, junction 142, resistor 158, junction 160, Zener diode 161, junction 163, and resistor 165 to the junction 167; and then part of that current will flow via conductor 441, junctions 270 and 269 in FIG. 1B, diode 440, junction 442, resistor 444, and junction 402 to the conductor 207, another part of that current will flow via conductor 441, junction 270 in FIG. 1B, controlled rectifier 266, junctions 274 and 272, conductor 271, junctions 276 and 278 in FIG. 1A, the paralleled resistor strings 82, 80 and 78, 90, 88 and 86, and 98, 96 and 94, junctions 108, 110 and 112, to the conductor 207, and the rest of that current will flow via junctions 106, 104 and 102, the paralleled controlled rectifier 76 and resistor 78, controlled rectifier 84 and resistor 86, and controlled rectifier 92 and resistor 94, and junctions 108, 110 and 112 to the conductor 207. The flow of current through the resistor 158 and the Zener diode 161 will be particularly significant when the controlled rectifiers 76, 84 and 92 are conductive; because that flow of current will establish a large voltage drop across the resistor 158, and that large voltage drop will tend to make the emitter of transistor 156 less positive than the emitter of the transistor 182. The said voltage drop across resistor 158 will simulate a substantial increase in the current flowing through the resistor 136; and the differential amplifier constituted by the transistors 156 and 182 will respond to the increased voltage drop across the resistor 158 to cause the controlled rectifiers 76, 84 and 92 to become non-conductive at a lower current level than they would if the Zener diode 161, the capacitor 159 and the resistor 165 were not provided. By causing the controlled rectifiers 76, 84 and 92 to become extinguished at a lower current level, the Zener diode 161, the capacitor 159, and the resistor 165 permit maximum average voltage to be supplied to the motor up to a predetermined current level, and then reduce the average voltage supplied to the motor as the current level is increased even further. For example, in the said preferred embodiment of control system provided by the present invention, the Zener diode 161, the capacitor 159 and the resistor 165 permit maximum average voltage to be supplied to the motor until the level of the current flowing through the motor reaches about two hundred and seventy amperes, and then linearly reduces the average voltage supplied to the motor as the current level is increased from two hundreds and seventy amperes to four hundred and fifty amperes. In this way, heating of the controlled rectifiers 76, 84 and 92 is kept within satisfactory limits. By using the Zener diode 161, the capacitor 159, and the resistor 165, and by appropriately cooling the controlled rectifiers which carry the motor current, the present invention can eliminate one of the controlled rectifiers 76, 84 and 92 and still permit the control system to supply a peak value in excess of four hundred amperes to the motor. When the Zener diode 161 becomes conductive, the rotor of the motor will not be able to accelerate as rapidly as it can when that Zener diode is essentially non-conductive; but that rotor will still be able to accelerate. As a result, the operator of the electrically-driven vehicle will be able to drive that vehicle at higher speeds.

If the operator of the electrically-driven vehicle wishes to operate that vehicle at its maximum power, he need only depress the accelerator pedal to the floor; and, at such time, the movable contact of the potentiometer 48 will move to the bottom of that potentiometer, and the movable contact 52 of switch 56 will move out of engagement with the stationary contact 50 and into engagement with the stationary contact 54. Thereupon, current will flow from the positive terminal of battery 64 via junctions 138 and 139, fuse 74, conductor 325, junctions 324 and 321 in FIG. 1B, holding contacts 351, junctions 353 and 345, diode 347, junctions 349 and 337, relay coil 328, junction 359, contacts 54 and 52 of switch 56, junction 350, diode 348, junctions 341, 340 and 389, contacts 42 and 44, contacts 60 and 58 of switch 62, conductor 73, contacts 68 in FIG. 1A, fuse 72, and junction 114 to the negative terminal of that battery. The resulting energization of the relay coil 328 will close the heavy-duty relay contacts 100 in FIG. 1A; and, thereupon, current will flow from the positive terminal of battery 64 via junctions 138 and 139, resistor 136, junction 142, armature winding 20, junction 146, contacts 30 and 32, field winding 22, contacts 26 and 28, junctions 148, 128, 104 and 102, relay contacts 100, junctions 108, 110 and 112, and the conductor 207 to the negative terminal of the battery. At this time, the full voltage of the battery will be applied across series-connected resistor 136, armature winding 20, and field winding 22; and that voltage will be applied uninterruptedly to those motor windings. As a result, the rotor of the motor will operate at its maximum power, and it will thus enable the electrically-driven vehicle to satisfactorily handle heavy or increased loads.

It should be noted that relay coil 328 can be energized only when the movable contact 44 is in engagement with the "forward" contact 42 or the "reverse" contact 46. This is desirable; because it will keep the electrically-driven vehicle from moving abruptly and suddenly if the operator accidentally depresses the accelerator pedal to the floor as he mounts, or dismounts from, that vehicle.

It should also be noted that the controlled rectifiers 76, 84 and 92 will be rendered non-conductive as the heavy-duty relay contacts 100 are closed. Specifically, as the movable contact 52 of switch 56 is moved down into engagement with the contact 54, it moves out of engagement with the contact 50; and, as it does so, it disconnects the lower terminal of the potentiometer 48 from the negative terminal of the battery 64. As a result, that potentiometer will be unable to provide a reference voltage across the resistor 184; and hence the sum of the voltage drops across the resistors 136 and 158 will exceed the voltage drop across the resistor 184. Consequently, the differential amplifiers of the control system will "fire" the controlled rectifier 244, with consequent firing of controlled rectifier 122; and will thus provide prompt extinguishing of the controlled rectifiers 76, 84 and 92. This arrangement is desirable because it obviates any and all possibility of the heavy-duty relay contacts 100 and any of the controlled rectifiers 76, 84 and 92 sharing current.

As the movable contact 52 moves downwardly out of engagement with contact 50 and into engagement with contact 54, a voltage will be applied to the relay coil 328; and that voltage will tend to cause that relay coil to close the heavy-duty relay contacts 100. Because the contact 52 disconnects the potentiometer 48 from the negative terminal of the battery 64 before it connects the relay coil 328 to that terminal, and because the inertia of the heavy-duty relay contacts 100 will keep those relay contacts from closing immediately, the controlled rectifiers 76, 84 and 92 will be de-energized before those relay contacts are closed.

As long as the movable contact 52 is out of engagement with the contact 50, only a small voltage can appear across the resistor 184; and that voltage will be smaller than the sum of the voltages across resistors 136 and 158. As a result, as long as the movable contact 52 is out of engagement with the contact 50, the controlled rectifier 122 will remain conductive. Subsequently, when the contact 52 is permitted to move up out of engagement with the contact 54 and into engagement with the contact 50, the relay coil 328 will become de-energized, and an appreciable voltage will again appear across the resistor 184. If the level of current that had been flowing through the heavy-duty relay contacts 100 was higher than the current level called for by the position of the movable contact of potentiometer 48, the controlled rectifier 122 will tend to remain conductive. However, if the level of current that had been flowing through the heavy-duty relay contacts 100 was lower than the current level called for by the position of the movable contact of potentiometer 48, the controlled rectifier 266 will tend to become conductive and will tend to render the controlled rectifiers 76, 84 and 92 conductive. Because the controlled rectifier 122 will be conductive, at the instant the heavy-duty relay contacts 100 re-open, the motor current will have to flow through the capacitor 124 and the controlled rectifier 122 to charge that capacitor sufficiently to render the transistor 422 non-conductive, and thereby render the transistor 390 non-conductive. The charging of capacitor 124 will require a finite period of time; and this is desirable because a too-sudden application of substantially full voltage to the anodes of the controlled rectifiers 76, 84 and 92 could prematurely "fire" those controlled rectifiers.

The diode 334 in FIG. 1B acts as a discharge diode, and thereby keeps large voltage transients from developing, as the movable contact 52 of switch 56 is moved out of engagement with the contact 54; and this is desirable because large voltage transients would shorten the life of switch 56 and could adversely affect other components of the control system. The resistor 332 in FIG. 1B keeps the contact-releasing time of relay coil 328 from being unduly long. This is desirable, because an unduly long release time for the heavy-duty relay contacts 100 could cause hurtful arcing at those contacts.

After the operator of the electrically-driven vehicle has operated that vehicle at its maximum power level, he will usually reduce the pressure on the accelerator pedal to enable the movable contact of the potentiometer 48 to move upwardly; and, as that movable contact so moves, it will establish a reference voltage across the resistor 184 which corresponds to a power level less than the maximum power level. That operator can then increase or decrease the speed of the vehicle at will, by merely increasing or decreasing the pressure on the accelerator pedal—thereby causing the movable contact of the potentiometer 48 to move downwardly or upwardly. As the setting of the movable contact of the potentiometer 48 is changed, the length of time during which the motor current builds up to the desired level will change. Also, as the average voltage across the Zener diode 161 increases to about twenty volts, the length of time during which the motor current builds up to the desired value will change. Consequently, it should be apparent that the control system provided by the present invention uses the controlled rectifiers 76, 84 and 92 in a variable frequency switching mode. In the said one preferred embodiment of control system provided by the present invention, the frequency of switching can vary over the range from zero to about two hundred cycles per second.

If, after operating the electrically-driven vehicle at its maximum power level, the operator releases all pressure on the accelerator pedal, the movable contact of the potentiometer 48 will start moving up to the upper end of that potentiometer and the movable contact 52 of the switch 56 will immeditaely move out of engagement with the stationary contact 54. The relay coil 328 will then become de-energized with consequent re-opening of the heavy-duty relay contact 100. Thereafter, in succession, the movable contact 59 of the switch 63 will again move into engagement with the stationary contact 61 of that switch, and the movable contact 58 of the switch 62 will move out of engagement with the stationary contact 60 of that switch. As the movable contact 58 of the switch 62 moves away from the stationary contact 60 of that switch, the lower terminal of the potentiometer 48 will be disconnected from the negative terminal of the battery 64; and hence that potentiometer will no longer be able to develop a reference voltage across the resistor 184. Further, the opening of the switch 62 will disconnect the lower terminal of the relay coil 338 from the negative terminal of the battery 64. However, the inductive energy within the relay coil 338 will force current to continue to flow from the lower terminal of that relay coil via junctions 340 and 344, diode 342, resistor 344, and junctions 345 and 353 to the upper terminal of that relay coil; and that current will tend to hold the contact 26 in engagement with contact 28 and will also tend to hold the contacts 351 closed. The inductive energy within the relay coil 338 also will force current to flow from the lower terminal of that relay coil via junctions 340 and 389, conductor 379, capacitor 377 in FIG. 1A, junction 373, resistor 401, conductor 407, diode 393 in FIG. 1B, junctions 395, 208, 188 and 186, resistor 184, conductor 185, junction 139 in FIG. 1A, fuse 74, conductor 325, junctions 324 and 321 in FIG. 1B, holding contacts 351, and junction 353 to the upper terminal of that relay coil. Momentarily, the relay coil 338 will serve as a source of voltage with the lower terminal thereof positive, and the voltage across that relay coil will add to the voltage across the previously-charged capacitor 377 to develop a voltage which is initially close to seventy-two volts; and that voltage will force current to flow through the resistor 184 in a direction opposite to the normal flow of current through that resistor. In doing so, the relay coil 338 and the capacitor 377 will develop a voltage drop across the resistor 184 which will buck the voltage drop that is deevloped across that resistor by the battery 64. The bucking voltage across the resistor 184 will make the voltage at the emitter of the transistor 156 considerably less positive than the voltage at the emitter of the transistor 182; and the differential amplifiers of the control system will promptly act to cause the controlled rectifiers 244 and 122 to become conductive—thereby enabling the charge on the capacitor 124 to extinguish the controlled rectifiers 76, 84 and 92. The extinguishing of the controlled rectifiers 76, 84 and 92 will minimize any arcing which tends to develop between the contacts 26 and 28 as the flow of current through the relay coil 338 decreases to the point where that coil cannot continue to hold the contact 26 in engagement with the contact 28. As a result, the capacitor 377 will coact with the relay coil 338 to minimize arcing between the contacts 26 and 28 as those contacts separate.

If the holding contacts 351 re-open before the contact 26 has moved away from the contact 28, the resistor 361 will provide a path for the bucking current flowing through the resistor 184. Specifically, current will flow from the lower terminal of the relay coil 338 via junctions 340 and 389, conductor 379, capacitor 377 in FIG. 1A, junction 373, resistor 401, conductor 407, diode 393 in FIG. 1B, junctions 395, 208, 188 and 186, resistor 184, conductor 185, junction 139 in FIG. 1A, fuse 74, conductor 325, junctions 324, 321 and 323 in FIG. 1B, switch 63, resistor 361, junction 339, diode 343, junctions 345 and 353 to the upper terminal of that relay coil. This means that the relay coil 338 and the capacitor 377 will apply a bucking voltage across the resistor 184 until the contact 26 has moved away from the contact 28; and hence any arcing between those contacts will be minimized.

If, instead of releasing the pressure on the accelerator pedal and thereby permitting the movable contact of the potentiometer 48 to move upwardly far enough to re-open switch 62, the operator uses the forward-reverse lever, not shown, to move the contact 44 out of engagement with the "forward" contact 42, the tendency toward arcing between the contacts 26 and 28 will be much greater. However, in that case also, the relay coil 338 will momentarily act as a source of voltage with the lower terminal thereof positive; and the voltage across that coil will add to the voltage across the capacitor 377 in FIG. 1A to force a substantial amount of current to flow through the resistor 184 in FIG. 1B—thereby developing a substantial bucking voltage drop across that resistor. That bucking voltage drop will make the voltage at the emitter of transistor 154 much less positive than the voltage at the emitter of transistor 182; and the differential amplifiers of the control system will promptly cause the controlled rectifiers 244 and 122 to become conductive, and thereby enable the charge on the capacitor 124 to extinguish the controlled rectifiers 76, 84 and 92. By the time the level of current flowing through the relay coil 338 decreases to the point where that relay coil can not continue to hold the contact 26 in engagement with the contact 28, the voltage across those contacts will have been reduced to the point where hurtful arcing can not occur.

The diode 342 in FIG. 1B keeps large voltage transients from developing as the movable contact 44 is moved out of engagement with the "forward" contact 42; and this is desirable because large voltage transients would shorten the life of contacts 44 and 42 and could adversely affect other components of the control system. The resistor 344 in FIG. 1B keeps the contact-releasing times of relay coil 338 from being unduly long. This is desirable, because unduly long release times for the contact 26 could cause hurtful arcing at that contact.

Whether the operator of the electrically-driven vehicle permits the accelerator pedal to move far enough upwardly to permit the switch 62 to re-open, or uses the forward-reverse lever, not shown, to move the contact 44 to its neutral position, the relay coil 338 will permit the holding contacts 351 to re-open and will permit the movable contact 26 to move out of engagement with the contact 28. At such time, the controlled rectifiers 76, 84 and 92 will be non-conductive, the controlled rectifiers 122 and 244 will be conductive, the capacitor 124 will be charged with the left-hand terminal thereof positive, the controlled rectifier 266 will be essentially non-conductive, the transistor 364 will be non-conductive, the transistor 390 will be non-conductive, the transistor 422 will be non-conductive, and the transistors 446 and 480 will be conductive. The control system will remain in this condition until the operator of the electrically-driven vehicle either opens the contacts 66 and 68 of the switch 70 or again uses the forward-reverse lever to shift the movable contact 44. If that operator re-opens the contacts 66 and 68 of switch 70, the control system will be in the condition described hereinbefore in the section entitled "Condition of Control System When Contacts 66 and 68 of Switch 70 Are Open." If the operator of the electrically-driven vehicle uses the forward-reverse lever, not shown, to again move the movable contact 44 into engagement with the "forward" contact 42, the condition and operation of the control system will be in the condition and operation described in this section. On the other hand, if the operator of the electrically-driven vehicle uses the forward-reverse lever, not shown, to shift the contact 44 into engagement with the "reverse" contact 46, the condition and operation of the control system will be as described in the following section.

*Contact 44 is moved into engagement with "reverse" contact 46*

If, after closing the contacts 66 and 68 of the switch 70, the operator uses the forward-reverse lever, not shown, to move the contact 44 into engagement with the "reverse" contact 46 but does not press on the accelerator pedal, no change will occur in the condition of the control system. However, if the operator thereafter depresses that accelerator pedal, the switch 62 will close; and, thereupon, current will flow from the positive terminal of the battery 64 via junctions 138 and 139, fuse 74, conductor 325, junctions 324, 321 and 323 in FIG. 1B, switch 63, junction 327, diode 331, junctions 333 and 355, relay coil 352, junctions 354, 356 and 391, contacts 46 and 44, switch 62, conductor 73, contacts 68 in FIG. 1A, fuse 72, and junction 114 to the negative terminal of that battery. The resulting flow of current through the relay coil 352 will energize that coil; and, as that coil becomes energized, it will move the movable contact 32 out of engagement with the fixed contact 30 and into engagement with the fixed contact 34, and it will also close the holding contacts 357. The closing of the holding contacts 357 will cause current to flow from the positive terminal of the battery 64 via junctions 138 and 139, fuse 74, conductor 325, junctions 324, 321 and 323 in FIG. 1B, holding contacts 357, junction 355, coil 352, junctions 354, 356 and 391, contacts 46 and 44, switch 62, conductor 73, contacts 68 in FIG. 1A, fuse 72, and junction 114 to the negative terminal of that battery; and hence the closing of the holding contacts 357 will keep the coil 352 energized.

As the contact 32 moves into engagement with the contact 34, the junctions 138 and 139, resistor 136, junction 142, armature winding 20, junction 146, contacts 24 and 26, field winding 22, contacts 32 and 34, and junctions 148, 128, 104, 102 and 106 will connect the positive terminal of the battery 64 to the anodes of the controlled rectifiers 76, 84 and 92 and also to the left-hand terminal of the capacitor 124. Because that capacitor is only charged to about fifteen volts while the contact 44 in in "neutral," that capacitor and the controlled rectifier 122 will act as a low impedance in parallel with the parallel-connected controlled rectifier 76 and resistor 78, controlled rectifier 84 and resistor 86, and controlled rectifier 92 and resistor 94; and hence the voltage at the anodes of those controlled rectifiers, and thus at the base of transistor 422, will initially be about fifteen volts. This means that the transistor 422, and hence the transistor 390, will remain conductive for at least a moment after the contact 44 is moved into engagement with the "reverse" contact 46.

Because the ohmic values of resistor 136, armature winding 20, and field winding 22 are very low, the capacitor 124 will charge rapidly; and, as that capacitor becomes charged, the voltage at the left-hand terminal thereof, and also at the base of transistor 422, will approach the voltage at the positive terminal of the battery 64. When the voltage at the left-hand terminal of that capacitor, and thus at the base of transistor 422, rises above thirty-two volts, the voltage at the base of that transistor will exceed the voltage at the emitter of that transistor, and hence that transistor will become non-conductive.

The transistor 390 will then promptly become non-conductive; because current will no longer flow through resistor 426, transistor 422, and resistors 436 and 414, and because the voltage at the junction 416 will be too small to make the voltage at junction 412 sufficiently positive to keep that transistor conductive. This means that the transistor 390 will no longer inhibit the firing of controlled rectifier 266—as by acting as a small resistance in parallel with the resistor 242.

If the operator of the electrically-driven vehicle had depressed the accelerator pedal just far enough to close the switch 62 in FIG. 1b, the voltage drop across the resistor 184 would still be less than the voltage drop across the resistor 158 in FIG. 1A, and the differential amplifiers would be establishing a large voltage drop across resistor 236 and only a small voltage drop across resistor 242. Consequently, although the transistor 390 would no longer be inhibiting the firing of the controlled rectifier 266, the differential amplifiers would not be supplying a firing signal to that controlled rectifier; and hence that controlled rectifier would still be non-conductive.

However, if the operator of the electrically-driven vehicle had depressed the accelerator pedal far enough to cause an appreciable amount of current to flow from the positive terminal of battery 64 via junctions 138 and 139, conductor 185, resistor 184 in FIG. 1B, junction 186, resistor 320, the upper section and movable contact of adjustable resistor 322, the movable contact and lower section of potentiometer 48, contacts 50 and 52 of switch 56, junction 350, diode 362, junctions 354, 356 and 391, contacts 46 and 44, switch 62, conductor 73, contacts 68 in FIG. 1A, fuse 72, and junction 114 to the negative terminal of the battery, the overall voltage drop across resistor 184 would exceed the sum of the voltage drop across resistors 136 and 158. Thereupon, as explained hereinbefore, the differential amplifiers would cause considerably more current to flow through resistor 242 than would flow through resistor 236; and the considerably greater current flowing through the former resistor would make the voltage at the upper terminal of that resistor, and thus at the junction 240, considerably more positive than the voltage at the upper terminal of the resistor 236, and thus at the junction 234. As a result, a considerably larger voltage would develop across the resistor 242; and, thereupon, the Zener diode 280 would become conductive and current would flow from the positive terminal of the battery 64 via fuse 74, contacts 66, resistor 222 in FIG. 1B, transistor 218, resistor 241, Zener diode 280, resistors 282 and 284, the paralleled resistor strings 82, 80 and 78, 90, 88 and 86, and 98, 96 and 94, in FIG. 1A, and conductor 207 to the negative terminal of that battery. The resulting voltage drop across the resistor 284 would cause current to flow through the gate-to-cathode circuit of the controlled rectifier 266, and would thus render that controlled rectifier conductive. Thereupon, current would flow from the positive terminal of the battery 64 via resistor 136, armature winding 20, junction 146, contacts 24 and 26, field winding 22, contacts 32 and 34, conductor 441, controlled rectifier 266 in FIG. 1B, conductor 271, the paralleled resistor 82, gate-to-cathode circuit of controlled rectifier 76 and resistor 78, resistor 90, gate-to-cathode circuit of controlled rectifier 84 and resistor 86, and resistor 98, gate-to-cathode circuit of controlled rectifier 92 and resistor 94, and conductor 207 to the negative terminal of that battery; and current also would flow from the positive terminal of the battery 64 via conductor 185, resistor 184 in FIG. 1B, resistor 268, controlled rectifier 266 in FIG. 1B, conductor 271, the paralleled resistor 82, gate-to-cathode circuit of controlled rectifier 76 and resistor 78, resistor 90, gate-to-cathode circuit of controlled rectifier 84 and resistor 86, and resistor 98, gate-to-cathode circuit of controlled rectifier 92 and resistor 94, and conductor 207 to the negative terminal of that battery. The resulting "firing" of controlled rectifiers 76, 84 and 92, and the consequent flow of motor current, will cause the rotor of the motor to start rotating; and the rotation of that rotor will cause the electrically-driven vehicle to start moving in the reverse direction. Current will also flow from the opposite terminal of the battery 64 via conductor 185, resistor 184 in FIG. 1B, resistor 268, conductor 441( paralleled controlled rectifier 76 and resistor 78, controlled rectifier 84 and resistor 86, and controlled rectifier 92 and resistor 94, and conductor 207 to the negative terminal of that battery. That flow of current will sharply increase the voltage drop across the resistor 184, and it will thus make the voltage at the emitter of transistor 182 even less positive relative to the voltage at the emitter of transistor 156. The sharply increased voltage drop across the resistor 184 will not increase the conductivity of the controlled rectifiers 76, 84 and 92; because those controlled rectifiers become fully conductive when they are fired. However, that sharply increased voltage drop will sharply increase the level of the current which must flow through the resistor 136 to again make the emitter of transistor 156 less positive than the emitter of transistor 182.

As the controlled rectifier 266 became conductive, current started to flow from the left-hand terminal of the capacitor 124 via conductor 441, controlled rectifier 266 in FIG. 1B, conductor 271, the paralleled resistor strings 82, 80 and 78, 90, 88 and 86, and 98, 96 and 94 in FIG. 1A, inductor 132, and diode 134, to the right-hand terminal of that capacitor. In addition, as the controlled rectifier 266 became conductive, current tended to flow from the left-hand terminal of capacitor 124 via conductor 441, controlled rectifier 226 in FIG. 1B, conductor 271, the paralleled resistor strings 82, 80 and 78, 90, 88 and 86, and 98, 96 and 94 in FIG. 1A, and controlled rectifier 122 to the right-hand terminal of that capacitor; and current also tended to flow from the left-hand terminal of capacitor 124 via conductor 441, controlled rectifier 266 in FIG. 1B, conductor 271, the paralleled resistor strings 82, 80 and 78, 90, 88 and 86, and 98, 96, and 94 in FIG. 1A, resistor 256, controlled rectifier 244, and diode 245, to the right-hand terminal of that capacitor. The consequent inverse current flow through the controlled rectifiers 122 and 244 will start rendering those controlled rectifiers non-conductive. The diode 264 will limit the voltage which can be developed across the cathode-to-gate circuit of the controlled rectifier 244, and will thus protect that controlled rectifier against injury.

Further, as the controlled rectifier 266 became conductive, the base of the transistor 422 again became more negative than the emitter of that transistor, and that transistor again became conductive. The resulting flow of current through resistor 426, transistor 422, resistor 436, and resistor 414 again rendered the transistor 390 conductive. At such time the transistor 390 will act as a small resistance in parallel with the resistor 242; and hence the voltage across that resistor will become too small for the voltage across the resistor 284 to continue to supply a firing signal to the controlled rectifier 266.

As the controlled rectifiers 76, 84 and 92 became conductive, the voltage at the left-hand terminal of the capacitor 124 dropped close to the voltage at the negative terminal of the battery 64; and, because that capacitor can not discharge instantaneously, the voltage at the right-hand terminal of that capacitor became negative relative to the voltage at the negative terminal of the battery 64. The resulting application of negative voltage to the anode of controlled rectifier 122 is desirable because it helped tend to extinguish that controlled rectifier. Current also flowed from the left-hand terminal of capacitor 124 via the paralleled controlled rectifier 76 and resistor 78, controlled rectifier 84 and resistor 86, and controlled rectifier 92 and resistor 94, inductor 132, diode 134, and junction 126 to the right-hand terminal of that capacitor. Further, as the controlled rectifiers 76, 84 and 92 became conductive, current tended to flow from the left-hand terminal of capacitor 124 via the paralleled controlled rectifier 76 and resistor 78, controlled rectifier 84 and resistor 86, and controlled rectifier 92 and resistor 94, and controlled rectifier 122 to the right-hand terminal of that capacitor; and current also tended to flow from the left-hand terminal of capacitor 124 via the paralleled controlled rectifier 76 and resistor 78, controlled rectifier 84 and resistor 86, and controlled rectifier 92 and resistor 94, resistor 256, controlled rectifier 244, and diode 245, to the right-hand terminal of that capacitor. The diode 264 will limit the voltage that can be developed across the cathode-to-gate circuit of the controlled rectifier 244, and will thus protect that controlled rectifier against injury.

The series resonant circuit constituted by capacitor 124 and inductor 132 will start to oscillate at the series resonant frequency of that circuit—and the resulting flow of current in that series resonant circuit will discharge that capacitor and then charge that capacitor with the right-hand terminal of that capacitor positive—thereby reversing the polarity of that capacitor. The diode 134 will permit the series resonant circuit to experience just one half-cycle of oscillation; and hence the right-hand terminal of the capacitor 124 will become positive and then tend to remain positive. The subsequent flow of current from the positive terminal of the battery 64 via fuse 74, resistor 248, diode 245, capacitor 124, the paralleled controlled rectifier 76 and resistor 78, controlled rectifier 84 and resistor 86, and controlled rectifier 92 and resistor 94, and conductor 207 to the negative terminal of that battery will tend to further charge that capacitor.

As the half-cycle of oscillation causes the polarity of the capacitor 124 to reverse, the capacitor 382 will be able to discharge; and that capacitor will cause current to flow from the lower terminal thereof via resistors 378 and 380, conductor 207, inductor 132 in FIG. 1A, and conductor 383 to the upper terminal of that capacitor. The resulting flow of current through resistor 380 will make the transistor 364 conductive; and that transistor will act as a low resistance in parallel with the resistor 236 in FIG. 1A. As a result, the voltage across the resistor 236 will not be able to rise to a sufficiently high level to cause firing of the controlled rectifier 244.

The capacitor 382 will respond to the voltage across the inductor 132 to discharge fully and then to charge with the upper terminal thereof positive; and current will flow through the resistor 380 on a substantially uninterrupted basis to keep the transistor 364 conductive until the end of the half-cycle of oscillation. Shortly thereafter, the capacitor 382 will discharge substantially completely, and, at that time, the transistor 364 will again become non-conductive In this way, the capacitor 382 will keep the voltage across the resistor 236 at a low value until he half-cycle of oscillation of the series resonant circuit has been substantially completed, but will thereafter permit that voltage to rise.

The principal impedance in the path between capacitor 124 and the capacitor 382 in FIG. 1B is provided by the paralleled controlled rectifier 76 and resistor 78, controlled rectifier 84 and resistor 86, and controlled rectifier 92 and resistor 94, diode 388, diode 134, and the ohmic resistance and the distributed inductance and capacity of the conductors, and hence the capacitor 382 will charge up, with the bottom terminal thereof positive, almost immediately. This is desirable, because it will enable the capacitor 382 to charge up and then start discharging—thereby rendering the transistor 364 conductive—before the level of the current flowing through the resistor 136 could drop sufficiently to cause the differential amplifiers to make the voltage drop across the resistor 236 large enough to cause a firing signal to be supplied to the controlled rectifier 244. The overall result is that the controlled rectifier 244, and the controlled rectifier 122 is well, will be kept from being rendered conductive from the time the controlled rectifiers 76, 84 and 92 are rendered conductive until the capacitor 124 has been adequately charged with the right-hand terminal thereof positive.

As the controlled rectifiers 244 and 122 became non-conductive, and as the capacitor 124 became charged with the right-hand terminal thereof positive, the voltage at the junction 416 in FIG. 1B rose; and the resulting voltage drop across resistor 414 helped keep the transistor 390 conductive. Also as the voltage at the junction 416 rose, the diode 470 became back-biased; and hence the transistor 446 became nonconductive. While that transistor will no longer keep the transistor 480 conductive, the transistor 422 will continue to keep transistor 480 conductive.

As the controlled rectifiers 76, 84 and 92 became conductive, the current through the series-connected resistor 136, armature winding 20, and field winding 22 began to build up exponentially. When the sum of the voltage drops across the resistors 136 and 158 in FIG. 1A exceeds the voltage drop across the resistor 184 in FIG. 1B, the differential amplifiers of the control system will increase the voltage drop across the resistor 236 until the Zener diode 258 becomes conductive; and, at such time, current will flow from the positive terminal of the battery 64 via fuse 74, conductor 227, resistor 222 in FIG. 1B, conductor 220, transistor 216 in FIG. 1A, Zener diode 258, resistors 260 and 262, resistor 256, and conductor 207 to the negative terminal of that battery. The resulting voltage drop across the resistor 262 will cause current to flow through the gate-to-cathode circuit of the controlled rectifier 244, and thereby again render that controlled rectifier conductive.

The consequent flow of current through resistor 248, controlled rectifier 244, and the gate-to-cathode circuit of controlled rectifier 122 will render the controlled rectifier 122 conductive. As the controlled rectifier 122 becomes conductive, the voltage between the conductor 417 and the conductor 207 will decrease to just a few volts; and the transistor 446 will become conductive. At this time, the transistor 364 will be non-conductive but the transistors 390, 422, 446 and 480 will be conductive.

Also, as the controlled rectifier 122 becomes conductive, current will tend to flow from the right-hand terminal of capacitor 124 via controlled rectifier 122, and the paralleled resistor 78 and controlled rectifier 76, resistor 86 and controlled rectifier 84, and resistor 94 and controlled rectifier 92 to the left-hand terminal of that capacitor. The resulting inverse current will tend to render the controlled rectifiers 76, 84 and 92 non-conductive. Current also will tend to flow from the right-hand terminal of capacitor 124 via controlled rectifier 122 the paralleled resistor strings 78, 80 and 82, 86, 88 and 90, and 94, 96 and 98, conductor 271, controlled rectifier 266 in FIG. 1B, and conductor 441, to the left-hand terminal of that capacitor. The resulting inverse current will tend to render the controlled rectifier 266 non-conductive. The inverse current through the controlled rectifiers 76, 84, 92 and 266 will be continued long enough to fully extinguish those controlled rectifiers. After the capacitor 124 has rendered the controlled rectifiers 76, 84 and 92 essentially non-conductive, that capacitor will continue to discharge through the controlled rectifier 122. Also, that capacitor will respond to the current which flows from the positive terminal of the battery 64 via resistor 136, the motor windings, capacitor 124, and the controlled rectifier 122 to become fully charged with the left-hand terminal thereof positive.

As the capacitor 124 becomes fully charged, the voltage at the left-hand terminal thereof, and thus at the base of transistor 422, will again render that transistor non-conductive, and will thus halt the flow of current through resistor 426, transistor 422, and resistors 436 and 414. Also, the voltage across the series-connected diode 418 and resistors 420 and 414 will be just a few volts; and hence the transistor 390 will again become non-conductive. As the transistor 390 again becomes non-conductive, it will act as a large resistance in parallel with the resistor 242; and will thus permit an appreciable voltage to be developed across that resistor. At this time, transistors 364, 390 and 422 will be essentially non-conductive, whereas transistors 446 and 480 will be conductive.

Although the controlled rectifiers 76, 84 and 92 become essentially non-conductive, the inductance of the armature winding 20 and of the field winding 22 will cause current to continue to flow through the motor; and that current will decay exponentially. Importantly, as pointed out hereinbefore, the current which continues to flow through the motor after the controlled rectifiers 76, 84 and 92 are rendered non-conductive will also flow through the resistor 136.

During the period of time when the controlled rectifiers 76, 84 and 92 were conducting current, enough current flowed through resistor 184, resistor 268, and those controlled rectifiers to develop a substantial voltage drop across the former resistor. However, as the controlled rectifiers 76, 84 and 92 became non-conductive, the voltage drop due to the flow of current through resistors 184 and 268 greatly decreased. This means that the sum of the voltage drops across the resistors 136 and 158 will, at the instant the controlled rectifiers 76, 84 and 92 become non-conductive, greatly exceed the voltage drop across the resistor 184 in FIG. 1B. As a result, the motor will be able to "coast" until the value of the current flowing through the series-connected resistor 136, the motor windings, and the diode 152 exponentially decays to the point where the sum of the voltage drops across the resistors 136 and 158 falls below the voltage drop across the resistor 184. At such time, the differential amplifier constituted by the transistors 156 and 182 will respond to the more positive emitter of the transistor 156 to make the transistor 218 more conductive, and thereby again render the controlled rectifier 266 conductive. At such time, that controlled rectifier will again fire the controlled rectifiers 76, 84 and 92.

As the controlled rectifiers 76, 84 and 92 again become conductive, the transistor 422 will again become conductive; and that transistor will again render the transistor 390 conductive and will again help keep the transistor 480 conductive. In addition, as the controlled rectifiers 76, 84 and 92 again become conductive, the series resonant circuit constituted by capacitor 124 and inductor 132 will again experience a half-cycle of oscillation which will discharge the capacitor 124 and then charge that capacitor with the right-hand terminal thereof positive. During that half-cycle of oscillation, the controlled rectifiers 122 and 244 will again be fully extinguished by inverse current flow, and the transistor 364 will become conductive and then will again become non-conductive. As the right-hand terminal of the capacitor 124 again becomes positive and attains a voltage close to that of the battery 64, the transistor 446 will again become nonconductive.

As the controlled rectifiers 76, 84 and 92 again became conductive, a substantial amount of current again flowed through resistors 184 and 268 and those controlled rectifiers; and the resulting sharp increase in voltage drop across the resistor 184 again increased the value of the current which must flow through the resistor 136 to make the sum of the voltage drops across that resistor and the resistor 158 exceed the voltage drop across the resistor 184. The current flowing through the resistor 136, the motor windings, and the paralleled controlled rectifiers 76, 84 and 92 will again begin to build up exponentially, and, when that current reaches the point where the sum of the voltage drops across the resistors 136 and 158 exceeds the voltage drop across the resistor 184, the differential amplifiers will again render the controlled rectifier 244 conductive. That controlled rectifier will then again render the controlled rectifier 122 conductive; and, thereupon, the capacitor 124 will again cause inverse current to flow through the controlled rectifiers 76, 84, 92 and 266 and render those controlled rectifiers non-conductive. At such time, the rotor of the motor will continue to rotate, and current will again flow from the field winding 22 via diode 152, resistor 136, and armature winding 20; and that current will decay exponentially until the sum of the voltage drops across the resistors 136 and 158 again falls below the level of the voltage drop across the resistor 184.

Each time the level of the current flowing through the resistor 136 falls far enough to make the sum of the voltage drops across that resistor and resistor 158 less than the voltage drop across resistor 184, the differential amplifiers of the control system will fire the controlled rectifier 266, and thus cause firing of the controlled rectifiers 76, 84 and 92. Each time the level of the current flowing through the resistor 136 rises far enough to make the sum of the voltage drops across that resistor and resistor 158 greater than the voltage drop across resistor 184, the differential amplifiers of the control system will fire the controlled rectifier 244 and thus cause firing of the control rectifier 122. Because the resistor 268 and the control rectifiers 76, 84 and 92 sharply increase the voltage drop across the resistor 184, whenever those controlled rectifiers are conductive, the current level at which the differential amplifiers fire the controlled rectifier 244 is well above the current level at which those differential amplifiers fire the controlled rectifier 266. Consequently, the current flowing through the motor will recurrently rise and fall between two limits which are established by the setting of movable contact of the potentiometer 48 and by the ohmic value of the resistor 268. The recurrent firing and extenguishing of the controlled rectifiers 76, 84 and 92 is desirable because it reduces the length of time during which those controlled rectifiers are conductive, and thus reduces the heating of those controlled rectifiers.

Each time the controlled rectifiers 76, 84 and 92 become conductive, the capacitor 124 will render the controlled rectifiers 244 and 122 non-conductive and will become charged with the right-hand terminal thereof positive. Also, each time the controlled rectifiers 76, 84 and 92 become conductive, the transistor 422 will become conductive to render the transistor 390 conductive and to help keep the transistor 480 conductive. In being rendered conductive, the transistor 390 keeps a further firing signal from being supplied to the controlled rectifier 266, and thus to the controlled rectifiers 76, 84 and 92, until those rectifiers are again rendered non-conductive. Moreover, each time the controlled rectifiers 76, 84 and 92 become conductive, the transistor 364 will become conductive during the half-cycle of oscillation of the resonant circuit, and will thereby prevent the application of a firing signal to controlled rectifier 244—and thus the controlled rectifier 122—during that half-cycle; and will thereafter again become non-conductive. Additionally, each time the controlled rectifiers 76, 84 and 92 become conductive, diode 470 will become back-biased and the transistor 446 will become non-conductive. Each time the controlled rectifiers 122 and 244 become conductive, the capacitor 124 will render the controlled rectifiers 76, 84, 92 and 266 non-conductive and will become charged with the left-hand terminal thereof positive. Also, each time the controlled recifiers 122 and 244 become conductive, the transistor 422 will become non-conductive, and the transistor 390 will become non-conductive. In being rendered non-conductive, the transistor 390 makes it possible for a further firing signal to be supplied to the controlled rectifier 266. As a result, the capacitor 124 will always assume the polarity which it will need to extinguish the then-conductive controlled rectifiers; and the controlled rectifiers 244 and 266 will be kept from firing at times when it would not be safe for those controlled rectifiers to be fired.

As long as the operator of the electrically-driven vehicle leaves the contacts 66 and 68 of the switch 70 closed, leaves the movable contact 44 in engagement with the "reverse" contacts 46, and holds the accelerator pedal in position to close the switch 62, the rotor of the motor will drive that vehicle in the reverse direction at the desired speed. At the time the operator of the electrically-driven vehicle moved the movable contact 44 into engagement with the "reverse" contact 46, current flowed from the positive terminal of the battery 64 via fuse 74, conductor 325, junctions 324 and 363 in FIG. 1B, conductor 365, junction 367 in FIG. 1A, diode 371, junction 381, capacitor 385, conductor 387, junction 391, in FIG. 1B, contacts 46 and 44, contacts 60 and 58 of switch 62, conductor 73, contacts 68 in FIG. 1A, fuse 72, and junction 114 to the negative terminal of that battery. That current will flow until the capacitor 385 is charged to a voltage close to the voltage across the battery 64; and, at such a time, the upper terminal of that capacitor will be positive. The charging of the capacitor 385 is not, however, significant as long as the movable contact 44 is left in engagement with the "reverse" contact 46.

If the operator of the electrically-driven vehicle wishes to increase the speed of that vehicle, he need only depress the accelerator pedal still further. If the operator does not depress that pedal far enough to cause the movable contact 59 of switch 63 to move away from the stationary contact 61 of that switch, the only change in the control system will be an increase in the reference voltage developed across the resistor 184; all as explained hereinbefore. Because of that increase in reference voltage, and because the current-time curve of the motor is non-linear and has a lesser slope in the higher current regions thereof, it will take longer for the current flowing through resistor 136 and the motor windings to build up to the level at which the differential amplifiers will fire the controlled rectifier 244; and hence the controlled rectifiers 76, 84 and 92 will have longer "on" periods. As a result, the frequency at which the controlled rectifiers 76, 84 and 92 are fired will decrease.

If the operator of the electrically-driven vehicle wishes to increase the speed of that vehicle still further, he can depress the accelerator pedal until the movable contact 59 of switch 63 moves away from the stationary contact 61 of that switch. The movement of the movable contact 59 of switch 63 will not be significant at this time; all as explained hereinbefore.

As indicated previously, the capacitor 159 and the resistor 165 are connected in series with each other and are connected in parallel with series-connected resistor 136, armature winding 20, and field winding 22; and hence that capacitor will respond to the voltage across the resistor 136 and the motor windings. That capacitor applies an average voltage to series-connected resistor 136, resistor 158, and Zener diode 161; and, when the average voltage across the Zener diode 161 exceeds twenty volts, that Zener diode will become conductive, all as explained hereinbefore. As the Zener diode 161 becomes conductive, current will flow from the positive terminal of the battery 64 via resistor 136, resistor 158, Zener diode 161, and resistor 165 to the junction 167; and then part of that current will flow via conductor 441, diode 440 in FIG. 1B, and resistor 444 to the conductor 207, another part of that current will flow via conductor 441, controlled rectifier 266 in FIG. 1B, conductor 271, and the paralleled resistor strings 82, 80 and 78, 90, 88 and 86, and 98, 96 and 94 in FIG. 1A to the conductor 207, and the rest of that current will flow via the paralleled controlled rectifier 76 and resistor 78, controlled rectifier 84 and resistor 86, and controlled rectifier 92 and resistor 94 to the conductor 207. The flow of current through the resistor 158 and the Zener diode 161 will be particularly significant when the controlled rectifiers 76, 84 and 92 are conductive; because that flow of current will establish a large voltage drop across the resistor 158, and that large voltage drop will tend to make the emitter of transistor 156 less positive than the emitter of the transistor 182. The said voltage drop across resistor 158 will simulate a substantial increase in the current flowing through the resistor 136; and the differential amplifiers will respond to the increased voltage drop across the resistor 158 to cause the controlled rectifiers 76, 84 and 92 to become non-conductive at a lower current level than they would if the Zener diode 161, the capacitor 159 and the resistor 165 were not provided, all as explained hereinbefore. By using the Zener diode 161, the capacitor 159, and the resistor 165, and by appropriately cooling the controlled rectifiers which carry the motor current, the present invention can eliminate one of the controlled rectifiers 76, 84 and 92 and still permit the control system to supply a peak value in excess of four hundred amperes to the motor. When the Zener diode 161 becomes conductive, the rotor of the motor will not be able to accelerate as rapidly as it can when that Zener diode is essentially non-conductive; but that rotor will still be able to accelerate. As a result, the operator of the electrically-driven vehicle will be able to drive that vehicle at higher speeds.

If the operator of the electrically-driven vehicle wishes to operate that vehicle at its maximum power, he need only depress the accelerator pedal to the floor; and, at such time, the movable contact of the potentiometer 48 will move to the bottom of that potentiometer, and the movable contact 52 of switch 56 will move out of engagement with the stationary contact 50 and into engagement with the stationary contact 54. Thereupon, current will flow from the positive terminal of battery 64 via fuse 74, conductor 325, holding contacts 357 in FIG. 1B, diode 335, relay coil 328, contacts 54 and 52 of switch 56, diode 362, contacts 46 and 44, contacts 60 and 58 of switch 62, conductor 73, contacts 68 in FIG. 1A, fuse 72, and junction 114 to the negative terminal of that battery. The resulting energization of the relay coil 328 will close the heavy-duty relay contacts 100 in FIG. 1A; and, thereupon, current will flow from the positive terminal of battery 64 via resistor 136, armature winding 20, contacts 24 and 26, field winding 22, contacts 32 and 34, relay contacts 100, and conductor 207 to the negative terminal of the battery. At this time, the full voltage of the battery will be applied across series-connected resistor 136, armature winding 20, and field winding 22; and that voltage will be applied uninterruptedly to those motor windings. As a result, the rotor of the motor will operate at its maximum power, and it will thus enable the electrically-driven vehicle to satisfactorily handle heavy or increased loads.

It should be noted that the controlled rectifiers 76, 84 and 92 will be rendered non-conductive as the heavy-duty relay contacts 100 are closed, all as explained hereinbefore. This is desirable because it obviates any and all possibility of the heavy-duty relay contacts 100 and any of the controlled rectifiers 76, 84 and 92 sharing current. Further, it should be noted that as long as the movable contact 52 is out of engagement with the contact 50, the controlled rectifier 122 will remain conductive; all as explained hereinbefore.

Subsequently, when the movable contact 52 of switch 56 is permitted to move up out of engagement with the contact 54 and into engagement with the contact 50, the relay coil 328 will become de-energized, and an appreciable voltage will again appear across the resistor 184. If the level of current that had been flowing through the heavy-duty relay contacts 100 was higher than the current level called for by the position of the movable contact of potentiometer 48, the controlled rectifier 122 will tend to remain conductive. However, if the level of current that had been flowing through the heavy-duty relay contacts 100 was lower than the current level called for by the position of the movable contact of potentiometer 48, the controlled rectifier 266 will tend to become conductive and will tend to render the controlled rectifiers 76, 84 and 92 conductive.

Because the controlled rectifier 122 will be conductive, at the instant the heavy-duty relay contacts 100 re-open, the motor current will have to flow through the capacitor 124 and the controlled rectifier 122 to charge that capacitor sufficiently to render the transistor 422 non-conductive, and thereby render the transistor 390 non-conductive. The charging of capacitor 124 will require a finite period of time; and this is desirable because a too-sudden application of substantially full voltage to the anodes of the controlled rectifiers 76, 84 and 92 could prematurely "fire" those controlled rectifiers.

The diode 334 in FIG. 1B keeps large voltage transients from developing as the movable contact 52 of switch 56 is moved out of engagement with the contact 54, all as described hereinbefore; and this is desirable because large voltage transients would shorten the life of switch 56 and could adversely affect other components of the control system. The resistor 332 in FIG. 1B keeps the contact-releasing time of relay coil 328 from being unduly long, all as described hereinbefore; and this is desirable, because an unduly long release time for the heavy-duty relay contacts 100 could cause hurtful arcing at those contacts.

After the operator of the electrically-driven vehicle has operated that vehicle at its maximum power level, he will usually reduce the pressure on the accelerator pedal to enable the movable contact of the potentiometer 48 to move upwardly; and, as that movable contact so moves, it will establish a reference voltage across the resistor 184 which corresponds to a power level less than maximum power level. That operator can then increase or decrease the speed of the vehicle at will, by merely increasing or decreasing the pressure on the accelerator pedal—thereby causing the movable contact of the potentiometer 48 to move downwardly or upwardly. As the setting of the movable contact of the potentiometer 48 is changed, the length of time during which the motor current builds up to the desired level will change. Also, as the average voltage across the Zener diode 161 increases to about twenty volts, the length of time during which the motor current builds up to the desired value will change. Consequently, it should be apparent that the control system provided by the present invention uses the controlled rectifiers 76, 84 and 92 in a variable frequency switching mode when it is operating the electrically-driven vehicle in the reverse direction as well as when it operating that vehicle in the forward direction.

If, after operating the electrically-driven vehicle at its maximum power level, the operator releases all pressure on the accelerator pedal, the movable contact of the potentiometer 48 will start moving up to the upper end of that potentiometer and the movable contact 52 of the switch 56 will immediately move out of engagement with the stationary contact 54. The relay coil 328 will then become de-energized with consequent re-opening of the heavy-duty relay contacts 100. Thereafter, in succession, the movable contact 59 of the switch 63 will again move into engagement with the stationary contact 61 of that switch, and the movable contact 58 of the switch 62 will move out of engagement with the stationary contact 60 of that switch. As the movable contact 58 of the switch 62 moves away from the stationary contact 60 of that switch, the lower terminal of the potentiometer 48 will be disconnected from the negative terminal of the battery 64; and hence that potentiometer will no longer be able to develop a reference voltage across the resistor 184. Further, the opening of the switch 62 will disconnect the lower terminal of the relay coil 352 from the negative terminal of the battery 64. However, the inductive energy within the relay coil 352 will force current to continue to flow from the lower terminal of that relay coil via junctions 354 and 356, diode 358, resistor 360, and junctions 333 and 355 to the upper terminal of that relay coil; and that current will tend to hold the contact 32 in engagement with contact 34 and will also tend to hold the contacts 357 closed. The inductive energy within the relay coil 352 also will force current to flow from the lower terminal of that relay coil via junctions 354, 356 and 391, conductor 387, capacitor 385 in FIG. 1A, junction 381, resistor 403, conductor 409, diode 397 in FIG. 1B, junctions 399, 395, 208, 188 and 186, resistor 184, conductor 185, junction 139 in FIG. 1A, fuse 74, conductor 325, junctions 324, 321 and 323 in FIG. 1B, holding contacts 357, and junction 355 to the upper terminal of that relay coil. Momentarily, the relay coil 352 will serve as a source of voltage with the lower terminal thereof positive, and the voltage across that relay coil will add to the voltage across the previously-charged capacitor 385 to develop a voltage which is initially close to seventy-two volts; and that voltage will force current to flow through the resistor 184 in a direction opposite to the normal flow of current through that resistor. In doing so, the relay coil 352 and the capacitor 385 will develop a voltage drop across the resistor 184 which will buck the voltage drop that is developed across that resistor by the battery 64. The bucking voltage across the resistor 184 will make the voltage at the emitter of the transistor 156 considerably less positive than the voltage at the emitter of the transistor 182; and the differential amplifiers of the control system will promptly act to cause the controlled rectifiers 244 and 122 to become conductive—thereby enabling the charge on the capacitor 124 to extinguish the controlled rectifiers 76, 84 and 92. The extinguishing of the controlled rectifiers 76, 84 and 92 will minimize any arcing which tends to develop between the contacts 32 and 34 as the flow of current through the relay coil 352 decreases to the point where that coil cannot continue to hold the contact 32 in engagement with the contact 34. As a result, the capacitor 385 will coact with the relay coil 352 to minimize arcing between the contacts 32 and 34 as those contacts separate.

If the holding contacts 357 re-open before the contacts 32 has moved away from the contact 34, the resistor 361 will provide a path for the bucking current flowing through the resistor 184. Specifically, current will flow from the lower terminal of the relay coil 352 via junctions 354, 356 and 391, conductor 387, capacitor 385 in FIG. 1A, junction 381, resistor 403, conductor 409, diode 397 in FIG. 1B, junctions 399, 395, 208, 188 and 186, resistor 184, conductor 185, junction 139 in FIG. 1A, fuse 74, conductor 325, junctions 324, 321 and 323 in FIG. 1B, switch 63, resistor 361, junctions 339 and 327, diode 331, junctions 333 and 355 to the upper terminal of that relay coil. This means that the relay coil 352 and the capacitor 385 will apply a bucking voltage across the resistor 184 until the contact 32 has moved away from the contact 34; and hence any arcing between those contacts will be minimized.

If, instead of releasing the pressure on the accelerator pedal and thereby permitting the movable contact of the potentiometer 48 to move upwardly far enough to re-open switch 62, the operator uses the forward-reverse lever, not shown, to move the contact 44 out of engagement with the "reverse" contact 46, the tendency toward arcing between the contacts 32 and 34 will be much greater. However, in that case also, the relay coil 352 will momentarily act as a source of voltage with the lower terminal thereof positive; and the voltage across that coil will add to the voltage across the capacitor 385 in FIG. 1A to force a substantial amount of current to flow through the resistor 184 in FIG. 1B—thereby developing a substantial bucking voltage drop across that resistor. That bucking voltage drop will make the voltage at the emitter of transistor 156 much less positive than the voltage at the emitter of transistor 182; and the differential amplifiers of the control system will promptly cause the controlled rectifiers 244 and 122 to become conductive, and thereby enable the charge on the capacitor 124 to extinguish the controlled rectifiers 76, 84 and 92. By the time the level of current flowing through the relay coil 352 decreases to the point where that relay coil can not continue to hold the contact 32 in engagement with the contact 34, the voltage across those contacts will have been reduced to the point where hurtful arcing can not occur.

The diode 358 in FIG. 1B keeps large voltage transients from developing as the movable contact 44 is moved out of engagement with the "reverse" contact 46; and this is desirable because large voltage transients would shorten the life of contacts 44 and 46 and could adversely affect other components of the control system. The resistor 360 in FIG. 1B keeps the contact-releasing times of relay coil 352 from being unduly long. This is desirable, because unduly long release times for the contact 32 could cause hurtful arcing at that contact.

Whether the operator of the electrically-driven vehicle permits the accelerator pedal to move far enough upwardly to permit the switch 62 to re-open or uses the forward-reverse lever, not shown, to move the contact 44 to its neutral position, the relay coil 352 will permit the holding contacts 357 to re-open and will permit the movable contact 32 to move out of engagement with the contact 34 and into engagement with the contact 30. At such time, the controlled rectifiers 76, 84 and 92 will be non-conductive, the controlled rectifiers 122 and 244 will be conductive, the capacitor 124 will be charged with the left-hand terminal thereof positive, the controlled rectifier 266 will be essentially non-conductive, the transistor 364 will be non-conductive, the transistor 390 will be non-conductive, the transistor 422 will be non-conductive, and the transistors 446 and 480 will be conductive. The control system will remain in this condition until the operator of the electrically-driven vehicle either opens the contacts 66 and 68 of the switch 70 or again uses the forward-reverse lever to shift the movable contact 44. If that operator re-opens the contacts 66 and 68 of switch 70, the control system will be in the condition described hereinbefore in the section entitled "Condition of Control System When Contacts 66 and 68 of Switch 70 are Open." If the operator of the electrically-driven vehicle uses the forward-reverse lever, not shown, to again move the movable contact 44 into engagement with the "forward" contact 42, the condition and operation of the control system will be the condition and operation described in the preceding section. On the other hand, if the operator of the electrically-driven vehicle uses the forward-reverse lever, not shown, to shift the contact 44 into engagement with the "reverse" contact 46, the condition and operation of the control system will be as described in this section.

*Electrically-driven vehicle can not start abruptly*

If the operator of the electrically-driven vehicle initially depresses the accelerator pedal far enough to open the switch 63, and thereafter uses the forward-reverse lever, not shown, to shift the movable contact 44 into engagement with the "forward" contact 42 or the "reverse" contact 46, the resistor 361 in FIG. 1B will keep the rotor of the motor from abruptly starting to rotate; and this is desirable because it will keep the electrically-driven vehicle from starting abruptly. Specifically, if the forward-reverse lever, not shown, is used to shift the contact 44 into engagement with the "forward" contact 42, current will flow from the positive terminal of the battery 64 via fuse 74, conductor 325, resistor 361 in FIG. 1B, diode 343, relay coil 338, contacts 42 and 44, switch 62, conductor 73, contacts 68 in FIG. 1A, and fuse 72 to the negative terminal of that battery. The ohmic value of the resistor 361 is large enough to hold the current flowing through the relay coil 338 to such a low value that the said relay coil will be unable to move the movable contact 26 down into engagement with the contact 28 or to close the holding contacts 351. As a result, the shifting of the contact 44 into engagement with the "forward" contact 42 will not be able to cause the rotor of the motor to rotate at all. If the operator had shifted the contact 44 into engagement with the "reverse" contact 46, the current would have flowed from the positive terminal of the battery 64 via fuse 74, conductor 325, resistor 361 in FIG. 1B, diode 331, relay coil 352, contacts 46 and 44, switch 62, conductor 73, and fuse 72 in FIG. 1A to the negative terminal of that battery. The ohmic value of the resistor 361 is large enough to hold the current flowing through the relay coil 352 to such a low value that the said relay coil will be unable to move the contact 32 down into engagement with the contact 34 or to close the holding contacts 357. Consequently, the shifting of the contact 44 into engagement with "reverse" contact 46 will not be able to cause the rotor of the motor to rotate at all. The resistor 361 also will keep the rotor of the motor from rotating at all if the operator initially shifts the contact 44 into engagement with the "forward" contact 42 or the "reverse" contact 46 and then abruptly depresses the accelerator pedal far enough to open the switch 63.

When the operator realizes that the electrically-driven vehicle is not going to move, he will release the pressure on the accelerator pedal and permit the movable contact of the potentiometer 48 to move upwardly far enough to permit the switch 63 to close. At such time, the current flowing through the relay coil 338—or through the relay coil 352 in the event the contact 44 was moved into engagement with the contact 46—will be great enough to energize that relay coil. Thereupon, the contacts controlled by that relay coil will move, and will thus cause the rotor of the motor to start rotating at an acceptable speed.

*Alternative arrangements*

If desired, the capacitor 159, the Zener diode 161, and the resistor 165 can be eliminated. Where that is done, the controlled rectifiers 76, 84 and 92 will be subjected to greater heating; but if those controlled rectifiers are effectively cooled they will be able to withstand the increased heating without injury.

The fact that the differential amplifiers of the control system are biased to render the controlled rectifier 244 conductive whenever the movable contact 44 is in its neutral position or the switch 62 is open is very desirable because it will enable the control system to "fail safe" in the event the resistor 320, the adjustable resistor 322, the potentiometer 48, the switch 56, the contacts 42, 44 and 46, or the switch 62 were to fail and become "open circuited." Also, it will enable the control system to "fail safe" in the event the leads which interconnect resistor 320, adjustable resistor 322, potentiometer 48, switch 56, contacts 42, 44 and 46, and switch 62 were to break. Further, the fact that the differential amplifiers of the control system are biased to render the controlled rectifier 244 conductive is very desirable because it will cause the controlled rectifier 266 to be non-conductive at the time the movable contact 44 is moved into engagement with the "forward" contact 42 or into engagement with the "reverse" contact 46 or the switch 62 is closed.

However, even if the differential amplifiers of the control system were not biased to render the controlled rectifier 244 conductive whenever the movable contact 44 is in its neutral position or the switch 62 is open and, instead, were in a balanced condition at such time, the controlled rectifier 244 would become conductive and the controlled rectifier 266 would be held non-conductive as the movable contact 44 was moved into engagement with the contact 42 or the contact 46. Specifically, even if the differential amplifiers were in a balanced condition, both the controlled rectifier 266 and the controlled rectifier 244 would be non-conductive prior to the time the contact 44 was moved out of its neutral position; and hence the controlled rectifier 122 would be nonconductive. As a result, the voltage at the anode of the controlled rectifier 122 would be high enough to cause the voltage drop across the resistor 414 in FIG. 1B to be great enough to render the transistor 390 conductive. Consequently, that transistor would act as a low resistance in parallel with the resistor 242 and would make it impossible for a sufficiently large voltage to be developed across that resistor to cause the controlled rectifier 266 to fire. Additionally, the voltage at the anode of the controlled rectifier 122 would be high enough to cause current to flow through the diode 478 in FIG. 1B and thereby back-bias the diode 470; and hence the transistor 446 would be non-conductive and would be unable to render the transistor 480 conductive. However, prior to the time the contact 44 would be moved out of its neutral position, the voltage at the anodes of the controlled rectifiers 76, 84 and 92, and thus at the base of transistor 422, would be about twenty-one volts; and this means that the transistor 422 would be conductive and would render the transistor 480 conductive.

As the contact 44 would be moved into engagement with the "forward" contact 42 or the "reverse" contact 46, the contact 26 or the contact 32 would complete a low impedance path between the positive terminal of battery 64 and the anodes of controlled rectifiers 76, 84 and 92; and, thereupon, the voltage at those anodes, and hence at the base of transistor 422, would closely approach the voltage at that positive terminal. The transistor 422 would then become non-conductive and would render the transistor 480 non-conductive. Because that latter transistor would be non-conductive, current would flow from the positive terminal of the battery 64 via fuse 74, contacts 66, conductor 227, junctions 226, 302, 312, 428, 448 and 450 in FIG. 1B, resistor 484, junction 482, diode 486, conductor 375, junctions 232 and 234 in FIG. 1A, resistor 236, and conductor 207 to the negative terminal of that battery. The resulting voltage drop across the resistor 236 would cause the Zener diode 258 to become conductive; and the resulting voltage drop across the resistor 262 would enable sufficient current to flow through the gate-to-cathode circuit of the controlled rectifier 244 to render that controlled rectifier conductive. Thereupon, that controlled rectifier would render the controlled rectifier 122 conductive; and, as that controlled rectifier became conductive it would cause the voltage at the right-hand terminal of the capacitor 124 to drop toward the voltage at the negative terminal of the battery 64; and, because that capacitor cannot discharge instantaneously, the voltage at the left-hand terminal of that capacitor also would drop. The transistor 422 would then become conductive and would keep the transistor 390 conductive, so that a sufficiently large voltage drop could not be developed across the resistor 242 to fire the controlled rectifier 266. Not until the capacitor 124 had charged to the point where the voltage at the left-hand terminal thereof exceeded thirty-two volts would the transistor 422 again become non-conductive and permit the transistor 390 to again become non-conductive; and, at such time, it would be safe for the controlled rectifier 266 to receive a firing signal.

As the transistor 422 became conductive, to keep the transistor 390 conductive, it caused sufficient current to flow through the resistor 462 to render the base of the transistor 480 more positive than the emitter of that transistor. At that time the transistor 480 became conductive and permitted most of the current flowing through the resistor 484 to pass through that transistor and the diode 398 to the conductor 207; and hence only a very small amount of current was able to flow through the diode 486 and the resistor 236 in FIG. 1A. Even after the transistor 422 subsequently becomes non-conductive, the transistor 480 will continue to be conductive; because the transistor 446 will be rendered conductive by the forward biasing of the diode 470, and the latter transistor will develop a sufficiently large voltage drop across resistor 462 to keep the transistor 480 conductive. Once the transistor 480 has performed its function of forcing the controlled rectifier 244 to become conductive, as contact 44 is moved into engagement with contact 42 or contact 46, that transistor will remain conductive and permit the differential amplifiers to control the firing of controlled rectifier 244. Hence, even if the differential amplifiers are not initially biased to fire controlled rectifier 244 and, instead, are initially in a balanced condition, transistor 480 will force that controlled rectifier to fire as contact 44 is moved out of its neutral position. In this way, the control system makes certain that controlled rectifiers 244 and 122 are fired, and that capacitor 124 is properly charged, before controlled rectifier 266 and controlled rectifiers 76, 84 and 92 can be fired.

Controlled rectifiers have been used in the control system of the present invention; and controlled rectifiers have been found to be very satisfactory. However, thyratrons, ignitrons, technetrons, multi-layer diodes, and other electronic switches requiring firing and extinguishing could be used. Also, while transistors have been used in the control system of the present invention, vacuum tubes, magnetic amplifiers, field effect transistors, and other control elements which respond to control signals could be used. Consequently, it should be understood that, as used herein and in the appended claims, "controlled rectifiers" and "transistors" include substitutes therefor.

*Conclusion*

It will be noted that the differential amplifier constituted by the transistors 156 and 182 responds to voltages between the zero and the thirty-six volts at the negative and positive terminals, respectively, of the battery 64. This is desirable because it obviates all need of providing a voltage which is displaced above the voltage at the positive terminal of the battery 64 or is displaced below the voltage at the negative terminal of that battery. As a result, the differential amplifier constituted by the transistors 156 and 182 obviates all need of an inverter circuit.

The difference between the current level at which the controlled rectifiers 76, 84 and 92 are extinguished and the current level at which those controlled rectifiers are again fired can be adjusted by changing the ohmic value of the resistor 268. The smaller the ohmic value of that resistor, the greater will be the difference between the current levels at which the controlled rectifiers 76, 84 and 92 are recurrently extinguished and fired. Conversely, the larger the ohmic value of the resistor 268, the smaller the difference between those current levels.

The diodes 347 and 335 in FIG. 1B will keep rapid shifting of the movable contact 44, away from the "forward" contact 42 and into engagement with the "reverse" contact 46 or vice versa, from causing abrupt changes in the direction of movement of the electrically-driven vehicle at a time when the accelerator pedal is holding the switch 63 open. For example, if it was assumed that the diodes 347 and 335 were replaced by conductors, and if it was further assumed that the contact 44 was shifted away from contact 42 and into engagement with contact 46 at a time when the accelerator pedal was holding the switch 63 open, current could flow from the positive terminal of the battery 64 via fuse 74, conductor 325, still-closed holding contacts 351, junctions 345, 349, 337, 333 and 355, relay coil 352, junctions 354, 356 and 391, contacts 46 and 44, switch 62, conductor 73, contacts 68 in FIG. 1A, and fuse 72 to the negative terminal of that battery. The consequent energization of the relay coil 352 would, because the accelerator pedal was depressed a considerable distance, cause the rotor of the motor to start rotating rapidly in the reverse direction as soon as the contact 26 moved into engagement with contact 24; and this would be very objectionable. Any such energization of the relay coil 352 is prevented by the diode 335. Specifically, if the contact 44 is shifted away from contact 42 and into engagement with contact 46 at a time when the accelerator pedal is holding the switch 63 open, current will flow from the positive terminal of the battery 64 via fuse 74, conductor 325 in FIG. 1B, resistor 361, junctions 339 and 327, diode 331, junctions 333 and 355, relay coil 352, junctions 354, 356 and 391, contacts 46 and 44, switch 62, conductor 73, contacts 68 in FIG. 1A, and fuse 72 to the negative terminal of that battery. The resistor 361 will limit the current flowing through the relay coil 352 to such an extent that the said relay coil will be unable to shift the movable contact 32 into engagement with the contact 34. This means that the operator will have to relieve the pressure on the accelerator pedal sufficiently to enable the switch 63 to close before the electrically-driven vehicle can start moving in the reverse direction; and, by the time that switch closes, the position of the movable contact of the potentiometer 48 will be such that the electrically-driven vehicle will safely come to a halt and then safely start moving in the reverse direction.

Similarly, if it was assumed that the diodes 347 and 335 were replaced by conductors, and if it was further assumed that the contact 44 was shifted away from contact 46 and into engagement with contact 42 at a time when the accelerator pedal was holding the switch 63 open, current could flow from the positive terminal of the battery 64 via fuse 74, conductor 325, still-closed holding contacts 357, junctions 355, 333, 337, 349, 345 and 353, relay coil 338, junctions 340 and 389, contacts 42 and 44, switch 62, conductor 73, contacts 68 in FIG. 1A, and fuse 72 to the negative terminal of that battery. The consequent energization of the relay coil 338 would, because the accelerator pedal was depressed a considerable distance, cause the rotor of the motor to start rotating rapidly in the forward direction as soon as the contact 32 moved into engagement with contact 30; and that would be very objectionable. Any such energization of the relay coil 338 is prevented by the diode 347. Specifically, if the contact 44 is shifted away from contact 46 and into engagement with contact 42 at a time when the accelerator pedal is holding the switch 63 open, current will flow from the positive terminal of the battery 64 via fuse 74, conductor 325, junctions 324, 321 and 323 in FIG. 1B, resistor 361, junction 339, diode 343, junctions 345 and 353, relay coil 338, junctions 340 and 389, contacts 42 and 44, switch 62, conductor 73, contacts 68 in FIG. 1A, and fuse 72 to the negative terminal of that battery. The resistor 361 will limit the current flowing through the relay coil 338 to such an extent that the said relay coil will be unable to shift the movable contact 26 into engagement with the contact 28. This means that the operator will have to relieve the pressure on the accelerator pedal sufficiently to enable the switch 63 to close before the electrically-driven vehicle can start moving in the forward direction; and, by the time that switch closes, the position of the movable contact of the potentiometer 48 will be such that the electrically-driven vehicle will safely come to a halt and then safely start moving in the forward direction.

The diode 343 keeps the positive terminal of the battery 64 from being directly connected to the upper terminal of the relay coil 352 when the contact 44 is rapidly shifted away from contact 42 and into engagement with contact 46. Thus if it was assumed that the diode 343 was replaced by a conductor, and if it was further assumed that the contact 44 was rapidly shifted away from contact 42, and into engagement with contact 46, current would flow from the positive terminal of the battery 64 via fuse 74, conductor 325, still-closed holding contacts 351, junctions 353, 345, 339 and 327, diode 331, junctions 333 and 355, relay coil 352, junctions 354, 356 and 391, contacts 46 and 44, switch 62, conductor 73, contacts 68 in FIG. 1A, and fuse 72 to the negative terminal of that battery. The consequent energization of the relay coil 352 would cause the rotor of the motor to start rotating in the reverse direction as soon as the contact 26 moved into engagement with the contact 24; and that would be very objectionable. Any such energization of the relay coil 352 is prevented by the diode 343.

Similarly, the diode 331 keeps the positive terminal of the battery 64 from being directly connected to the upper terminal of relay coil 338 when the contact 44 is rapidly shifted away from the contact 46 and into engagement with contact 42. Thus if it was assumed that the diode 331 was replaced by a conductor, and if it was further assumed that the contact 44 was rapidly shifted away from contact 46 and into engagement with contact 42, current would flow from the positive terminal of the battery 64 via fuse 74, conductor 325, still closed holding contacts 357, junctions 355, 333, 327 and 339, diode 343, junctions 345 and 353, relay coil 338, junctions 340 and 389, contacts 42 and 44, switch 62, conductor 73, contacts 68 in FIG. 1A, and fuse 72 to the negative terminal of that battery. The consequent energization of the relay coil 338 would cause the rotor of the motor to start rotating in the forward direction as soon as the contact 32 moved back into engagement with the contact 30; and that would be very objectionable. Any such energization of the relay coil 338 is prevented by the diode 331.

In the event the differential amplifiers of the control system were balanced, and were thus not biased to render the controlled rectifier 244 conductive, whenever the movable contact 44 was in its neutral position, that control system would still "fail safe" in the event the operator of the electrically-driven vehicle accidentally shifted the movable contact 44 into its neutral position at a time when the electrically-driven vehicle was being driven in the forward or reverse direction. At such time, the value of the current flowing through the resistor 136 would be great enough to make the sum of the voltages across resistors 136 and 158 exceed the voltage which the current flowing through series-connected resistor 184, resistor 268, and the parallel-connected controlled rectifier 76 and resistor 78, controlled rectifier 84 and resistor 86, and controlled rectifier 92 and resistor 94 could develop across the resistor 184; and hence the differential amplifiers would "fire" controlled rectifier 244—with consequent firing of controlled rectifier 122 and extinguishing of controlled rectifiers 76, 84 and 92. Similarly, if the switch 62 or 56 were to accidentally open, or if any of the leads to adjustable resistor 322, potentiometer 48, switch 56, contacts 42, 44 and 46, or switch 62 were to break, the control system would "fail safe."

The series-connected resistors 80 and 82, the series-connected resistors 88 and 90, and the series-connected resistors 96 and 98 constitute voltage dividers; and the resistance of each of the resistors 80, 88 and 96 is less than the resistance of each of the resistors 82, 90 and 98. As a result, when the controlled rectifier 266 becomes conductive and permits an appreciable voltage to be developed across each of the series-connected resistors 80 and 82, 88 and 90, and 96 and 98, the voltages developed across the resistors 80, 88 and 96 will be too small to injure the gate-to-cathode circuits of the controlled rectifiers 76, 84 and 92. Also, the low resistances of resistors 80, 88 and 96 will keep any noise that is picked up by conductor 271 from developing voltage drops across those resistors which would be large enough to "fire" those controlled rectifiers.

The transistors 364, 390, 422, 446 and 480, the circuits associated with those transistors, the resistors 158 and 184, and the differential amplifiers coact to establish the following parameters of operation for the control system:

(1) The controlled rectifier 266, and hence the controlled rectifiers 76, 84 and 92, cannot be rendered conductive until the voltage at the anodes of the latter controlled rectifiers closely approaches the positive voltage of battery 64 and thereby renders controlled rectifier 422 non-conductive.

(2) The controlled rectifier 266, and hence the controlled rectifiers 76, 84 and 92, cannot be rendered conductive if the voltage at the anode of the controlled rectifier 122 is appreciably greater than the voltage which exists at that anode when controlled rectifier 122 is conducting current.

(3) The controlled rectifier 266, and hence the controlled rectifiers 76, 84 and 92, will not be rendered conductive, while current is flowing through the motor windings 20 and 22, if the sum of the voltages across resistors 136 and 158 is greater than the voltage across the resistor 184.

(4) The controlled rectifier 122, and hence the controlled rectifier 122, cannot be rendered conductive while the resonant circuit, which includes inductor 132 and capacitor 124, is oscillating.

(5) The controlled rectifier 266, and hence the controlled rectifiers 76, 84 and 92, will be rendered conductive if the voltage at the anodes of the latter controlled rectifiers is close to the positive voltage of the battery 64 and if the voltage at the anode of the controlled rectifier 122 is appreciably greater than the voltage which is developed at that anode when controlled rectifier 122 is conducting current.

(6) Controlled rectifier 266, and hence controlled rectifiers 76, 84 and 92, will be rendered conductive if the sum of the voltages across the resistors 136 and 158 is less than the voltage across the resistor 184 and if the transistor 390 is non-conductive.

(7) The controlled rectifier 244, and hence the controlled rectifier 122, will be rendered conductive if the sum of the voltages across resistors 136 and 158 is greater than the voltage across the resistor 184 and if the transistor 364 is non-conductive.

In this way, the control system provided by the present invention makes certain that the controlled rectifiers 76, 84 and 92 are rendered conductive when they should be rendered conductive, makes certain that those controlled rectifiers are rendered non-conductive whenever those controlled rectifiers are supposed to be rendered non-conductive, and makes certain that those controlled rectifiers do not become conductive until they are supposed to become conductive.

Once the controlled rectifier 122 has been rendered conductive, it should remain conductive until the controlled rectifier 266 is rendered conductive and causes the series-resonant circuit, which includes capacitor 124 and inductor 132, to apply an inverse voltage to the controlled rectifier 122. If, by some mischance, the controlled rectifier 122 were to become extinguished before the controlled rectifier 266 was rendered conductive, the resistor 248, which normally supplies holding current for the controlled rectifier 122, would coact with the capacitor 124 to constitute an RC circuit that would permit the voltage at the anode of the controlled rectifier 122 to increase at a slow rate. As the voltage at that anode became appreciably greater than the voltage which appears at that anode when controlled rectifier 122 is conducting current, the voltage at the cathode of the diode 470 would become sufficiently positive to back-bias that diode, and thus render the transistor 446 non-conductive; and, since the voltage at the anodes of controlled rectifiers 76, 84 and 92 would be high enough to render transistor 422 non-conductive, the transistor 480 would become non-conductive. The resulting flow of current through resistor 484, diode 486, and resistor 236 in FIG. 1A would cause the Zener diode 258 to become conductive, with resultant firing of controlled rectifier 244 and hence of controlled rectifier 122. As a result, even if the controlled rectifier 122 were, by mischance, to become prematurely extinguished, the transistors 422, 446 and 480 would force that controlled rectifier to re-fire. This protective feature will keep ripple or noise, which inherently result from the drawing of pulse currents from a battery, from adversely affecting the operation of the control system.

By preventing premature firing of the controlled rectifier 266, and hence of the controlled rectifiers 76, 84 and 92, the present invention makes it possible to use controlled rectifiers in D.C. circuits and yet have predictable and reliable operation. Without the hereinbefore described parameters of operation provided by the transistors 364, 390, 422, 446 and 480, the circuits associated with those transistors, the resistors 158 and 184, and the differential amplifiers, the controlled rectifier 266, and hence the controlled rectifiers 76, 84 and 92, might become prematurely conductive and thus prevent proper operation of the control system.

The transistors 156 and 182 are, in the said preferred embodiment of control system provided by the present invention, germanium transistors; because silicon transistors are more costly than germanium transistors. However, if the cost of silicon transistors should decrease appreciably, silicon transistors would be used for transistors 156 and 182; because the operating characteristics of silicon transistors are less subject to change with changes in temperature than are the operating characteristics of germanium transistors. If silicon transistors were used for transistors 156 and 182, the diodes 164 and 190 and the resistors 180 and 210 could be eliminated. The elimination of resistors 180 and 210 would eliminate the leakage current which flows through those resistors, and would also eliminate the biasing voltages for those transistors which that leakage current develops across those resistors.

If it should ever become desirable to modify the control system of the present invention to enable it to provide prompt and immediate reversal of the direction of movement of the forklift, that modification can easily be made. All that needs to be done is to remove switch 63, resistor 361, and diodes 331, 335, 343 and 347.

Whereas the drawing accompanying description have shown and described a preferred embodiment of the present invention, it should be apparent to those skilled in the art that various changes may be made in the form of the invention without affecting the scope thereof.

What I claim is:
1. A control system that comprises:
   (a) a motor,
   (b) a sensing resistor connected in series with said motor,
   (c) a discharge path including said motor and said sensing resistor,
   (d) said discharge path including a diode that permits only uni-directional flow of current through said discharge path,
   (e) a plurality of controlled rectifiers,
   (f) contacts that can connect said plurality of controlled rectifiers to said motor,
   (g) said controlled rectifiers being selectively rendered conductive to cause current to flow through said sensing resistor and motor, and being selectively rendered non-conductive to enable inductive energy within said motor to cause current to flow through said motor, said discharge path, and said sensing resistor,
   (h) a firing circuit for said plurality of controlled rectifiers,
   (i) said firing circuit including a "turn on" controlled rectifier and a plurality of voltage dividers which connect that controlled rectifier to the cathodes of said plurality of controlled rectifiers,
   (j) connections between taps on said voltage dividers and the gates of said plurality of controlled rectifiers which apply voltages, smaller than the voltages developed across said voltage dividers, to said gates and thereby protect the gate-to-cathode circuits of said plurality of controlled rectifiers and also prevent premature firing of said plurality of controlled rectifiers,
   (k) a firing circuit for said "turn on" controlled rectifier,
   (l) resistors connected in series with said plurality of controlled rectifiers to keep any one of said controlled rectifiers from carrying appreciably more than its aliquot share of the current flowing through said motor, and also to keep the firing of any one of said controlled rectifiers from reducing the anode-to-cathode voltage of another of said plurality of controlled rectifiers to such a low level during the firing of said plurality of controlled rectifiers that said other controlled rectifier cannot be fired,
   (m) a reference resistor,
   (n) an adjustable resistor that is connected in series with said reference resistor and that can be adjusted to adjust the value of current which can flow through said reference resistor, and that can thereby establish a predetermined reference voltage across said reference resistor,
   (o) a "difference-establishing" resistor that is connected in series with said reference resistor and said plurality of controlled rectifiers,
   (p) a second reference resistor that is connected to said sensing resistor,
   (q) a Zener diode that is connected in series with said second reference resistor, and said Zener diode and said second reference resistor being connected in parallel with said motor.
   (r) a capacitor that is connected to said motor and to said Zener diode and that "averages" the voltage across said motor and applies said voltage to said Zener diode,
   (s) a differential amplifier which includes transistors with the bases thereof connected together and which has one input thereof connected to said sensing resistor by said second reference resistor and which has another input thereof connected to the first said reference resistor,
   (t) a "turn off" controlled rectifier to extinguish said plurality of controlled rectifiers,
   (u) a firing circuit for said "turn off" controlled rectifier that includes a further controlled rectifier,
   (v) a plurality of firing circuits for said further controlled rectifier,
   (w) one of said plurality of firing circuits for said further controlled rectifier being responsive to said differential amplifier but another of said plurality of firing circuits being independent of said differential amplifier,
   (x) a transistor which can be rendered non-conductive to permit firing of said "turn on" controlled rectifier and which can be rendered conductive to prevent firing of said "turn on" controlled rectifier,
   (y) said "turn off" controlled rectifier keeping said transistor conductive, and thereby preventing firing of said "turn on" controlled rectifier, whenever said "turn off" controlled rectifier is non-conductive,
   (z) a second transistor that can be rendered conductive to render the first said transistor conductive, and that can be rendered non-conductive to permit the first said transistor to be rendered non-conductive,
   (aa) said second transistor being connected to the anodes of said plurality of controlled rectifiers, and being conductive whenever the voltage at said anodes of said plurality of controlled rectifiers is appreciably below the voltage which appears at said anodes when said plurality of controlled rectifiers are non-conductive,
   (ab) whereby said second transistor will be conductive, and will render the first said transistor conductive to prevent firing of said "turn on" controlled rectifier, until the voltage at said anodes of said plurality of controlled rectifiers closely approaches the voltage which appears at said anodes when said plurality of controlled rectifiers are non-conductive,
   (ac) a third transistor that is part of said other of said plurality of firing circuits for said further controlled rectifier, that can be rendered non-conductive to actuate said other of said plurality of firing circuits, and that can be rendered conductive to keep said other of said plurality of firing circuits from firing said further controlled rectifier, (ad) a fourth transistor that can be rendered conductive to render said third transistor conductive and that can be rendered non-conductive to permit said third transistor to be rendered non-conductive, (ae) said fourth transistor responding to the voltage at the anode of said "turn off" controlled rectifier, and being rendered non-conductive, whenever the voltage at said anode is appreciably higher than the voltage which appears at said anode when said "turn off" controlled rectifier is conductive, thereby permitting said third transistor to become non-conductive, (af) said second transistor being adapted to render said third transistor conductive whenever it becomes conductive, and to permit said third transistor to become non-conductive whenever it is rendered non-conductive, (ag) whereby said third transistor can be rendered conductive by said second transistor or by said fourth transistor, (ah) a fifth transistor that can be rendered non-conductive to permit firing of said further controlled rectifier and that can be rendered conductive to prevent firing of said further controlled rectifier, (ai) a commutating circuit that can extinguish said "turn off" controlled rectifier and said further controlled rectifier, (aj) said fifth transistor being connected to said commutating circuit and responding to said commutating circuit, while said commutating circuit is extinguishing said "turn off" and said further controlled rectifiers, to become conductive and thereby prevent firing of said further controlled rectifier, (ak) a shunt that is connectable in parallel with said plurality of said controlled rectifiers, (al) said shunt being connectable in parallel with said plurality of controlled rectifiers to provide maximum power for said motor, (am) a switch that causes said differential amplifier to actuate said one of said plurality of firing circuits for said further controlled rectifier, and thereby effect extinguishing of said plurality of controlled rectifiers, whenever said shunt is connected in parallel with said plurality of controlled rectifiers, (an) coils that control the said contacts which connect said plurality of controlled rectifiers to said motor, (ao) forward-reverse switch that controls said coils, (ap) capacitors, one or the other of which charges whenever said forward-reverse switch is in the forward or reverse position and which responds to shifting of said forward-reverse switch to its neutral position to establish a reverse voltage across the first said reference resistor which will cause said differential amplifier to drive the current flowing through said motor toward zero, (aq) said Zener diode that is connected in series with said second reference resistor being substantially non-conductive when the average voltage across said motor is low but becoming conductive whenever the average voltage across said motor reaches a predetermined value, (ar) said second reference resistor responding to the current which flows through it, when said Zener diode is rendered conductive, to cause said differential amplifier to actuate said one of said plurality of firing circuits for said further controlled rectifier before the power supplied to said motor can injure said plurality of controlled rectifiers, (as) a second switch that normally is closed when said motor is operating at low power levels but that normally is open when said motor is operating at high power levels, (at) said second switch having a resistor connected in parallel with it, (au) said second switch and said parallel-connected resistor being connected to said coils, and said resistor preventing full energization of a previously-de-energized coil if said previously de-energized coil is to be energized while said motor is operating at high power levels, whereby said resistor prevents abrupt changes of rotation of said motor when said motor is operating at high power levels, (av) said "difference-establishing" resistor responding to the rendering of said plurality of controlled rectifiers conductive to materially increase the current flowing through, and the voltage across, said reference resistor, thereby causing said differential amplifier to actuate said one of said plurality of firing circuits at a current level which is spaced from the current level at which said differential amplifier actuates said firing circuit for said "turn on" controlled rectifier by a predetermined difference, (aw) the first said reference resistor having a value which is smaller than the value of said second reference resistor, thereby biasing said differential amplifier to actuate said one of said plurality of firing circuits for said further controlled rectifier, and (ax) a D.C. power source to supply direct current to said control system.

2. A control system that comprises:

(a) a motor, (b) a sensing resistor connected in series with said motor, (c) a discharge path including said motor and said sensing resistor, (d) a controlled rectifier, (e) said controlled rectifier being selectively rendered conductive to cause current to flow through said sensing resistor and motor, and being selectively rendered non-conductive to enable inductive energy within said motor to cause current to flow through said motor, said discharge path, and said sensing resistor, (f) a firing circuit for said controlled rectifier, (g) said firing circuit including a "turn on" controlled rectifier, (h) a firing circuit for said "turn on" controlled rectifier, (i) a reference resistor, (j) an amplifier which has one input thereof connected to said sensing resistor and which has another input thereof connected to said reference resistor, (k) a "turn off" controlled rectifier to extinguish the first said controlled rectifier, (l) a plurality of firing circuits for said "turn off" controlled rectifier, (m) one of said plurality of firing circuits for said "turn off" controlled rectifier being responsive to said amplifier but another of said plurality of firing circuits being independent of said amplifier, (n) a transistor which can be rendered non-conductive to permit firing of said "turn on" controlled rectifier and which can be rendered conductive to prevent firing of said "turn on" controlled rectifier, (o) said "turn off" controlled rectifier keeping said transistor conductive, and thereby preventing firing of said "turn on" controlled rectifier, whenever said "turn off" controlled rectifier is non-conductive, (p) a further transistor that is part of said other of said plurality of firing circuits for said "turn off" controlled rectifier, that can be rendered non-conductive to actuate said other of said plurality of firing circuits, and that can be rendered conductive to keep said other of said plurality of firing circuits from firing said "turn off" controlled rectifier.

3. A control system which comprises:
(a) a transistor,
(b) a second transistor,
(c) a conductor which interconnects the bases of said transistors,
(d) a voltage averaging circuit connected between the collectors of the first said and said second transistors,
(e) resistors which connect the collectors of the first said and said second transistors to a common potential point,
(f) said resistors being substantially equal in value,
(g) a differential amplifier that comprises two transistors and that has the collector of one of the transistors thereof connected to a substantially-fixed potential point and that has the collector of the other transistor thereof connected to said conductor,
(h) a second conductor that interconnects the emitters of the transistors of said differential amplifier and that is connected to a point of potential by a further resistor,
(i) the base of said one transistor of said differential amplifier being connected to a point intermediate the ends of said voltage averaging circuit,
(j) the first said resistors substantially constituting the collector loads of the first said and said second transistors, so the collector currents of the first said and said second transistors substantially constitute the emitter currents of the first said and said second transistors, and said differential amplifier varying the conductivities of the first said and said second transistors to hold the sum of the collector currents of those transistors substantially constant,
(k) whereby the first said and said second transistors act as a second differential amplifier, and
(l) whereby the emitters of the first said and said second transistors constitute the inputs for the said second differential amplifier,
(m) an electric motor, and
(n) an impedance connected in series relation with said electric motor so current flowing through said electric motor also flows through said impedance,
(o) said emitters of the frst said and said second transistors being connected to said impedance to enable said second differential amplifier to sense the current flowing through said impedance, and thus through said electric motor.

4. A control system which comprises:
(a) a transistor,
(b) a second transistor,
(c) a conductor which interconnects the bases of said transistors,
(d) a voltage averaging circuit connected between the collectors of the first said and said second transistors,
(e) resistors which connect the collectors of the first said and said second transistors to a common potential point,
(f) said resistors being substantially equal in value,
(g) a differential amplifier that comprises two transistors and that has the collector of one of the transistors thereof connected to a substantially-fixed potential point and that has the collector of the other transistor thereof connected to said conductor, and
(h) a second conductor that interconnects the emitters of the transistors of said differential amplifier and that is connected to a point of potential by a further resistor,
(i) the base of said one transistor of said differential amplifier being connected to a point intermediate the ends of said voltage averaging circuit,
(j) the first said resistors substantially constituting the collector loads of the first said and said second transistors, so the collector currents of the first said and said second transistors substantially constitute the emitter currents of the first said and said second transistors, and said differential amplifier varying the conductivities of the first said and said second transistors to hold the sum of the collector currents of those transistors substantially constant,
(k) wheryby the first said and said second transistors act as a second differential amplifier, and
(l) whereby the emitters of the first said and said second transistors constitute the inputs for the said second differential amplifier.

5. A control system which comprises:
(a) a transistor,
(b) a second transistor,
(c) a conductor which interconnects the bases of said transistors,
(d) a voltage averaging circuit connected between the collectors of the first said and said second transistors,
(e) resistors which connect the collectors of the first said and said second transistors to a common potential point,
(f) said resistors being substantially equal in value,
(g) a differential amplifier that comprises two transistors and that has the collector of one of the transistors thereof connected to a substantially-fixed potential point and that has the collector of the other transistor thereof connected to said conductor, and
(h) a second conductor that interconnects the emitters of the transistors of said differential amplifier and that is connected to a point of potential by a further resistor,
(i) the base of said one transistor of said differential amplifier being connected to a point intermediate the ends of said voltage averaging circuit,
(j) the first said resistors substantially constituting the collector loads of the first said and said second transistors, so the collector currents of the first said and said second transistors substantially constitute the emitter currents of the first said and said second transistors, and said differential amplifier varying the conductivities of the first said and said second transistors to hold the sum of the collector currents of those transistors substantially constant,
(k) whereby the first said and said second transistors act as a second differential amplifier, and
(l) whereby the emitters of the first said and said second transistors constitute the inputs for the said second differential amplifier.

6. A control system which comprises:
(a) a transistor,
(b) a second transistor,
(c) a conductor which interconnects the bases of said transistors so the voltages at said bases are always substantially equal,
(d) resistors which connect the collectors of the first said and said second transistors to a common potential point, and
(e) a circuit connected to sense the collector currents of said transistors and connected to said transistors to regulate the gains of said transistors in accordance with said collector currents and thereby maintain the sum of the collector currents of said transistors substantially constant,
(f) said resistors substantially constituting the collector loads of said transistors so the collector currents of said transistors substantially constitute the emitter currents of said transistors,
(g) whereby said transistors act as a differential amplifier, and
(h) the emitter of the first said transistor being independent of the emitter of said second transistor whereby the emitters of said transistors are not connected to a common emitter resistor and thus can constitute the inputs for said differential amplifier.

7. A control system which comprises:
(a) a plurality of controlled rectifiers that are connected with the anode-cathode circuits thereof in parallel with each other, (b) a source of power connected to the anode-cathode circuits of said parallel-connected controlled rectifiers, (c) a source of firing signals connected to the gate-to-cathode circuit of each of said controlled rectifiers, (d) a resistor that is connected in series with the anode-cathode circuit of one of said controlled rectifiers, and (e) a second resistor that is connected in series with the anode-cathode circuit of a second of said controlled rectifiers, (f) said resistors performing the dual function of keeping said controlled rectifiers from conducting an unduly great proportion of the current passing from said power source through said controlled rectifiers and of keeping the firing of either of said controlled rectifiers from reducing the anode-to-cathode voltage of the other controlled rectifier to such a low level, during the firing of said parallel-connected controlled rectifiers, that said other controlled rectifier could not be fired.

8. A control system which comprises:
(a) a controlled rectifier,
(b) a circuit connected to said controlled rectifier to selectively effect firing of said controlled rectifier,
(c) a second circuit connected to said controlled rectifier to selectively effect firing of said controlled rectifier,
(d) the first said circuit including a resistor through which current flows and an amplifier which is connected to said resistor and which senses the current flowing through said resistor,
(e) said amplifier responding to a predetermined current flowing through said resistor to effect firing of said controlled rectifier,
(f) said second circuit including an electronic switch that is normally conductive during the operation of said control system and that will not, while it is conductive, effect firing of said controlled rectifier,
(g) said electronic switch, whenever it becomes non-conductive during the operation of said control system, causing said second circuit to effect firing of said controlled rectifier, and
(h) a D.C. power source to supply direct current to said controlled rectifier and to the first said and said second circuits of said control system.

9. A control system which comprises:
(a) a controlled rectifier,
(b) a circuit connected to said controlled rectifier to selectively effect firing of said controlled rectifier, and
(c) a second circuit connected to said controlled rectifier to selectively effect firing of said controlled rectifier,
(d) the first said circuit including a value-sensing element and an amplifier which are connected together and which coact to effect firing of said controlled rectifier whenever the value sensed by said value-sensing element attains a predetermined level,
(e) said second firing circuit being insensitive to the value sensed by said value-sensing element but being sensitive to the effective resistance of said controlled rectifier and responding to the resulting increase in the resistance of said controlled rectifier to re-fire said controlled rectifier in the event said controlled rectifier prematurely becomes extinguished,
(f) said value-sensing element being a resistor which will respond to the current flowing therethrough to develop a voltage thereacross,
(g) said second circuit including an element which responds to increases in resistance of said controlled rectifier to effect firing of said controlled rectifier,
(h) said second circuit being essentially independent of the operation of the first said circuit and normally being inactive and thus normally not effecting firing of said controlled rectifier,
(i) said second circuit becoming active and effecting firing of said controlled rectifier if the first said circuit effects firing of said controlled rectifier and said controlled rectifier prematurely becomes extinguished.

10. A control system which comprises:
(a) a controlled rectifier,
(b) a circuit to said controlled rectifier to selectively effect firing of said controlled rectifier, and
(c) a second circuit connected to said controlled rectifier to selectively effect firing of said controlled rectifier,
(d) the first said circuit including a value-sensing element and an amplifier which are connected together and which coact to effect firing of said controlled rectifier whenever the value sensed by said value-sensing element attains a predetermined level,
(e) said second circuit being insensitive to the value sensed by said value-sensing element but being sensitive to the effective resistance of said controlled rectifier and responding to the resulting increase in the resistance of said controlled rectifier to re-fire said controlled rectifier in the event said controlled rectifier prematurely becomes extinguished,
(f) said second circuit being essentially independent of the operation of the first said circuit and normally being inactive and thus normally not effecting firing of said controlled rectifier,
(g) said second circuit becoming active and effecting firing of said controlled rectifier if the first said circuit effects firing of said controlled rectifier and said controlled rectifier prematurely becomes extinguished.

11. A control system that comprises:
(a) a load,
(b) a sensing resistor,
(c) an electronic switch that can be selectively rendered conductive and that can be selectively rendered non-conductive,
(d) said load and said sensing resistor and said electronic switch being connected in series relation with each other and across a source of direct current,
(e) a reference resistor,
(f) a further resistor that is connected in series with said reference resistor so current flowing through said further resistor also flows through said reference resistor,
(g) a second reference resistor that is connected to said sensing resistor,
(h) a firing circuit that is connected to said electronic switch and that can selectively render said electronic switch conductive,
(i) an extinguishing circuit that is connected to said electronic switch and that can selectively render said electronic switch non-conductive by applying an inverse voltage to said electronic switch,
(j) a control circuit that is connected to said first said reference resistor and to said second reference resistor and that responds to the voltage across the first said reference resistor and to the voltage across said second reference resistor and said sensing resistor to actuate said firing circuit to render said electronic switch conductive and to actuate said extinguishing circuit to render said electronic switch non-conductive,
(k) said control circuit tending to actuate said extinguishing circuit to render said electronic switch non-conductive whenever the voltage across said sensing resistor and said second reference resistor exceeds the voltage across the first said reference resistor,
(l) said control circuit tending to actuate said firing circuit to render said electronic switch conductive whenever the voltage across the first said reference resistor exceeds the voltage across said sensing resistor and said second reference resistor by a predetermined value, (m) said further resistor being adapted to cause sufficient current to flow through the first said reference resistor to make the voltage across the first said reference resistor exceed the voltage across said sensing resistor and said second reference resistor by said predetermined value, (n) the ohmic value of said second resistor exceeding the ohmic value of the first said reference resistor so "opening" of the lead between the first said reference resistor and said further resistor would reduce the voltage across the first said reference resistor to a value less than the voltage across said sensing resistor and said second reference resistor, and thereby tend to render said electronic switch non-conductive.

12. A control system which comprises:
(a) a controlled rectifier that has an impedance connected between the gate and cathode thereof,
(b) a circuit connected to said controlled rectifier to selectively effect firing of said controlled rectifier, and
(c) a second circuit connected to said controlled rectifier to selectively effect firing of said controlled rectifier,
(d) the first said circuit including a value-sensing element,
(e) the first said circuit acting, whenever the value sensed by said value-sensing element attains a predetermined value, to effect firing of said controlled rectifier,
(f) said second firing circuit being insensitive to the value sensed by said value-sensing element but being sensitive to the effective resistance of said controlled rectifier responding to the resulting increase in the resistance of said controlled rectifier to re-fire said controlled rectifier in the event said controlled rectifier prematurely becomes extinguished,
(g) the first said and said second circuits having said impedance in common but normally operating independently of each other,
(h) said second circuit being essentially independent of the operation of the first said circuit and normally being inactive and thus normally not effecting firing of said controlled rectifier,
(i) said second circuit becoming active and effecting firing of said controlled rectifier if the first said circuit effects firing of said controlled rectifier and said controlled rectifier prematurely becomes extinguished.

13. A control system which comprises:
(a) a controlled rectifier,
(b) a second controlled rectifier,
(c) a firing circuit for the first said controlled rectifier which is connected to the gate of the first said controlled rectifier,
(d) a transistor that is connected in shunting relation with a portion of said firing circuit and is selectively rendered conductive to effectively shunt said portion of said firing circuit and thereby keep said firing circuit from firing the first said controlled rectifier and that is selectively rendered non-conductive to permit said firing circuit to render the first said controlled rectifier conductive,
(e) said second controlled rectifier being connected to the first said controlled rectifier and being selectively rendered conductive to apply inverse voltages to the first said controlled rectifier to extinguish the first said controlled rectifier,
(f) said second controlled rectifier, whenever it is nonconductive, rendering said transistor conductive and, whenever it is conductive, permitting said transistor to become nonconductive,
(g) whereby said second controlled rectifier, as long as it is non-conductive, prevents firing of the first said controlled rectifier but, whenever it is conductive, permits firing of the first said controlled rectifier.

14. A control system which comprises:
(a) a controlled rectifier,
(b) a second controlled rectifier,
(c) a firing circuit for the first said controlled rectifier which is connected to the gate of the first said controlled rectifier,
(d) a transistor that is connected in shunting relation with a portion of said firing circuit and is selectively rendered conductive to effectively shunt said portion of said firing circuit and thereby keep said firing circuit from firing the first said controlled rectifier and that is selectively rendered non-conductive to permit said firing circuit to render the first said controlled rectifier conductive,
(e) a second transistor that is connected to the first said transistor and is selectively rendered conductive to render the first said transistor conductive and that is selectively rendered non-conductive to permit the first said transistor to be rendered non-conductive,
(f) said second transistor becoming conductive, and thereby making certain that the first said transistor is conductive, whenever said second controlled rectifier becomes conductive,
(g) whereby the first said controlled rectifier can not be rendered conductive while said second controlled rectifier is conductive,
(h) said second transistor becoming non-conductive, and thereby permitting the first said transistor to become non-conductive, whenever said second controlled rectifier becomes non-conductive,
(i) whereby the first said controlled rectifier can be rendered conductive while said second controlled rectifier is non-conductive.

15. A control system which comprises:
(a) a controlled rectifier,
(b) a second controlled rectifier,
(c) a third controlled rectifier,
(d) a firing circuit for the first said controlled rectifier which is connected to the gate of the first said controlled rectifier,
(e) a transistor that is connected in shunting relation with a portion of said firing circuit and is selectively rendered conductive to effectively shunt said portion of said firing circuit and thereby keep said firing circuit from firing the first said controlled rectifier and that is selectively rendered non-conductive to permit said firing circuit to render the first said controlled rectifier conductive,
(f) said third controlled rectifier being connected to the first said controlled rectifier and being selectively rendered conductive to extinguish the first said controlled rectifier by applying an inverse voltage to the first said controlled rectifier,
(g) a second transistor that is connected to the first said transistor and is selectively rendered conductive to render the first said transistor conductive and that is selectively rendered non-conductive to permit the first said transistor to be rendered non-conductive,
(h) said second transistor becoming conductive, and thereby making certain that the first said transistor is conductive, whenever said second controlled rectifier becomes conductive,
(i) the first said transistor becoming conductive whenever said third controlled rectifier becomes non-conductive,
(j) whereby the first said controlled rectifier can not be rendered conductive while said second controlled rectifier is conductive or while said third controlled rectifier is non-conductive.

16. A control system which comprises:
(a) a controlled rectifier, (b) a second controlled rectifier,
(c) a firing circuit for the first said controlled rectifier which is connected to the gate of the first said controlled rectifier,
(d) a transistor that is connected in shunting relation with a portion of said firing circuit and is selectively rendered non-conductive to cause said firing circuit to fire the first said controlled rectifier,
(e) a second transistor that is connected to the first said transistor and is selectively rendered conductive to render the first said transistor conductive and that is selectively rendered non-conductive to permit the first said transistor to be rendered non-conductive,
(f) a third transistor that is connected to the first said transistor and is selectively rendered conductive to render the first said transistor conductive and that is selectively rendered non-conductive to permit the first said transistor to be rendered non-conductive,
(g) said second transistor becoming non-conductive, and thereby permitting the first said transistor to become non-conductive, whenever said second controlled rectifier becomes non-conductive,
(h) said third transistor becoming non-conductive, and thereby permitting the first said transistor to become non-conductive, whenever the first said controlled rectifier becomes non-conductive,
(i) whereby said firing circuit will fire the first said controlled rectifier whenever both said first said controlled rectifier and said second controlled rectifier are non-conductive.

17. A control system which comprises:
(a) a controlled rectifier,
(b) a second controlled rectifier,
(c) a firing circuit for the first said controlled rectifier which is connected to the gate of the first said controlled rectifier,
(d) a transistor that is connected in shunting relation with a portion of said firing circuit and is selectively rendered conductive to keep said firing circuit from firing the first said controlled rectifier and that is selectively rendered non-conductive to permit said firing circuit to render the first said controlled rectifier conductive,
(e) a second firing circuit for said second controlled rectifier which is connected to the gate of said second controlled rectifier,
(f) a second transistor that can be rendered non-conductive to cause said second firing circuit to fire said second controlled rectifier and that, when rendered conductive, can not cause said second firing circuit to fire said second controlled rectifier, and
(g) a third transistor that is connected to the first said and said second transistors and is selectively rendered conductive to render the first said and said second transistors conductive, and that can be rendered non-conductive to permit the first said and said second transistors to become non-conductive,
(h) said third transistor becoming conductive whenever the first said controlled rectifier is conductive,
(i) whereby the first said firing circuit will not apply a firing signal to the first said controlled rectifier and said second firing circuit will not apply a firing signal to said second controlled rectifier as long as the first said controlled rectifier is conductive.

18. A control system which comprises:
(a) a controlled rectifier,
(b) a second controlled rectifier,
(c) a firing circuit, for the first said controlled rectifier, that includes a resistor which is connected to the gate of the first said controlled rectifier and across which a predetermined voltage must be developed to effect firing of the first said controlled rectifier,
(d) a second firing circuit, for said second controlled rectifier, that includes a second resistor which is connected to the gate of said second controlled rectifier and across which a second predetermined voltage must be developed to effect firing of said second controlled rectifier,
(e) a transistor that is essentially connected in parallel with the first said resistor,
(f) a second transistor that is essentially connected in parallel with said second resistor,
(g) the first said transistor, whenever it is conductive, acting as a low resistance in parallel with the first said resistor and thereby keeping the first said predetermined voltage from being developed across the first said resistor to prevent firing of the first said controlled rectifier by the first said firing circuit,
(h) said second transistor, whenever it is conductive, acting as a low resistance in parallel with said second resistor, and thereby keeping said second predetermined voltage from being developed across said second resistor to prevent firing of said second controlled rectifier by said second firing circuit, and
(i) a resonant circuit that is connected to the first said controlled rectifier and that can render the first said controlled rectifier non-conductive,
(j) the first said transistor being rendered conductive and thereby preventing the application of firing signals to the first said controlled rectifier by the first said firing circuit while said resonant circuit is rendering the first said controlled rectifier non-conductive,
(k) said second transistor being rendered conductive and thereby preventing the application of firing signals to said second controlled rectifier by said second firing circuit whenever the first said controlled rectifier is non-conductive.

19. A control system which comprises:
(a) a controlled rectifier,
(b) a second controlled rectifier,
(c) a firing circuit for the first said controlled rectifier which is connected to the gate of the first said controlled rectifier,
(d) a second firing circuit for said second controlled rectifier which is connected to the gate of said second controlled rectifier,
(e) a transistor,
(f) a second transistor,
(g) the first said transistor, whenever it is conductive, preventing the firing of the first said controlled rectifier by the first said firing circuit,
(h) said second transistor, whenever it is conductive, preventing the firing of said second controlled rectifier by said second firing circuit, and
(i) an extinguishing circuit connected to the first said controlled rectifier to selectively render the first said controlled rectifier non-conductive,
(j) the first said transistor being rendered conductive and thereby preventing the application of firing signals to the first said controlled rectifier by the first said firing circuit, while said extinguishing circuit is rendering the first said controlled rectifier non-conductive,
(k) said second transistor being rendered conductive and thereby preventing the application of firing signals to said second controlled rectifier by said second firing circuit whenever the first said controlled rectifier is non-conductive.

20. A control system which comprises:
(a) a controlled rectifier that is selectively rendered conductive and that is selectively rendered non-conductive,
(b) a second controlled rectifier that is selectively rendered conductive and that is selectively rendered non-conductive,
(c) a firing circuit for the first said controlled rectifier which is connected to the gate of the first said controlled rectifier,
(d) a second firing circuit for said second controlled rectifier which is connected to the gate of said controlled rectifier, (e) a control element connected in parallel with a portion of the first said firing circuit, and means to render said control element conductive whenever the first said controlled rectifier is being rendered non-conductive, (f) a second control element connected in parallel with a portion of said second firing circuit, and further means to render said second control element conductive whenever said second controlled rectifier is being rendered non-conductive, and (g) an extinguishing circuit connected to the first said controlled rectifier to selectively render the first said controlled rectifier non-conductive, (h) the first said control element preventing the firing of the first said controlled rectifier by the first said firing circuit, by becoming conductive and thereby shunting the signal which the first said firing circuit supplies to the first said controlled rectifier, while said extinguishing circuit is rendering the first said controlled rectifier non-conductive, (i) said second control element preventing the firing of said second controlled rectifier by said second firing circuit, by becoming conductive and thereby shunting the signal which said second firing circuit supplies to said second controlled rectifier, whenever the first said controlled rectifier is non-conductive.

21. A control system which comprises:
(a) a controlled rectifier that is selectively rendered conductive and that is selectively rendered non-conductive,
(b) a firing circuit for said controlled rectifier which is connected to the gate of said controlled rectifier,
(c) a control element connected in parallel with a portion of said firing circuit, and means to render said control element conductive whenever said controlled rectifier is being rendered non-conductive, and
(d) an extinguishing circuit connected to said controlled rectifier to selectively render said controlled rectifier non-conductive,
(e) said control element preventing the firing of said controlled rectifier by said firing circuit, by becoming conductive and thereby shunting the signal which said firing circuit supplies to said controlled rectifier, while said extinguishing circuit is rendering the said controlled rectifier non-conductive.

22. A control system which comprises:
(a) an electric motor,
(b) a controlled rectifier that is connected in series with said motor,
(c) a circuit that can render said controlled rectifier conductive and non-conductive on a variable frequency basis,
(d) a normally-open shunt in parallel with said controlled rectifier,
(e) a coil that can be energized to close said shunt, and
(f) a switch that normally constitutes a part of said circuit, but that is actuatable to open said circuit and to energize said coil,
(g) said switch keeping said controlled rectifier and said shunt from simultaneously applying power to said motor.

23. A control system that comprises:
(a) a motor,
(b) contacts connected in series with said motor,
(c) a coil that can be energized to close said contacts and that can be de-energized to permit said contacts to open,
(d) an energizing circuit for said coil that includes a switch and a resistor which is connected in parallel with said switch,
(e) said switch shunting said resistor whenever it is closed, (f) an adjustable resistor that can have the effective resistance thereof varied to vary the speed of the rotor of said motor,
(g) a connection between said adjustable resistor and said switch that leaves said switch closed at low-speed settings of said adjustable resistor, and that opens said switch at higher speed settings of said adjustable resistor,
(h) said resistor, whenever said switch is open, limiting the current flowing therethrough and through said coil to a value which is too small to cause said coil to close said contacts,
(i) said switch remaining closed long enough to permit sufficient current to flow through said coil to close said contacts if the speed setting of said adjustable resistor is gradually increased, but said switch opening quickly and thereby enabling said resistor to keep said coil from closing said contacts if said adjustable resistor is abruptly set to a high speed setting,
(j) whereby a gradual increase in the speed setting of said adjustable resistor will cause an energization of said coil but an abrupt advance in the setting of said adjustable resistor will keep said coil from closing said contacts.

24. A control system that comprises:
(a) a controlled rectifier,
(b) a firing circuit for said controlled rectifier which is connected to the gate of said controlled rectifier,
(c) an extinguishing circuit for said controlled rectifier which is connected to the anode-cathode circuit of said controlled rectifier to selectively apply an inverse voltage to said controlled rectifier,
(d) a sensing element,
(e) a reference element,
(f) a resistor that is connected to said reference element and to said controlled rectifier to cause current to flow through said resistor and said reference element whenever said controlled rectifier is conductive,
(g) said firing circuit and said extinguishing circuit alternately firing and extinguishing said controlled rectifier,
(h) said resistor being substantially free of current flow therethrough whenever said controlled rectifier is non-conductive but having a substantial current flow therethrough, and thus causing a substantial increase in the current flowing through said reference element, whenever said controlled rectifier is conductive,
(i) whereby the voltage across said reference element is materially greater whenever said controlled rectifier is conductive,
(j) said firing circuit and said extinguishing circuit operating in response to differences between the voltages across said sensing element and said reference element,
(k) whereby the increased voltage across said reference element, due to said resistor, causes said firing circuit to fire said controlled rectifier at a current level substantially below the current level at which said extinguishing circuit extinguishes said controlled rectifier.

25. A control system that comprises:
(a) a motor,
(b) "forward" contacts connected in series with said motor,
(c) "reverse" contacts connected in series with said motor,
(d) a "forward" coil that can be energized to close said "forward" contacts and that can be de-energized to permit said "forward" contacts to open,
(e) a "reverse" coil that can be energized to close said "reverse" contacts and that can be de-energized to permit said "reverse" contacts to open,
(f) an energizing circuit for said "forward" coil that includes a switch and a resistor which is connected in parallel with said switch,
(g) said switch shunting said resistor whenever it is closed,
(h) an energizing circuit for said "reverse" coil that includes said switch and said resistor,
(i) an adjustable resistor that can have the effective resistance thereof varied to vary the power supplied to the rotor of said motor,
(j) a connection between said adjustable resistor and said switch that leaves said switch closed at low power settings of said adjustable resistor, and that opens said switch at higher power settings of said adjustable resistor,
(k) said resistor, whenever said switch is open, limiting the current flowing therethrough and through said coils to a value which is too small to cause either of said coils to close the contacts which it controls,
(l) said switch being open at high power settings of said adjustable resistor, and thereby keeping either of said coils from becoming energized at high power settings of said adjustable resistor,
(m) whereby abrupt reversal of said rotor of said motor is prevented at high power settings of said adjustable resistor.

26. A control system which comprises:
(a) a series-wound motor,
(b) a small-value impedance,
(c) a selectively-conductive element that can be selectively rendered conductive and that can be selectively rendered non-conductive,
(d) said electric motor and said small-value impedance and said selectively-conductive element being connected in series relation with each other and being connectable across a source of direct current,
(e) said selectively-conductive element permitting said source of direct current to pass direct current through said electric motor and through said small-value impedance and through said selectively-conductive element whenever said selectively-conductive element is rendered conductive,
(f) said selectively-conductive element keeping said source of direct current from passing direct current through said electric motor and through said small-value impedance and through said selectively-conductive element whenever said selectively-conductive element is rendered non-conductive,
(g) a sensing circuit connected to said small-value impedance to sense the amount of current flowing through said small-value impedance, and thereby sense the amount of current flowing through said motor,
(h) a firing circuit that can selectively render said selectively-conductive element conductive, and
(i) an extinguishing circuit that can selectively render said selectively-conductive element non-conductive,
(j) said sensing circuit causing said firing circuit to render said selectively-conductive element conductive when said electric motor and said small-value impedance and said selectively-conductive element are connected across said source of said direct current and the amount of current flowing through said small-value impedance, and hence through said electric motor, falls below a predetermined value,
(k) said sensing circuit causing said extinguishing circuit to render said selectively-conductive element non-conductive when said electric motor and said small-value impedance and said selectively-conductive element are connected across said source of said direct current and the amount of current flowing through said small-value impedance, and hence through said electric motor, rises above a second predetermined value,
(l) whereby said control system will recurrently cause the current flowing through said small value impedance, and hence through said electric motor, to rise and fall between predetermined upper and lower limits.

27. A control system which comprises:
(a) a series-wound motor,
(b) a small-value impedance,
(c) a selectively-conductive element that can be selectively rendered conductive and that can be selectively rendered non-conductive,
(d) said electric motor and said small-value impedance and said selectively-conductive element being connected in series relation with each other and being connectable across a source of direct current,
(e) said selectively-conductive element permitting said source of direct current to pass direct current through said electric motor and through said small-value impedance and through said selectively-conductive element whenever said selectively-conductive element is rendered conductive,
(f) said selectively-conductive element keeping said source of direct current from passing direct current through said electric motor and through said small-value impedance and through said selectively-conductive element whenever said selectively-conductive element is rendered non-conductive,
(g) a sensing circuit connected to said small-value impedance to sense the amount of current flowing through said small-value impedance, and thereby sense the amount of current flowing through said motor,
(h) a firing circuit that can selectively render said selectively-conductive element conductive, and
(i) an extinguishing circuit that can selectively render said selectively-conductive element non-conductive,
(j) said sensing circuit causing said firing circuit to render said selectively-conductive element conductive when said electric motor and said small-value impedance and said selectively-conductive element are connected across said source of said direct current and the amount of current flowing through said small-value impedance, and hence through said electric motor, falls below a predetermined value,
(k) said sensing circuit causing said extinguishing circuit to render said selectively-conductive element non-conductive when said electric motor and said small-value impedance and said selectively-conductive element are connected across said source of said direct current and the amount of current flowing through said small-value impedance, and hence through said electric motor, rises above a second predetermined value,
(l) whereby said control system will recurrently cause the current flowing through said small value impedance, and hence through said electric motor, to rise and fall between predetermined upper and lower limits,
(m) said sensing circuit enabling said selectively-conductive element, after said firing circuit has rendered said selectively-conductive element conductive, to remain conductive until the current flowing through said small-value impedance, and hence through said electric motor, rises above said second predetermined value,
(n) said sensing circuit enabling said selectively conductive element, after said extinguishing circuit has rendered said selectively-conductive element non-conductive, to remain non-conductive until the current flowing through said small-value impedance, and hence through said electric motor again falls below the first said predetermined value,
(o) whereby said selectively-conductive element will enable said source of direct current to supply direct current continuously to said electric motor after the current flowing through said small-value impedance, and hence through said electric motor has fallen below the first said predetermined value and until said current flowing through said small-value impedance, and hence through said electric motor, again rises to said second predetermined value.

28. A control system which comprises:
(a) a series-wound motor,
(b) a small-value impedance,
(c) a selectively-conductive element that can be selectively rendered conductive and that can be selectively rendered non-conductive,
(d) said electric motor and said small-value impedance and said selectively-conductive element being connected in series relation with each other and being connectable across a source of direct current,
(e) said selectively-conductive element permitting said source of direct current to pass direct current through said electric motor and through said small-value impedance and through said selectively-conductive element whenever said selectively-conductive element is rendered conductive,
(f) said selectively-conductive element keeping said source of direct current from passing direct current through said electric motor and through said small-value impedance and through said selectively-conductive element whenever said selectively-conductive element is rendered non-conductive,
(g) a sensing circuit connected to said small-value impedance to sense the amount of current flowing through said small-value impedance, and thereby sense the amount of current flowing through said motor,
(h) a firing circuit that can selectively render said selectively-conductive element conductive, and
(i) an extinguishing circuit that can selectively render said selectively-conductive element non-conductive,
(j) said sensing circuit causing said firing circuit to render said selectively-conductive element conductive when said electric motor and said small-value impedance and said selectively-conductive element are connected across said source of said direct current and the amount of current flowing through said small-value impedance, and hence through said electric motor, falls below a predetermined value,
(k) said sensing circuit causing said extinguishing circuit to render said selectively-conductive element non-conductive when said electric motor and said small-value impedance and said selectively-conductive element are connected across said source of said direct current and the amount of current flowing through said small-value impedance, and hence through said electric motor, rises above a second predetermined value,
(l) whereby said control system will recurrently cause the current flowing through said small value impedance, and hence through said electric motor, to rise and fall between predetermined upper and lower limits,
(m) said selectively-conductive element being a controlled rectifier,
(n) said exinguishing circuit including an energy-storing element that can apply an inverse voltage to said selectively-conductive element to extinguish said selectively-conductive element,
(o) said small-value impedance being a resistor.

29. A control system which comprises:
(a) a series-wound motor,
(b) a small-value impedance,
(c) a selectively-conductive element that can be selectively rendered conductive and that can be selectively rendered non-conductive,
(d) said electric motor and said small-value impedance and said selectively-conductive element being connected in series relation with each other and being connectable across a source of direct current,
(e) said selectively-conductive element permitting said source of direct current to pass direct current through said electric motor and through said small-value impedance and through said selectively-conductive element whenever said selectively-conductive element is rendered conductive,
(f) said selectively-conductive element keeping said source of direct current from passing direct current through said electric motor and through said small-value impedance and through said selectively-conductive element whenever said selectively-conductive element is rendered non-conductive,
(g) a sensing circuit connected to a said small-value impedance to sense the amount of current flowing through said small-value impedance, and thereby sense the amount of current flowing through said motor,
(h) a firing circuit that can selectively render said selectively-conductive element conductive, and
(i) an extinguishing circuit that can selectively render said selectively-conductive element non-conductive,
(j) said sensing circuit causing said firing circuit to render said selectively-conductive element conductive when said electric motor and said small-value impedance and said selectively-conductive element are connected across said source of said direct current and the amount of current flowing through said small-value impedance, and hence through said electric motor, falls below a predetermined value,
(k) said sensing circuit causing said extinguishing circuit to render said selectively-conductive element non-conductive when said electric motor and said small-value impedance and said selectively-conductive element are connected across said source of said direct current and the amount of current flowing through said small-value impedance, and hence through said electric motor, rises above a second predetermined value,
(l) whereby said control system will recurrently cause the current flowing through said small value impedance, and hence through said electric motor, to rise and fall between predetermined upon and lower limits,
(m) said electric motor being a direct current, reversible electric motor,
(n) said small-value impedance conducting all of the current which flows through said electric motor,
(o) said selectively-conductive element being a controlled rectifier.

30. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive,
(f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive,
(g) a sensing circuit connected to said small-value impedance to sense the amount of direct current flowing through said small-value impedance, and thereby sense the amount of direct current flowing through said motor, (h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor.

31. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive,
(f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive,
(g) a sensing circuit connected to said small-value impedance to sense the amount of direct current flowing through said small-value impedance, and thereby sense the amount of direct current flowing through said motor,
(h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor, (o) said electric motor being a series-wound reversible motor, (p) said sensing circuit enabling said selectively-conductive electronic switch, after said selectively-conductive electronic switch has been rendered conductive to remain conductive until the direct current flowing through said small-value impedance, and hence through said electric motor rises above said second predetermined value, (q) said sending circuit enabling said selectively-conductive electronic switch, after said extinguishing circuit has rendered said selectively-conductive electronic switch non-conductive, to remain non-conductive until the direct current flowing through said small-value impedance, and hence through said electric motor again falls below the first said predetermined value, (r) whereby said selectively-conductive electronic switch will enable said source of substantially pulsation-free direct current to supply direct current continuously to said electric motor after the direct current impedance, and hence through said electric motor, has fallen below the first said predetermined value and until said direct current flowing through said small-value impedance, and hence through said electric motor, again rises to said second predetermined value.

32. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive, (f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive, (g) a sensing circuit connected to said small-value impedance to sense the amount of direct current flowing through said small-value impedance, and thereby sense the amount of direct current flowing through said motor, (h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor, (o) said sensing circuit including a differential amplifier which is responsive to the voltage drop across said small-value impedance, (p) said differential amplifier having one output thereof connected to said firing circuit to supply actuating signals to said firing circuit and having the other output thereof connected to said extinguishing circuit to supply actuating signals to said extinguishing circuit, (q) said one and said other outputs of said differential amplifier providing actuating signals of opposite phase, (r) whereby said differential amplifier can not simultaneously actuate said firing circuit and said extinguishing circuit.

33. A control system which comprises:
(a) an electric motor,
(b) a small-value impedance,
(c) an electronic switch that can be selectively rendered conductive and that can be selectively rendered non-conductive,
(d) a storage battery that can supply substantially pulsation-free direct current,
(e) said electric motor and said small-value impedance and said selectively-conductive electronic switch being connected in series relation with each other and being connectable across said storage battery,
(f) said selectively-conductive electronic switch permitting said storage battery to pass direct current through said electric motor and through said small-value impedance and through said selectively-conductive switch whenever said selectively-conductive electronic switch is rendered conductive,
(g) said selectively-conductive electronic switch keeping said storage battery from passing direct current through said electric motor and through said small-value impedance and through said selectively-conductive electronic switch whenever said selectively-conductive electronic switch is rendered non-conductive,
(h) a sensing circuit connected to said small-value impedance to sense the amount of direct current flowing through said small-value impedance, and thereby sense the amount of direct current flowing through said motor,
(i) a firing circuit that can selectively render said selectively-conducitve electronic switch conductive, and
(j) an extinguishing circuit that can selectively render said selectively-conductive electronic switch non-conductive
(k) said sensing circuit causing said firing circuit to render said selectively-conductive electronic switch conductive when said electric motor and said small-value impedance and said selectively-conductive electronic switch are connected across said storage battery and the amount of current flowing through said small-value impedance, and hence through said electric motor, falls below a predetermined value
(l) said sensing circuit causing said extinguishing circuit to render said selectively-conductive electronic switch non-conductive when said electric motor and said small-value impedance and said selectively-conductive electronic switch are connected across said storage battery and the amount of current flowing through said small-value impedance, and hence through said electric motor, rises above a second predetermined value,
(m) said small-value impedance conducting all of the current flowing through said motor, so said sensing circuit can sense all of the current flowing through said motor,
(n) said extinguishing circuit including a commutating capacitor,
(o) said sensing circuit enabling said selectively-conductive electronic switch, after said selectively-conductive electronic switch has been rendered conductive, to remain conductive until the direct current flowing through said small-value impedance, and hence through said electric motor, rises above said second predetermined value,
(p) said sensing circuit enabling said selectively-conductive electronic switch, after said extinguishing circuit has rendered said selectively-conductive electronic switch non-conductive, to remain non-conductive until the direct current-flowing through said small-value impedance, and hence through said electric motor, again falls below the first said predetermined value.

34. A control system which comprises:
(a) an electric motor,
(b) a small-value impedance,
(c) an electronic switch that can be selectively rendered conductive and that can be selectively rendered non-conductive, (d) said electric motor and said small-value impedance and said selectively-conductive electronic switch being connected in series relation with each other and being connectable across a source of substantially pulsation-free direct current, (e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive, (f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive, (g) a sensing circuit connected to said small-value impedance to sense the amount of direct current flowing through said small-value impedance, and thereby sense the amount of direct current flowing through said motor, (h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially plusation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor, (o) said motor being a reversible motor, (p) contacts in series relation with said small-value impedance and with said motor and with said selectively-conductive electronic switch that can be actuated to reverse said motor, (q) a coil controlling said contacts, (r) a switch that can be closed to energize said coil and that can be opened to de-energize said coil, and (s) a capacitor that charges whenever said switch is closed, (t) said capacitor responding to opening of said switch to cause said control system to drive the current flowing through said motor toward zero, (u) whereby the current interrupted by said contacts will be reduced and will thereby minimize arcing at said contacts, (v) the induction effect of said coil tending to hold said contacts closed until said control system has driven the current flowing through said motor close to zero.

35. A control system which comprises:

(a) an electric motor, (b) a small-value impedance, (c) an electronic switch that can be selectively rendered conductive and that can be selectively rendered non-conductive, (d) said electric motor and said small-value impedance and said selectively-inductive electronic switch being connected in series relation with each other and being connectable across a source of substantially pulsation-free direct current, (e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive, (f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive, (g) a sensing circuit connected to said small-value impedance to sense the amount of direct current flowing through said small-value impedance, and thereby sense the amount of direct current flowing through said motor, (h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive,
(n) whereby said control system acts as a variable frequency on-off switch for said electric motor,
(o) a normally-open shunt in parallel with said selectively-conductive electronic switch,
(p) a switch that can be closed to effect closing of said shunt,
(q) said selectively-conductive electronic switch and said sensing circuit being adapted to provide different power levels for said motor,
(r) an energy-storing element that stores energy whenever said switch is closed,
(s) said energy-storing element responding to opening of said switch to cause said control system to drive the current flowing through said motor toward zero,
(t) said Zener diode responding to a predetermined average voltage across said motor to become conductive and thereby increase the current flowing through said sensing element.

36. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive,
(f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive,
(g) a sensing circuit connected to said small-value impedance to sense the amount of direct current flowing through said small-value impedance, and thereby sense the amount of direct current flowing through said motor,
(h) a firing circuit that can selectively render said selectively-conductive electronic switch conductive, and
(i) an extinguishing circuit that can selectively render said selectively-conductive electronic switch non-conductive,
(j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small value impedance, and hence through said electric motor, falls below a predetermined value,
(k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value,
(l) said electric motor responding to increases in the load thereof to cause said direct current flowing through said small-value impedance to decrease more rapidly, and thereby shorten the periods of time between successive renderings of said electronic switch conductive,
(m) said electric motor responding to decreases in the load thereon to cause said direct current flowing through said small-value impedance to decrease less rapidly, and thereby lengthen the periods of time between successive renderings of said electronic switch conductive,
(n) whereby said control system acts as a variable frequency on-off switch for said electric motor,
(o) said motor being a series-wound motor,
(p) said source of substantially pulsation-free direct current being a storage battery,
(q) said sensing circuit including a sub-circuit which is connected to said firing circuit to supply actuating signals to said firing circuit and which is connected to said extinguishing circuit to supply actuating signals to said extinguishing circuit,
(r) said sub-circuit supplying actuating signals of opposite polarity to said firing and extinguishing circuits,
(s) whereby said sub-circuit cannot simultaneously actuate said firing circuit and said extinguishing circuit.

37. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive,
(f) said selectively-conductive electronic switch keeping said source of substantially-pulsation-free direct current from passing direct current through said electric motor and through said small-value impedance and through said selectively-conductive electronic switch whenever said selectively-conductive electronic switch is rendered non-conductive,
(g) a sensing circuit connected to said small-value impedance to sense the amount of direct current flowing through said small-value impedance, and thereby sense the amount of direct current flowing through said motor,
(h) a firing circuit that can selectively render said selectively-conductive electronic switch conductive, and
(i) an extinguishing circuit that can selectively render said selectively-conductive electronic switch non-conductive,
(j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor, (o) said firing circuit including a second selectively-conductive electronic switch that is selectively rendered conductive to render the first said selectively-conductive electronic switch conductive, (p) said firing circuit including a second firing circuit to selectively render said second selectively-conductive electronic switch conductive.

38. A control system which comprises:
(a) an electric motor,
(b) a small-value impedance,
(c) an electronic switch that can be selectively rendered conductive and that can be selectively rendered non-conductive,
(d) said electric motor and said small-value impedance and said selectively-conductive electronic switch being connected in series relation with each other and being connectable across a source of substantially pulsation-free direct current,
(e) said selectively-conductive electronic switch permitting said source of substantially pulsation-free direct current to pass direct current through said electric motor and through said small-value impedance and through said selectively-conductive electronic switch whenever said selectively-conductive electronic switch is rendered conductive,
(f) said selectively-conductive electronic switch keeping said source of substantially pulsation-free direct current from passing direct current through said electric motor and through said small-value impedance and through said selectively-conductive electronic switch whenever said selectively-conductive electronic switch is rendered non-conductive,
(g) a sensing circuit connected to said small-value impedance to sense the amount of direct current flowing through said small-value impedance, and thereby sense the amount of direct current flowing through said motor,
(h) a firing circuit that can selectively render said selectively-conductive electronic switch conductive, and (i) an extinguishing circuit that can selectively render said selectively-conductive electronic switch non-conductive, (j) said sensing circuit causing said firing circuit to render said selectively-conductive electronic switch conductive when said electric motor and said small-value impedance and said selectively-conductive electronic switch are connected across said source of said substantially pulsation-free direct current and the amount of direct current flowing through said small-value impedance, and hence through said electric motor, falls below a predetermined value, (k) said sensing circuit causing said extinguishing circuit to render said selectively-conductive electronic switch non-conductive when said electric motor and said small-value impedance and said selectively-conductive electronic switch are connected across said source of said substantially pulsation-free direct current and the amount of direct current flowing through said small-value impedance, and hence through said electric motor, rises above a second predetermined value, (l) said electric motor responding to increases in the load thereon to cause said direct current flowing through said small-value impedance to decrease more rapidly, and thereby shorten the periods of time between successive renderings of said electronic switch conductive, (m) said electric motor responding to decreases in the load thereon to cause said direct current flowing through said small-value impedance to decrease less rapidly, and thereby lengthen the periods of time between successive renderings of said electronic switch conductive, (n) whereby said control system acts as a variable frequency on-off switch for said electric motor, (o) said extinguishing circuit including a commutating capacitor, (p) said extinguishing circuit including a second selectively-conductive electronic switch that is selectively rendered conductive to enable said commutating capacitor to render the first said selectively-conductive electronic switch non-conductive (q) said extinguishing circuit including a second firing circuit to selectively render said second selectively-conductive electronic switch conductive.

References Cited

UNITED STATES PATENTS

| | | | |
|---|---|---|---|
| 2,151,753 | 3/1939 | Etzrodt | 328—81 |
| 3,047,789 | 7/1962 | Lowry | 323—22 X |
| 3,252,067 | 5/1966 | Derenbecher | 318—20.821 X |
| 2,094,363 | 9/1937 | Little et al. | 307—134 |
| 2,977,523 | 3/1961 | Cockrell | 318—345 |
| 3,064,174 | 11/1962 | Dinger | 318—345 |
| 3,191,113 | 6/1965 | Gargani | 318—345 |
| 3,209,228 | 9/1965 | Gawron | 318—345 |
| 3,222,586 | 12/1965 | Fontenote et al. | 318—345 |

BENJAMIN DOBECK, *Primary Examiner.*

J. J. BAKER, *Assistant Examiner.*